(12) United States Patent
Hino et al.

(10) Patent No.: US 11,087,456 B2
(45) Date of Patent: Aug. 10, 2021

(54) IMAGE INSPECTION APPARATUS AND SETTING METHOD FOR IMAGE INSPECTION APPARATUS

(71) Applicant: Keyence Corporation, Osaka (JP)

(72) Inventors: Shunichi Hino, Osaka (JP); Daisuke Kida, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 57 days.

(21) Appl. No.: 16/729,532

(22) Filed: Dec. 30, 2019

(65) Prior Publication Data

US 2020/0364841 A1    Nov. 19, 2020

(30) Foreign Application Priority Data

May 16, 2019 (JP) .............................. JP2019-093206

(51) Int. Cl.
*G06T 7/00* (2017.01)
(52) U.S. Cl.
CPC .... *G06T 7/001* (2013.01); *G06T 2207/20021* (2013.01); *G06T 2207/20081* (2013.01); *G06T 2207/20092* (2013.01)
(58) Field of Classification Search
None
See application file for complete search history.

(56) References Cited

U.S. PATENT DOCUMENTS

2002/0168099 A1* 11/2002 Noy ..................... G06T 7/0002
382/149
2017/0069075 A1*  3/2017 Okuda ................... G06T 11/60

FOREIGN PATENT DOCUMENTS

JP      2013120550 A    6/2013
JP      2018005640 A    1/2018

OTHER PUBLICATIONS

U.S. Appl. No. 16/729,529, filed Dec. 30, 2019 (137 pages).
U.S. Appl. No. 16/729,531, filed Dec. 30, 2019 (158 pages).

* cited by examiner

*Primary Examiner* — Leon Flores
(74) *Attorney, Agent, or Firm* — Kilyk & Bowersox, P.L.L.C.

(57) ABSTRACT

To enable a non-defective product image or a defective product image to be easily additionally learned in both a setting mode and a run mode. Designation as to whether an inspection target image displayed on a run mode screen is additionally learned as a non-defective product image or a defective product image is received. A distinguishing device generating unit additionally learns, as a non-defective product image or a defective product image, the inspection target image designated as the additional learning target and updates a distinguishing device.

7 Claims, 37 Drawing Sheets

STANDARD INSPECTION MODE OPERATION FLOWCHART

W

W

406   W

407   W

W

408   W

IMAGE INSPECTION APPARATUS AND SETTING METHOD FOR IMAGE INSPECTION APPARATUS

CROSS-REFERENCE TO RELATED APPLICATIONS

The present application claims foreign priority based on Japanese Patent Application No. 2019-093206, filed May 16, 2019, the contents of which is incorporated herein by reference.

BACKGROUND OF THE INVENTION

1. Field of the Invention

The present invention relates to an image inspection apparatus and a setting method for an image inspection apparatus that make a pass/fail determination of an inspection target based on an image obtained by imaging the inspection target.

2. Description of Related Art

In a general image inspection using an image obtained by imaging an inspection target, a master image is first registered and then various image inspection tools are set on the registered master image, as disclosed in, for example, JP-A-2013-120550. Specifically, the user first makes various imaging settings for obtaining a master image and obtains the master image using the set imaging settings. Next, the user selects the image inspection tools, sets a window for defining the range to which the selected image inspection tools are applied on the obtained master image, and makes the individual settings of the image inspection tools. After that, the user images an inspection target, performs an image inspection, and determines whether the desired result of a pass/fail determination has been obtained. When the desired result has been obtained, the settings are completed. When the desired result has not been obtained, however, the user adjusts the imaging settings for obtaining the master image as necessary. Since the master image is changed when the imaging settings are adjusted, the user adjusts the individual settings of the image inspection tools as necessary. A general inspection processing as described above is a rule-based image inspection in which the user sets the feature value included in the image on which an inspection is based. Since the image inspection apparatus makes a pass/fail determination according to the setting by the user in a rule-based image inspection, the user can control the reference of a pass/fail determination.

In the rule-based image inspection described above, a pass/fail determination of the inspection target is made based on various feature values (such as color, edge, and position) of the inspection target in the image. In an image whose feature values such as the color and edge are clear, a pass/fail determination is easy. However, in an inspection target having color differences or an inspection target such as a metal component whose look easily changes depending on the surrounding environment, the feature values easily change depending on the imaging condition or the like, a determination by an image inspection apparatus may be difficult even when a pass/fail determination via human eye is easy, and the determination result may become unstable.

As the inspection processing technique capable of supporting such a difficult inspection, there is a known technique that causes a known learning unit such as a neural network to learn the characteristics of a non-defective product image in which a non-defective product is imaged and a defective product image in which a defective product is imaged, generates a distinguishing device, and causes the distinguishing device to determine whether an image of an inspection target newly input during operation is a non-defective product or a defective product (see, for example, JP-A-2018-5640).

Since the distinguishing performance of the distinguishing device can be improved by inputting non-defective product images and defective product images having various patterns, the demand for distinguishing performance is normally met by inputting many non-defective product images and defective product images in the setting mode.

However, this method makes the setting mode redundant, thereby increasing the time for shifting from the setting mode to the run mode for performing an actual inspection.

In addition, since the determination performance of the distinguishing device cannot be checked until a new image captured in the run mode is input to the distinguishing device, the determination performance of the distinguishing device cannot be checked until switching from the setting mode to the run mode. As a result of the checking, if the determination performance of the distinguishing device does not meet the demand, it is necessary to perform switching from the run mode to the setting mode and perform additional learning by inputting a non-defective product image and a defective product image. Therefore, even after switching to the run mode after completion of the setting mode, switching to the setting mode from the run mode needs to be performed for additional learning, and then switching to the run mode from the setting mode needs to be performed, so the operation is complicated.

SUMMARY OF THE INVENTION

The invention addresses the above problem with an object of enabling the user to additionally learn a non-defective product image or a defective product image easily in both the setting mode and the run mode.

To achieve the above object, according to an first aspect, there is provided an image inspection apparatus that makes a pass/fail determination of an inspection target based on an image of the inspection target captured by an imaging unit, the image inspection apparatus including: a mode switching unit that switches a mode of the image inspection apparatus between a setting mode for setting the image inspection apparatus and a run mode for performing an inspection; an imaging setting unit that receives a setting of an imaging condition of the imaging unit in the setting mode; a learning image registering unit that registers a non-defective product image to which an attribute of a non-defective product is given by a user and a defective product image to which an attribute of a defective product is given by the user in the setting mode; a distinguishing device generating unit that learns the non-defective product image and the defective product image registered by the learning image registering unit and generates a distinguishing device that distinguishes the non-defective product image from the defective product image in the setting mode; a pass/fail determining unit that inputs an inspection target image newly captured by the imaging unit to the distinguishing device and makes a pass/fail determination in the run mode; a display unit that displays the inspection target image together with a result of the pass/fail determination by the pass/fail determining unit on a run mode screen in the run mode; and an additional learning image designating unit that receives designation as to whether the inspection target image displayed on the run mode screen is additionally learned as the non-defective product image or the defective product image, in which the distinguishing device generating unit additionally learns, as the non-defective product image or the defective product image, the inspection target image designated as an additional learning target by the additional learning image designating unit and updates the distinguishing device.

In this structure, in the setting mode, the setting of the imaging condition of the imaging unit is received, the non-defective product image to which the attribute of a non-defective product is given by the user and the defective product image to which the attribute of a defective product is given by the user are registered, and the registered non-defective product image and the registered defective product image are learned and the distinguishing device that distinguishes the non-defective product image from the defective product image is generated by the distinguishing device generating unit.

After that, when the mode switching unit performs switching to the run mode, the inspection target image newly captured by the imaging unit is input to the distinguishing device, and a pass/fail determination is made by the pass/fail determination. Since both the inspection target image and the result of the pass/fail determination are displayed on the run mode screen of the display unit, the user can grasp the inspection target image and the result of the pass/fail determination of the image. At this time, the run mode is continued when the result of the pass/fail determination of the inspection target image is correct or additional learning may be performed when the result of the pass/fail determination of the inspection target image is incorrect. That is, when the inspection target image displayed on the run mode screen is determined to be a defective product image even though it is a non-defective product image, designation for additionally learning the inspection target image as a non-defective product image is received by the additional learning image designating unit. In contrast, when the inspection target image displayed on the run mode screen is determined to be a non-defective product image even though it is a defective product image, designation for additionally learning the inspection target image as a defective product image is received by the additional learning image designating unit. When the inspection target image designated as the additional learning target is a non-defective product image, the distinguishing device generating unit additionally learns the inspection target image as a non-defective product image. In contrast, when the inspection target image designated as the additional learning target is a defective product image, the distinguishing device generating unit additionally learns the inspection target image as a defective product image. Accordingly, the distinguishing device generating unit designates the image that is the additional learning target in the run mode without switching from the run mode to the setting mode, performs additional learning, updates the distinguishing device, and improves the distinguishing performance.

In addition, since the user determines whether to perform additional learning, unnecessary learning such as repeatedly inputting of the same image is prevented, thereby improving the efficiency of additional learning.

In addition, the distinguishing device can be generated by inputting the non-defective product image and the defective product image to, for example, a neural network subjected to learning in advance. The neural network may have many layers so that the ability to distinguish the non-defective product image from the defective product image can be improved significantly.

In the second aspect, the distinguishing device generating unit generates a distinguishing boundary between the non-defective product image and the defective product image in a feature value space by inputting the non-defective product image and the defective product image to a pre-learned neural network having a plurality of layers and updates the distinguishing boundary by the additional learning.

In this structure, since a pre-learned neural network is used, the user does not need to cause the neural network to learn from scratch and can generate the distinguishing boundary between the non-defective product image and the defective product image in the feature value space by inputting the non-defective product image and defective product image. In addition, since the distinguishing boundary is updated by additional learning and the distinguishing device is updated, the distinguishing performance is improved.

In the third aspect, the image inspection apparatus further includes a master image registering unit that registers, as a master image, an image captured under the imaging condition set by the imaging setting unit in the setting mode; and an inspection window setting unit that receives a setting of a first learning-based inspection window and a second learning-based inspection window that define ranges of difference detection on the master image registered by the master image registering unit in the setting mode, in which the run mode screen displays a result of a pass/fail determination by the pass/fail determination unit of an image in the range defined by the first learning-based inspection window and a result of a pass/fail determination by the pass/fail determination unit of an image in the range defined by the second learning-based inspection window and the additional learning image designating unit receives designation as to whether the image in the range defined by the first learning-based inspection window and the image in the range defined by the second learning-based inspection window are additionally learned separately from each other.

In this structure, when the first learning-based inspection window and the second learning-based inspection window are set by the inspection window setting unit, one additional learning image includes the image in the range defined by the first learning-based inspection window and the image in the range defined by the second learning-based inspection window. In this case, for example, although the result of a pass/fail determination of the image in the range defined by the first learning-based inspection window is correct, the result of a pass/fail determination of the image in the range defined by the second learning-based inspection window may be incorrect. In this case, the learning becomes efficient by additionally learning the image in the range defined by the second learning-based inspection window without additionally learning the image in the range defined by the first learning-based inspection window.

In the fourth aspect, after receiving the designation as to whether the image in the range defined by the first learning-based inspection window and the image in the range defined by the second learning-based inspection window are additionally learned separately from each other, the additional learning image designating unit receives an operation for starting the additional learning by the user.

In this structure, additional learning can be started after designating whether the image in the range defined by the first learning-based inspection window and the image in the range defined by the second learning-based inspection window are additionally learned separately from each other.

In the fifth aspect, after receiving designation for additionally learning the inspection target image displayed on the run mode screen as the non-defective product image or the defective product image, the additional learning image designating unit receives the designation as to whether the image in the range defined by the first learning-based inspection window and the image in the range defined by the second learning-based inspection window are additionally learned separately from each other.

In this structure, when receiving designation as to whether the inspection target image displayed on the run mode screen is additionally learned as a non-defective product image or a defective product image, the additional learning image designating unit may receive designation as to whether the image in the range defined by the first learning-based inspection window and the image in the range defined by the second learning-based inspection window are additionally learned separately from each other.

In the sixth aspect, when the additional learning image designating unit receives the designation for additionally learning the inspection target image displayed on the run mode screen as the non-defective product image or the defective product image, the pass/fail determination unit temporarily stops the run mode and, when the additional learning image designating unit receives the designation for additionally learning the inspection target image displayed on the run mode screen, the display unit is capable of notifying the user that the pass/fail determination temporarily stops the run mode.

In this structure, when designation for additionally learning the inspection target image displayed on the run mode screen as a non-defective product image or a defective product image is received, the run mode is temporarily stopped and then additional learning is performed. Since the display unit notifies the user of a temporary stop of the run mode, the user can grasp the execution of additional learning.

In the seventh aspect, there is provided a setting method for an image inspection apparatus that makes a pass/fail determination of an inspection target based on an image of the inspection target captured by an imaging unit, the setting method including: an imaging condition setting step of setting an imaging condition of the imaging unit with a mode of the image inspection apparatus set to a setting mode for setting the image inspection apparatus; a learning image registering step of registering a non-defective product image to which an attribute of a non-defective product is given by a user and a defective product image to which an attribute of a defective product is given by the user in the setting mode; a distinguishing device generating step of learning the non-defective product image and the defective product image registered in the learning image registering step and generating a distinguishing device that distinguishes the non-defective product image from the defective product image in the setting mode; a pass/fail determination step that inputs an inspection target image newly captured by the imaging unit in the distinguishing device and makes a pass/fail determination in a run mode for performing an inspection; a display step of displaying the inspection target image together with a result of the pass/fail determination in the pass/fail determination step on a run mode screen in the run mode; and an additional learning setting step of receiving designation as to whether the inspection target image displayed on the run mode screen in the display step is additionally learned as the non-defective product image or the defective product image, in which the inspection target image designated as an additional learning target in the additional learning setting step is additionally learned the non-defective product image or the defective product image and the distinguishing device is updated in the distinguishing device generating step.

According to the invention, the inspection target image and the result of a pass/fail determination are displayed on the run mode screen, designation as to whether the inspection target image displayed on the run mode screen is additionally learned as a non-defective product image or a defective product image is received, the inspection target image designated as the additional learning target is additionally learned, and the distinguishing device is updated. Accordingly, a non-defective product image or a defective product image can be additionally learned easily in both the setting mode and the run mode.

BRIEF DESCRIPTION OF THE DRAWINGS

FIG. 28A illustrates the case in which the probability of being a non-defective product image is high, FIG. 28B illustrates the case in which the probability of being a non-defective product image is approximately half, and FIG. 28C illustrates the case in which the probability of being a defective product image is high;

FIG. 29A illustrates a non-defective product image and FIG. 29B illustrates an inspection target image in which a region is selectively enhanced;

DESCRIPTION OF EMBODIMENTS

An embodiment of the invention will be described in detail below with reference to the drawings. It should be noted here that the preferable embodiment below is substantially only an example and does not limit the invention, applications, or the use thereof.

Figure 1:
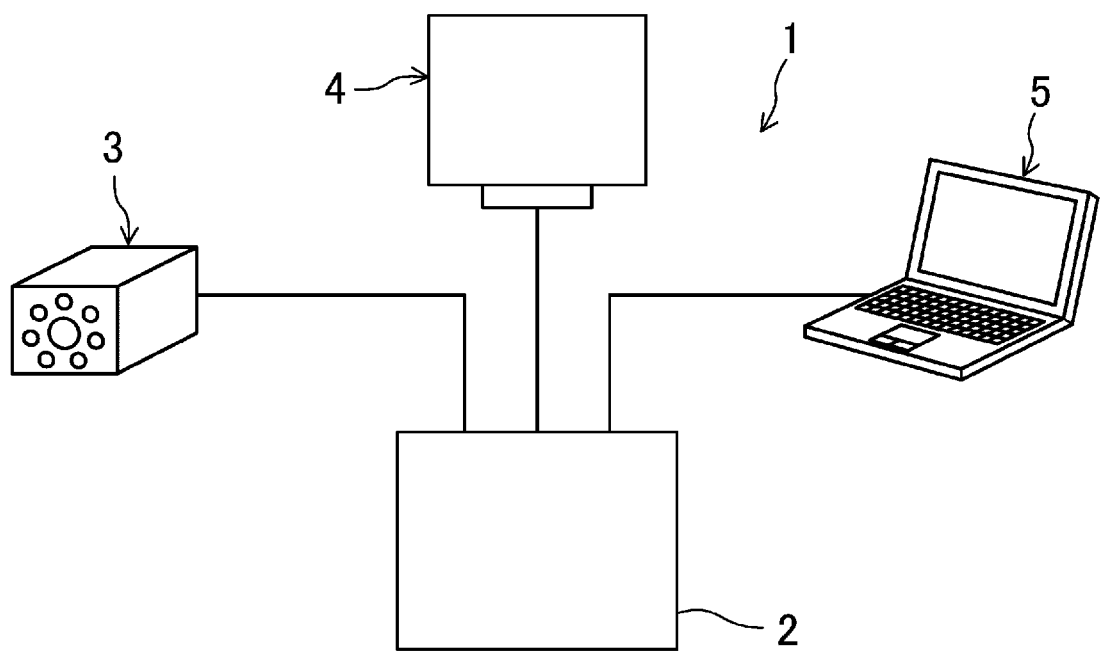
FIG. 1 is a schematic view illustrating the structure of an image inspection apparatus according to an embodiment of the invention.

FIG. 1 is a schematic view illustrating the structure of an image inspection apparatus 1 according to an embodiment of the invention. The image inspection apparatus 1 makes a pass/fail determination of inspection targets such as, for example, various components or products based on images obtained by imaging the inspection targets and can be used in production sites such as factories. Whole or part of an inspection target object may be the inspection target. Alternatively, one inspection target object may include a plurality of inspection targets. Alternatively, an image may include a plurality of inspection target objects.

The image inspection apparatus 1 includes a control unit that is an apparatus body, an image-capturing unit 3, a display device (display unit) 4, and a personal computer 5. The personal computer 5 is not essential and may be omitted. The personal computer (display unit) 5 may be used in place of the display device 4. Although FIG. 1 illustrates, as one example of the structure of the image inspection apparatus 1, the control unit 2, the image-capturing unit 3, the display device 4, and the personal computer 5 as separate components, any of these components may be combined integrally with each other. For example, the control unit 2 may be integrated with the image-capturing unit 3 or the control unit 2 may be integrated with the display device 4. Alternatively, the control unit 2 may be divided into a plurality of units so that a part thereof is built in the image-capturing unit 3 or the display device 4 or the image-capturing unit 3 may be divided into a plurality of units so that a part thereof is built in another unit.

(Structure of the Image-Capturing Unit 3)

Figure 2:
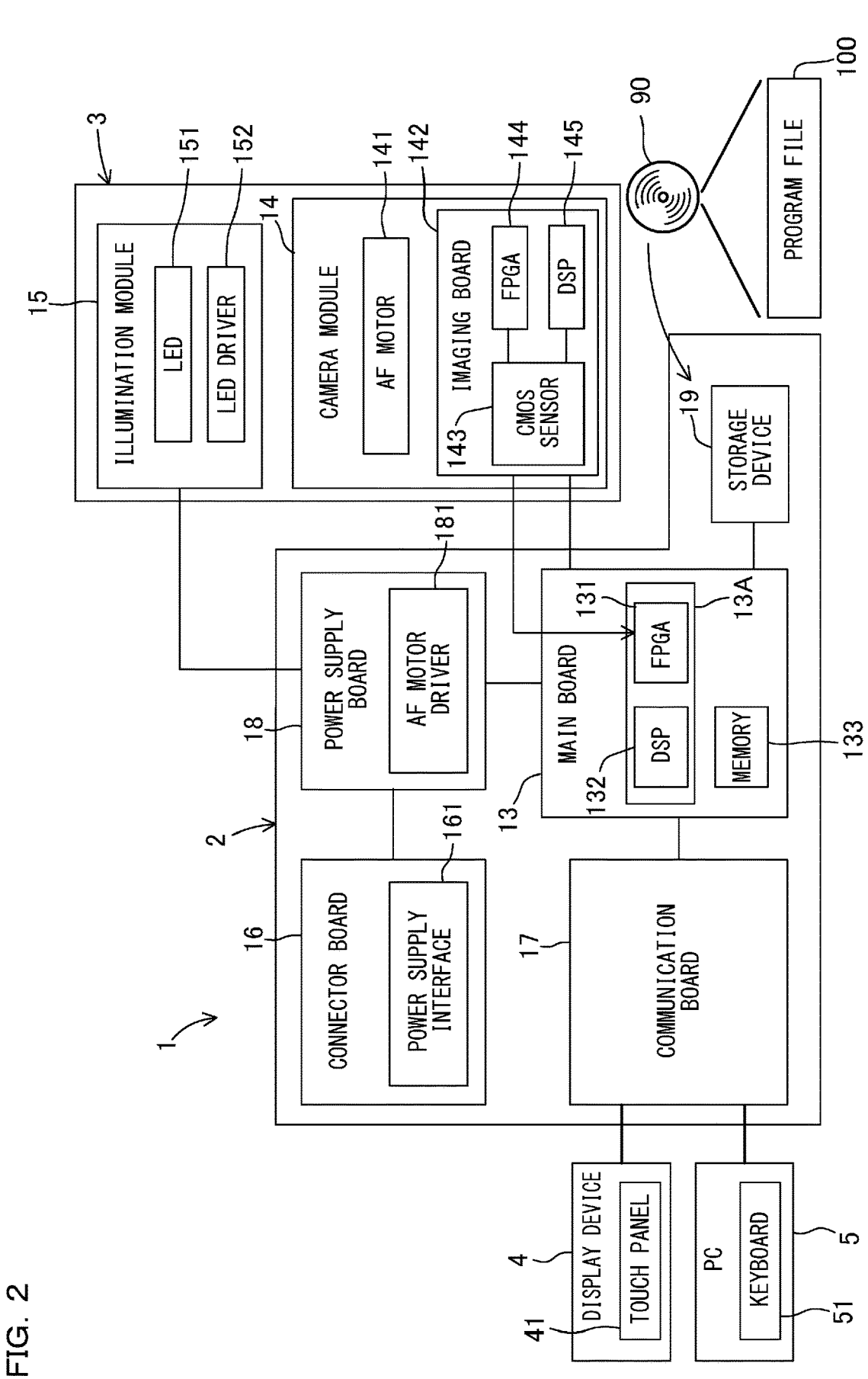
FIG. 2 illustrates the hardware structure of the image inspection apparatus.

As illustrated in FIG. 2, the image-capturing unit 3 includes a camera module (imaging unit) 14 and an illumination module 15. The camera module 14 includes an AF motor 141 for driving an imaging optical system and an imaging board 142. The AF motor 141 automatically performs focus adjustment by driving the lens of the imaging optical system and may perform focus adjustment using a conventionally known autofocus method or the like. The imaging board 142 includes a CMOS sensor 143 as a light receiving element that receives light incident from an imaging optical system, an FPGA 144, and a DSP 145. The CMOS sensor 143 is an imaging sensor configured so as to obtain a color image. A light receiving element such as, for example, a CCD sensor may be used in place of the CMOS sensor 143. The FPGA 144 and the DSP 145 perform image processing in the image-capturing unit 3 and the signal output from the CMOS sensor 143 is also input to the FPGA 144 and the DSP 145.

The illumination module 15 includes an LED (light emitting diode) 151 as a light emitting device that illuminates an illuminating area including an inspection target and an LED driver 152 that controls the LED 151. The light emission timing, the light emission time, and the light emission amount of the LED 151 can be set to any values by the LED driver 152. The LED 151 may be provided integrally with the image-capturing unit 3 or may be provided separately from the image-capturing unit 3 as an external illumination unit. Although not illustrated, the illumination module 15 includes a reflector that reflects the light emitted from the LED 151, a lens through which the light emitted from the LED 151 passes, and the like. The illumination range of the LED 151 is set so that the light emitted from the LED 151 illuminates the inspection target and the peripheral region of the inspection target. A light emitter other than a light emitting diode may also be used.

(Structure of the Control Unit 2)

The control unit 2 includes a main board 13, a connector board 16, a communication board 17, and a power supply board 18. An FPGA 131, a DSP 132, and a memory 133 are mounted on the main board 13. The FPGA 131 and the DSP 132 constitute a control section 13A and a main control section formed by integrating these components may also be provided.

The control section 13A of the main board 13 controls the operation of the boards and the modules connected thereto.

For example, the control section 13A outputs an illumination control signal for controlling the turn-on or turn-off of the LED 151 to the LED driver 152 of the illumination module 15. The LED driver 152 switches between the turn-on and turn-off of the LED 151 and controls the amount of light of the LED 151 according to the illumination control signal from the control section 13A.

In addition, the control section 13A outputs an imaging control signal for controlling the CMOS sensor 143 to the imaging board 142 of the camera module 14. The CMOS sensor 143 starts imaging according to the imaging control signal from the control section 13A and performs imaging by adjusting the exposure time to any value. That is, the image-capturing unit 3 images the inside of the visual field range of the CMOS sensor 143 according to the imaging control signal output from the control section 13A. The image-capturing unit 3 images an inspection target if it is present in the visual field range or may capture an object other than the inspection target if the object is present in the visual field range. For example, when the image inspection apparatus 1 is set, the non-defective product image to which the attribute of a non-defective product is given by the user and the defective product image to which the attribute of a defective product is given by the user can be imaged. During operation of the image inspection apparatus 1, an inspection target can be imaged. At any time, the CMOS sensor 143 can output a live image, which is an image currently being captured, at a short frame rate.

After completion of imaging by the CMOS sensor 143, the image signal output from the image-capturing unit 3 is input to the FPGA 131 of the main board 13, processed by the FPGA 131 and the DSP 132, and stored in the memory 133. The specific processing by the control section 13A of the main board 13 will be described later.

The connector board 16 receives electric power from the outside via a power supply connector (not illustrated) provided in a power supply interface 161. The power supply board 18 distributes the electric power received by the connector board 16 to boards, modules, and the like, which are specifically, the illumination module 15, the camera module 14, the main board 13, and the communication board 17. The power supply board 18 has an AF motor driver 181. The AF motor driver 181 supplies driving electric power to the AF motor 141 of the camera module 14 to realize autofocus. The AF motor driver 181 adjusts the electric power to be supplied to the AF motor 141 according to the AF control signal from the control unit 13A of the main board 13.

The communication board 17 outputs, to the display device 4, the personal computer 5, an external control device (not illustrated), and the like, a pass/fail determination signal and image data of the inspection target output from the control unit 13A of the main board 13, user interfaces, and the like. The display device 4 and the personal computer 5 have, for example, a display panel including a liquid crystal panel or the like and the image data, the user interfaces, and the like are displayed on the display panel.

In addition, the communication board 17 receives various operations by the user input via a touch panel 41 of the display device 4, a keyboard 51 of the personal computer 5, or the like. The touch panel 41 of the display device 4 is a conventionally known touch operation panel having, for example, a pressure sensor, detects a touch operation by the user, and outputs the touch operation to the communication board 17. The personal computer 5 has a mouse and a touch panel, which are not illustrated, in addition to the keyboard 51 so as to receive various operations by the user input through these operation devices. Communication may be performed via a wired or wireless manner and any communication form can be achieved by a conventionally known communication module.

The control unit 2 has a storage device (storage unit) 19 such as, for example, a hard disk drive. The storage device 19 stores a program file 80, a setting file, and the like (software) for achieving individual types of control and processing described later via the hardware described above, a master image, a history image, the result of a pass/fail determination, and the like. The program file 80 and the setting file may be stored in a storage medium 90 such as, for example, an optical disc and the program file 80 and the setting file may be installed in the control unit 2.

(Specific Structure of the Image Inspection Apparatus 1)

Figure 3:
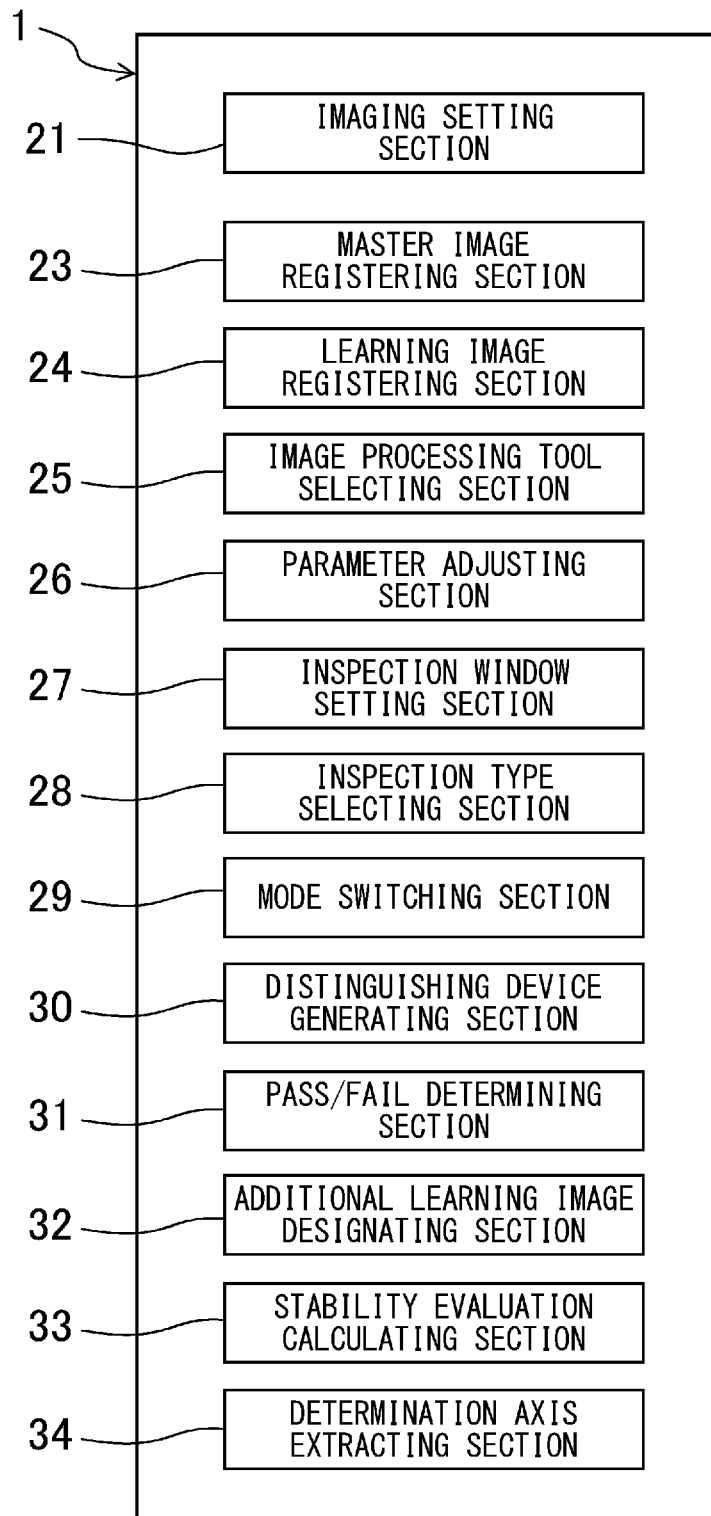
FIG. 3 is a block diagram illustrating the image inspection apparatus.

FIG. 3 is a block diagram illustrating the image inspection apparatus 1 and the individual sections and units illustrated in FIG. 3 are configured by the control unit 2 in which the program file 80 and the setting file are installed. That is, the image inspection apparatus 1 includes an imaging setting section 21, a master image registering section 23, a learning image registering section 24, an image processing tool selecting section 25, a parameter adjusting section 26, an inspection window setting section 27, an inspection type selecting section 28, a mode switching section 29, a distinguishing device generating section 30, a pass/fail determining section 31, an additional learning image designating section 32, a stability evaluation calculating section 33, and a determination axis extracting section 34. These sections (units) may be configured by only hardware or a combination of hardware and software. In addition, the individual sections and units illustrated in FIG. 3 may be independent of each other or may one piece of hardware or software having a plurality of functions. In addition, the functions of the individual sections and units illustrated in FIG. 3 may be achieved via control by the control section 13A of the main board 13.

In addition, in the image inspection apparatus 1, it is possible to perform switching between the setting mode for setting various parameters such as imaging settings, registering a master image, and generating (learning) a distinguishing device capable of internally distinguishing a non-defective product image from a defective product image and the run mode for making a pass/fail determination of an inspection target based on a captured image in an actual field. In the setting mode, preparation work is performed so that the user can distinguish a non-defective product from a defective product in a desired product inspection. Switching between the setting mode and the run mode may be performed via a user interface described later or switching to the run mode may be automatically performed immediately after completion of the setting mode. In the run mode, a modification or change in the distinguishing boundary by the distinguishing device, which is so-called additional learning, can be performed.

In addition, in the image inspection apparatus 1, it is possible to perform switching between the rule-based inspection mode (standard inspection mode) that makes a pass/fail determination of the inspection target based on various feature values (such as color, edge, and position) of the inspection target in the image and the learning-based inspection mode (learning inspection mode) that generates a distinguishing device and makes a pass/fail determination of the inspection target using the generated distinguishing device. In the standard inspection mode, the setting indicating the feature value included in the image on which inspection by the user is based, the threshold, and the like are set and a pass/fail determination is made according to this setting. Switching between the standard inspection mode and the learning inspection mode can be performed on a user interface described later.

(Startup Time Control)

Figure 4:
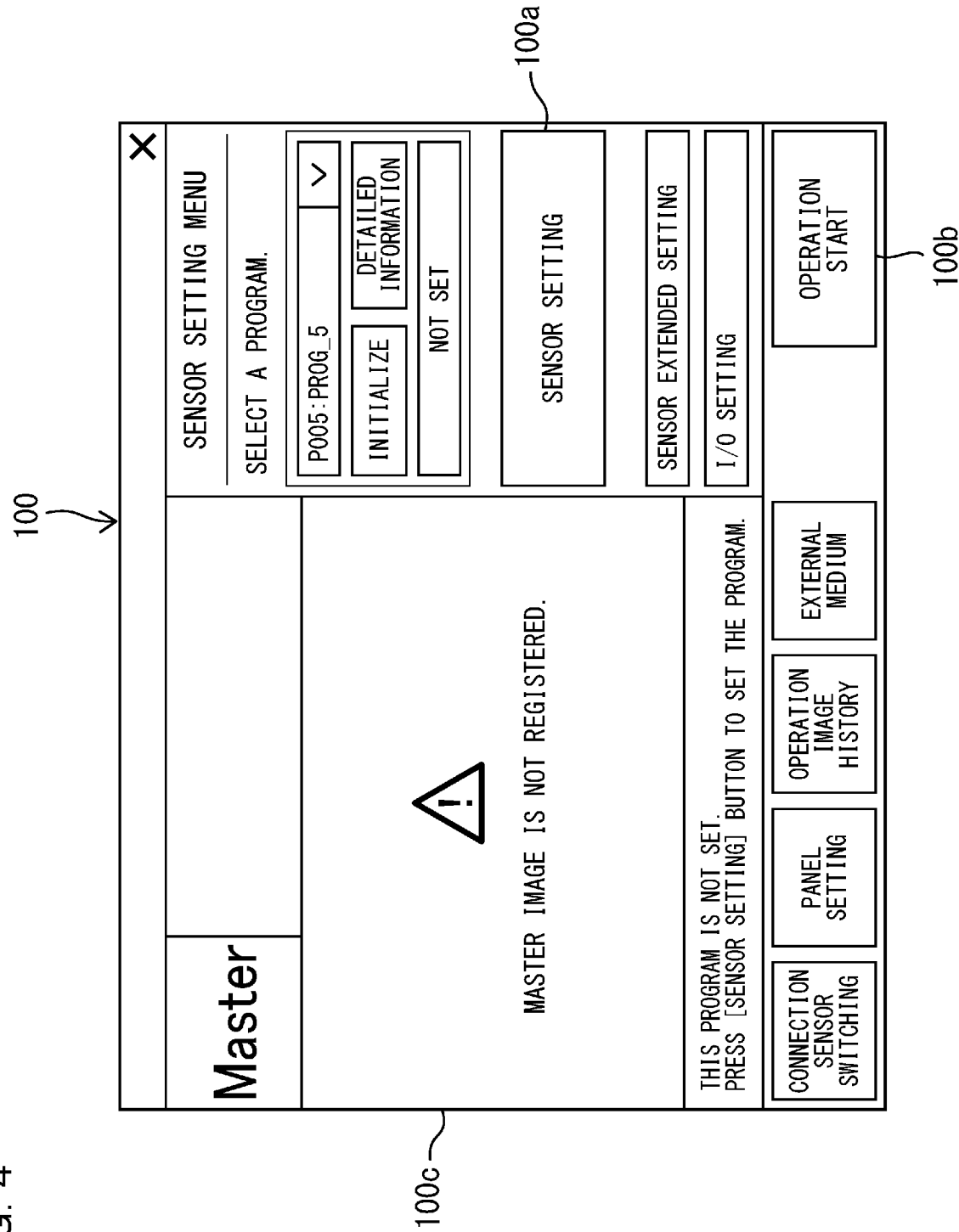
FIG. 4 illustrates a startup time user interface.

When the image inspection apparatus 1 is started up, the control unit 2 generates a startup time user interface 100 as illustrated in FIG. 4 and displays this interface in the display device 4. The startup time user interface 100 can also be generated by an UI generating section (not illustrated) or the like. Other user interfaces described below can also be generated by the UI generating section or the like.

The startup time user interface 100 includes a sensor setting button 100a, an operation start button 100b, and an image display area 100c. The sensor setting button 100a is operated to set the image inspection apparatus 1. The operation start button 100b is operated to enter the run mode for performing an inspection. The image display area 100c can display images captured by the image-capturing unit 3, images stored in the storage device 19, images read from the outside, and the like.

When detecting that the sensor setting button 100a of the startup time user interface 100 illustrated in FIG. 4 has been pressed, the mode switching section 29 illustrated in FIG. 3 performs switching to the setting mode for setting the image inspection apparatus 1. In contrast, when detecting that the operation start button 100b of the startup time user interface 100 has been pressed, the mode switching section 29 performs switching to the run mode. That is, the mode switching section 29 switches the mode of the operation start button 100b between the setting mode for setting the image inspection apparatus 1 and the run mode for performing an inspection. The method for switching the mode of the image inspection apparatus 1 may be performed by, for example, a signal input from the outside or the like instead of by a button operation described above. It should be noted here that "depression of a button" is performed by an operation of the touch panel 41 of the display device 4 or an operation by the keyboard 51 or the mouse of the personal computer 5. This is true of a button operation described below.

(Structure of the Inspection Type Selecting Section 28)

The inspection type selecting section 28 illustrated in FIG. 3 receives the selection of either the standard inspection mode or the learning inspection mode. The inspection type selecting section 28 generates an inspection type selection user interface 101 illustrated in FIG. 5 and displays this interface in the display device 4. The inspection type selection user interface 101 includes a learning inspection mode selecting button 101a, a standard inspection mode selecting button 101b, a cancel button 101c, and an OK button 101d. When detecting that the learning inspection mode selecting button 101a has been pressed, the inspection type selecting section 28 performs switching to the learning inspection mode. In contrast, when detecting that the standard inspection mode selecting button 101b has been pressed, the inspection type selecting section 28 performs switching to the standard inspection mode. After that, when an OK button 101d is pressed, the received inspection mode is accepted. When the cancel button 101c is pressed, the startup time user interface 100 illustrated in FIG. 4 is displayed in the display device 4.

The section that receives the selection of the standard inspection mode or the learning inspection mode by the user is not limited to the inspection type selecting section 28 described above and the section may receive the selection according to, for example, a signal input from the outside.

Figure 5:
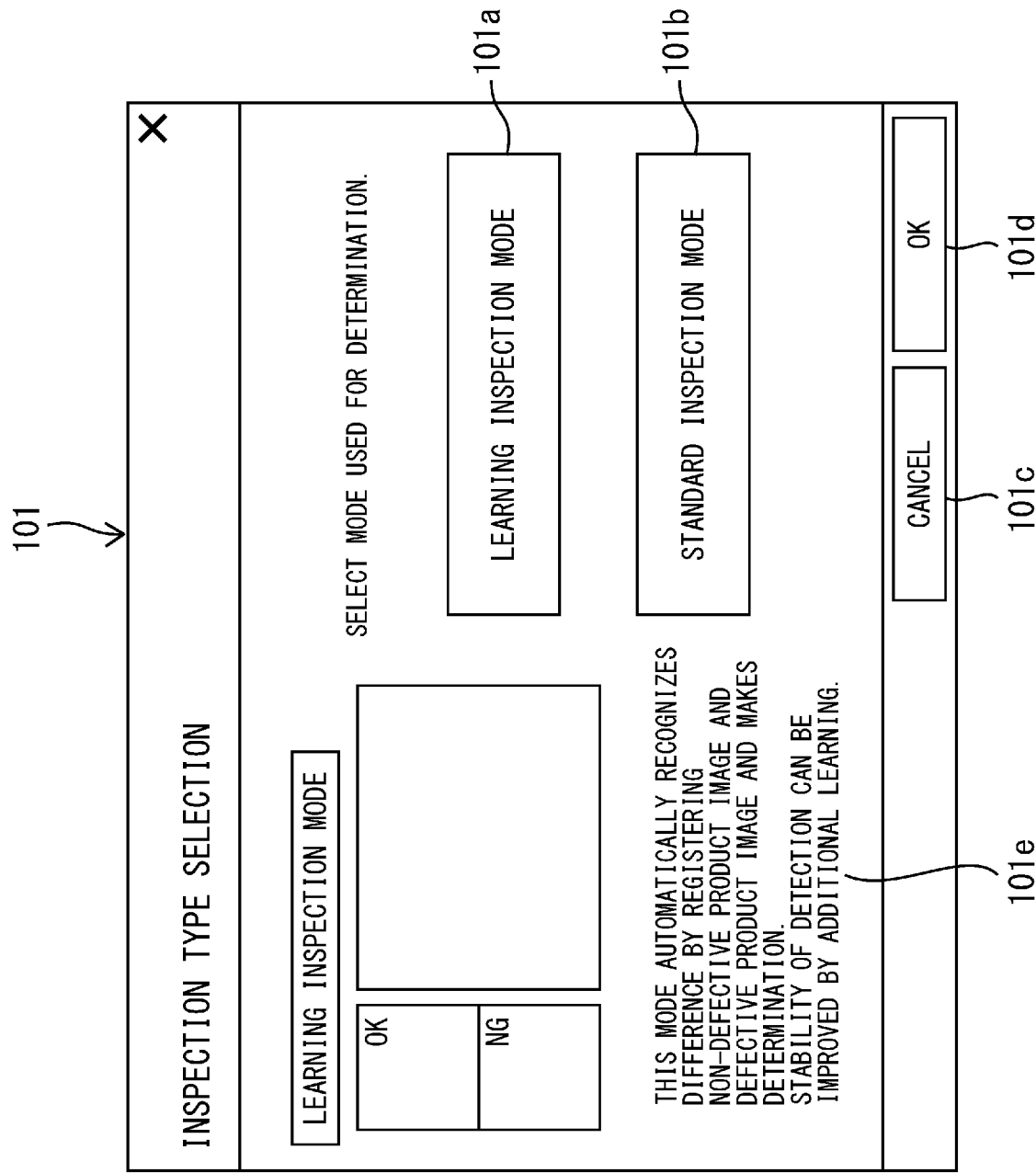
FIG. 5 illustrates an inspection type selection user interface.

The inspection type selection user interface 101 illustrated in FIG. 5 has an explanatory text display region 101e in which explanatory text for describing the summary of the learning inspection mode and explanatory text for describing the summary of the standard inspection mode are displayed. When the learning inspection mode selecting button 101a is pressed, the explanatory text describing the summary of the learning inspection mode is displayed in the describing text display region 101e. In contrast, when the standard inspection mode selecting button 101b is pressed, the explanatory text the summary of the standard inspection mode is displayed in the describing text display region 101e.

(Structure of the Imaging Setting Section 21)

The imaging setting section 21 illustrated in FIG. 3 receives the setting of the imaging conditions of the imaging unit 3 in the setting mode. Although the imaging conditions include, for example, the exposure time, the amount of light to be emitted from the illumination module 15, the gain, the focus adjustment, the trigger condition for imaging, and the like, the imaging conditions are not limited to these and may include conditions that can be set for imaging.

Figure 6:
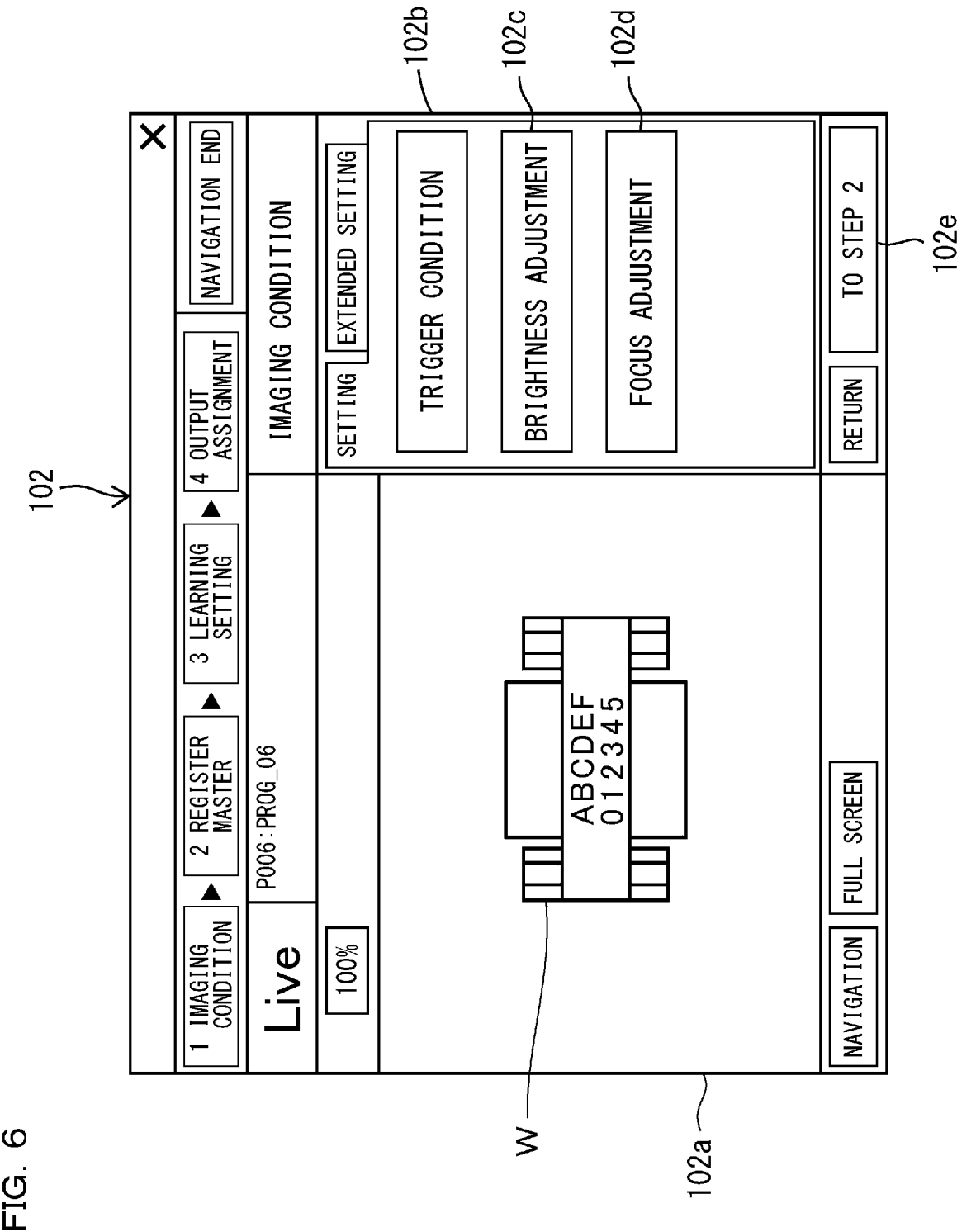
FIG. 6 illustrates an imaging condition setting user interface.

The imaging setting section 21 generates the imaging condition setting user interface 102 illustrated in FIG. 6 and displays this interface in the display device 4. The imaging condition setting user interface 102 includes an image display region 102a, a trigger condition setting button 102b, a brightness adjusting button 102c, a focus adjusting button 102d, and a next step button 102e. The image display region 102a displays a live image captured by the CMOS sensor 143. A live image represents the current image that is being captured by the CMOS sensor 143 and the image in the image display region 102a changes substantially in real time when the imaging target or the brightness changes. Reference numeral W represents an inspection target.

The trigger condition setting button 102b sets an imaging trigger signal for causing the image-capturing unit 3 to start imaging. When detecting that the trigger condition setting button 102b has been operated, the imaging setting section 21 generates a user interface (not illustrated) capable of setting an imaging trigger signal and displays this interface in the display device 4. The user can perform imaging by the image-capturing unit 3 by selecting the imaging trigger signal, for example, input from the outside in the state in which an inspection target W is present in the visual field range of the CMOS sensor 143. The imaging trigger signal may be input from an external PLC or the like or may be generated internally at a predetermined timing.

The brightness adjusting button 102c adjusts the exposure time, the amount of light emitted from the illumination module 15, the gain, and the like and can adjust the brightness of an image to be obtained. When detecting that the brightness adjusting button 102c has been operated, the imaging setting section 21 generates a user interface (not illustrated) capable of adjusting the exposure time and the like and display this interface in the display device 4. The user can adjust the brightness of an image while seeing the image in the image display region 102a. Since the brightness of an image can be automatically adjusted by the image inspection apparatus 1 to improve the accuracy of inspection, adjustment by the user is not essential.

The focus adjusting button 102d is operated to perform focus adjustment. When detecting that the focus adjusting button 102d has been operated, the imaging setting section 21 generates a user interface (not illustrated) capable of performing focus adjustment and displays this interface in the display device 4. Although the autofocus function described above performs automatic adjustment so as to focus on the inspection target W, the user can use this function to manually focus on the inspection target W.

The next step button 102e is operated when the imaging conditions have been set. When detecting that the next step button 102e has been pressed, the imaging setting section 21 accepts the trigger condition, the brightness, the focus, and the like and the processing proceeds to the next process, that is, the registering of a master image. (Structure of the master image registering section 23)

The master image registering section 23 illustrated in FIG. 3 registers, as a master image, the image captured under the imaging condition set by the imaging setting section 21 in the setting mode. A master image is an image used as the reference to set an image inspection frame, that is, an inspection window and includes the inspection target W of a non-defective product. A master image may be stored in the storage device 19.

Figure 7:
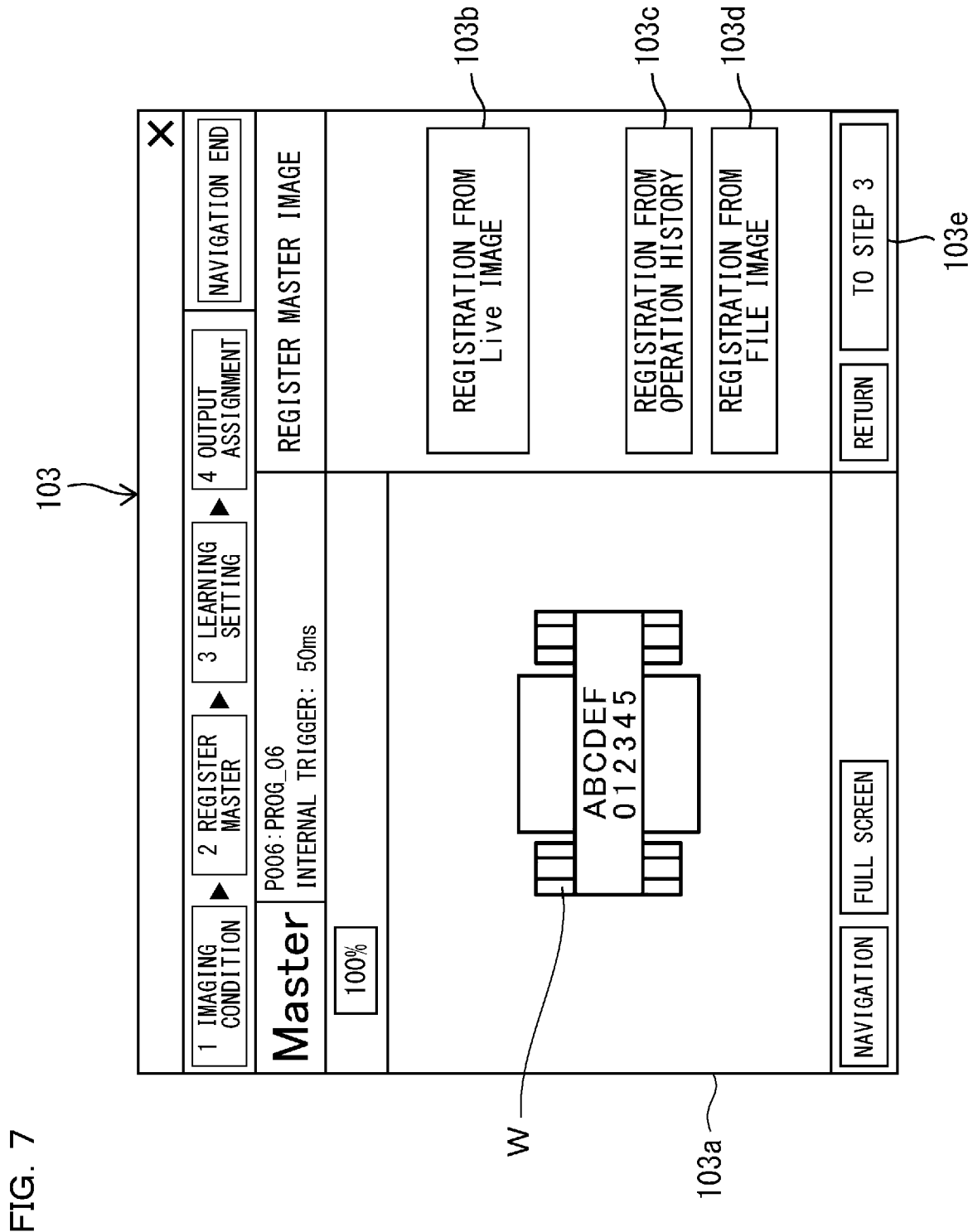
FIG. 7 illustrates a master image registering user interface.

The master image registering section 23 generates a master image registering user interface 103 illustrated in FIG. 7 and displays this interface in the display device 4. The master image registering user interface 103 includes a master candidate image display region 103a in which an image that is a candidate of the master image is displayed, a live image registering button 103b, a history registering button 103c, a file registering button 103d, and a next step button 103e.

When detecting that the live image registering button 103b has been pressed in the state in which a live image is displayed in the master candidate image display region 103a, the master image registering section 23 registers the live image displayed in the master candidate image display region 103a as a master image. In addition, the history registering button 103c is operated to set an image that remains in image history as a master image. When the master image registering section 23 detects that the history registering button 103c has been pressed, the images captured in the past are displayed in the master candidate image display region 103a. From the images displayed in the master candidate image display region 103a, a desired image can be selected and registered as a master image. The images captured in the past may be automatically stored in the storage device 19 or may be stored through a storing operation by the user.

The file registering button 103d is operated to set an image stored in the storage device 19 as a master image. When detecting that the file registering button 103d has been pressed, the master image registering section 23 can read images stored in a particular folder of the storage device 19, display the images in the master candidate image display region 103a, select a desired image from the images as a master image, and register the master image.

The next step button 103e is operated when the master image has been registered. When detecting that the next step button 103e has been pressed, the master image registering section 23 shifts to the next process.

(Learning Setting User Interface)

Figure 8:
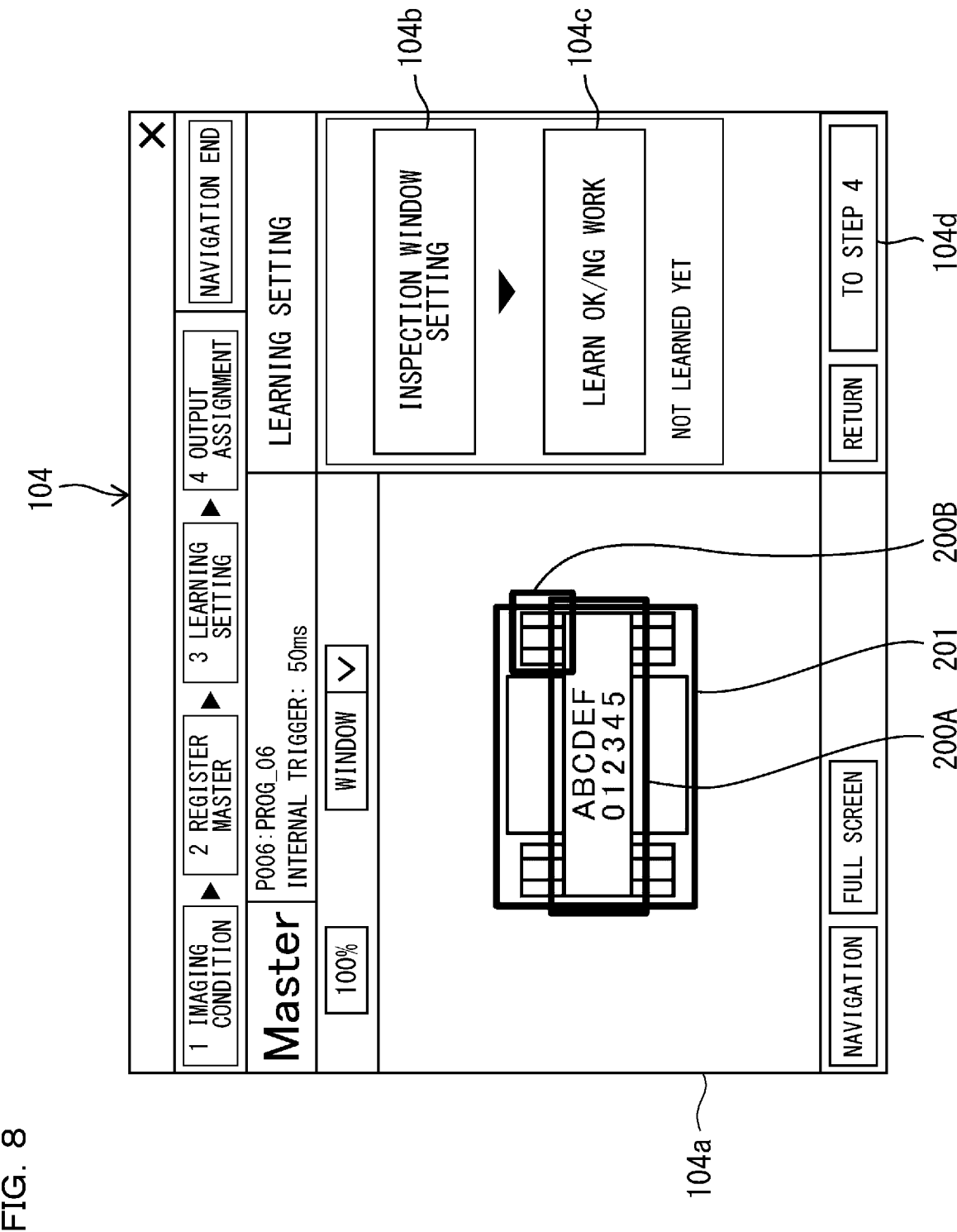
FIG. 8 illustrates a learning setting user interface.

FIG. 8 illustrates a learning setting user interface 104. When the master image has been registered and the next step button 103e illustrated in FIG. 7 has been pressed, the control unit 2 generates the learning setting user interface 104 and displays this interface in the display device 4. The learning setting user interface 104 includes a master image display region 104a in which the master image is displayed, an inspection window setting button 104b, a learning button 104c, and the next step button 104d. The next step button 104d is pressed to proceed to the next process.

(Structure of the Inspection Window Setting Section 27)

The inspection window setting section 27 illustrated in FIG. 3 receives the settings of learning inspection windows (learning-based inspection window) 200A and 200B for defining the range of difference detection on the master image registered by the master image registering section 23 in the setting mode in the learning inspection mode. When detecting that the inspection window setting button 104b illustrated in FIG. 8 has been pressed, the inspection window setting section 27 generates an inspection window setting user interface 105 illustrated in FIG. 9 and displays this interface in the display device 4. The settings of the learning inspection windows 200A and 200B are not essential. The learning inspection window 200A is the first learning-based inspection window and the learning inspection window 200B is the second learning-based inspection window.

The inspection window setting user interface 105 includes a master image display region 105a in which a master image is displayed, an inspection window adding button 105b, a position compensation adding button 105c, a position compensation display section 105d, a first inspection window display section 105e, a second inspection window display section 105f, and an OK button 105g. When detecting that the inspection window adding button 105b has been pressed, the inspection window setting section 27 puts the learning inspection windows 200A and 200B in a settable state. The learning inspection windows 200A and 200B may be set so as to surround the entire inspection target W in a master image or surround only a characteristic part of the inspection target W. The learning inspection windows 200A and 200B may be, for example, rectangular. When the rectangular ranges of the learning inspection windows 200A and 200B are assumed, the learning inspection windows 200A and 200B are superimposed on the master image in the master image display region 105a by dragging from obliquely upward corner to the obliquely downward corner via a touch operation. The positions, sizes, and shapes of the learning inspection windows 200A and 200B can be corrected.

Although the first learning inspection window 200A and the second learning inspection window 200B are set in this example, only one of these learning inspection windows may be set or three or more learning inspection windows may be set. A learning inspection window can be added by pressing the inspection window adding button 105b. The first inspection window display section 105e corresponds to the first learning inspection window 200A and the second inspection window display section 105f corresponds to the second learning inspection window 200B.

In addition, a position compensation window 201 for identifying the portion to be subjected to position compensation processing can be set by pressing the position compensation adding button 105c. The setting method for the position compensation window 201 may be the same as the setting method for the learning inspection windows 200A and 200B. An image in the position compensation window 201 is the target of position compensation processing and an image in the position compensation window 201 can be compensated to have a predetermined position and a predetermined posture by a conventionally known method.

Figure 9:
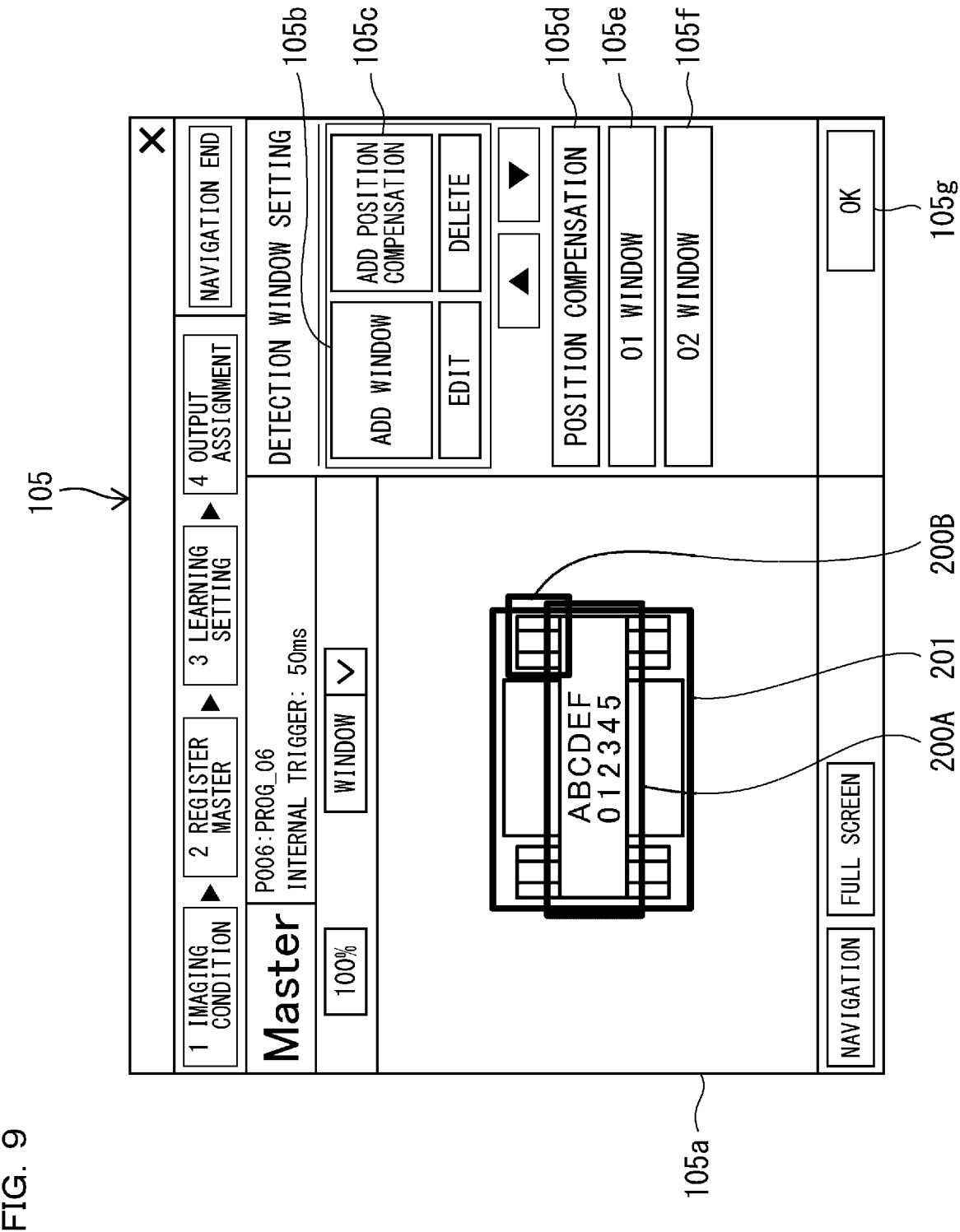
FIG. 9 illustrates an inspection window setting user interface.

When the OK button 105g of the inspection window setting user interface 105 illustrated in FIG. 9 is pressed, the learning setting user interface 104 illustrated in FIG. 8 is displayed in the display device 4. When the learning button 104c of the learning setting user interface 104 is pressed, the processing proceeds to learning image registration.

(Structure of the Learning Image Registering Section 24)

The learning image registering section 24 illustrated in FIG. 3 registers the non-defective product image to which the attribute of a non-defective product is given by the user and the defective product image to which the attribute of a defective product is given by the user in the setting mode in the learning inspection mode. A non-defective product image is an image obtained by imaging the inspection target W of a non-defective product and a defective product image is an image other than a non-defective product image. A non-defective product image and a defective product image are registered separately from the master image.

Figure 10:
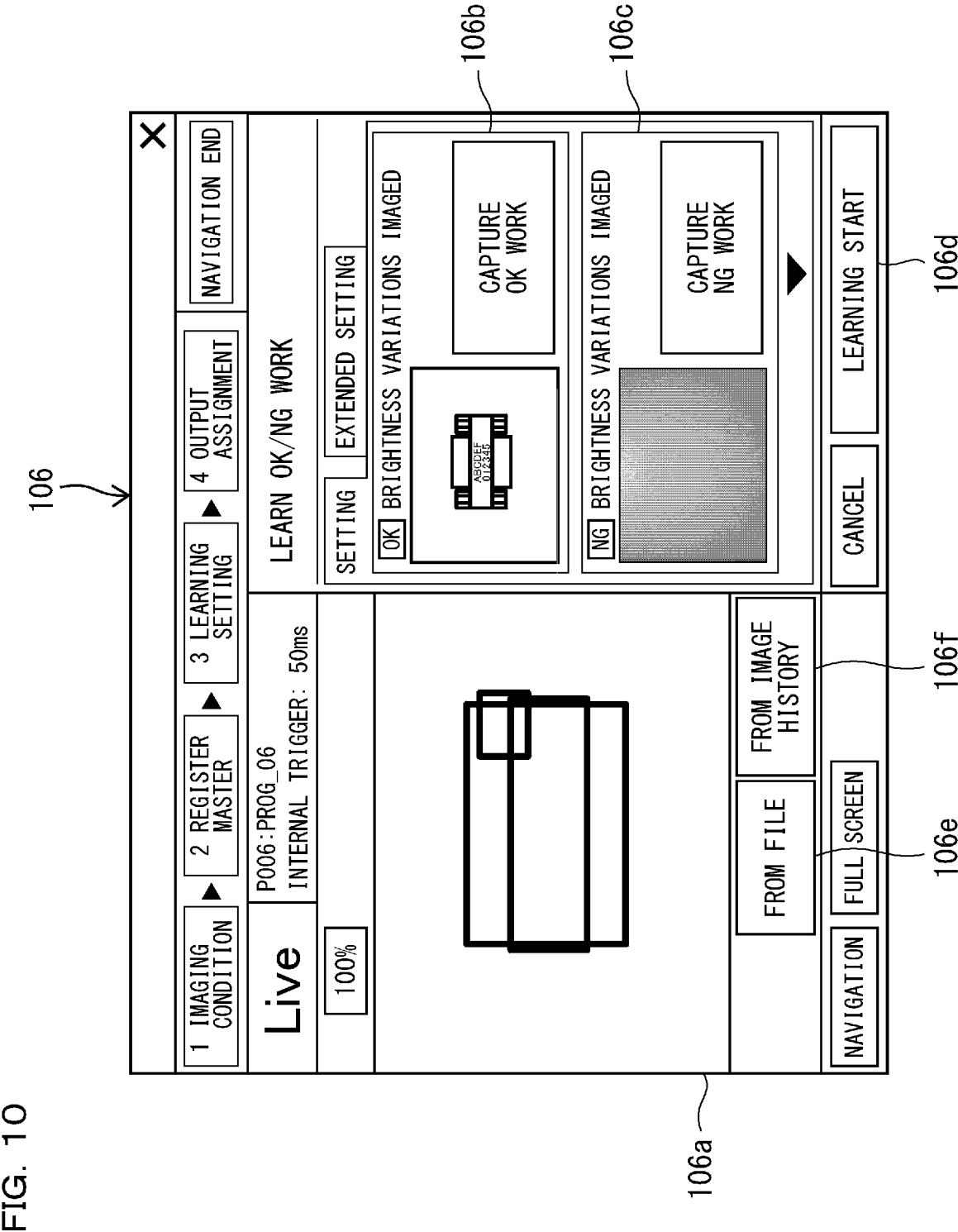
FIG. 10 illustrates a learning user interface.

When detecting that the learning button 104c of the learning setting user interface 104 illustrated in FIG. 8 of the learning setting user interface 104 illustrated in FIG. 8 has been pressed, the learning image registering section 24 displays a learning user interface 106 illustrated in FIG. 10 in the display device 4. The learning user interface 106 includes an image display region 106a in which the non-defective product image and the defective product image as learning images can be displayed, a non-defective product image obtaining operation section 106b, a defective product image obtaining operation section 106c, a learning start button 106d, and a file read button 106e, and a history read button 106f.

A live image can be displayed in the image display region 106a. When the non-defective product image obtaining operation section 106b is operated in the state in which a non-defective product image as a live image is displayed in the image display region 106a, the live image is registered as a non-defective product image. Similarly, when the defective product image obtaining operation section 106c is operated in the state in which a defective product image as a live image is displayed in the image display region 106a, the live image is registered as a defective product image. A plurality of non-defective product images and defective product images can be registered by repeating this operation.

When the file read button 106e is pressed, the image stored in a particular folder of the storage device 19 is displayed in the image display region 106a. When the non-defective product image obtaining operation section 106b is operated in the state in which the image displayed in the image display region 106a is a non-defective product image, the image is registered as a non-defective product image. Similarly, when the defective product image obtaining operation section 106c is operated in the state in which a defective product image read from the storage device 19 is displayed in the image display region 106a, the image is registered as a defective product image.

When the history read button 106f is pressed, the image captured in the past is displayed in the image display region 106a. If the non-defective product image obtaining operation section 106b is operated when the image displayed in the image display region 106a is a non-defective product image, the image is registered as a non-defective product image. Similarly, if the defective product image obtaining operation section 106c is operated when the defective image captured in the past is displayed in the image display region 106a, the image is registered as a defective product image.

The method for registering a non-defective product image is not limited to the method described above. For example, when the learning inspection mode and the setting mode are selected, the learning image registering section 24 may register, as non-defective product images, a plurality of images obtained by causing the image-capturing unit 3 to image the inspection target W a plurality of times while changing the imaging condition. The imaging condition may include, for example, the illumination condition and the exposure time. The non-defective product images obtained by causing the image-capturing unit 3 to image the inspection target W each time one or both of the illumination condition and the exposure time are changed can be learning images. The illumination condition is, for example, the amount of light emitted from the illumination module 15 or the like.

In addition, the learning image registering section 24 can also automatically generates and registers a plurality of non-defective product images based on the image obtained by causing the image-capturing unit 3 to image the inspection target W when the learning inspection mode and the setting mode are selected. The automatically generated image is an image (automatically generated non-defective product image) that is newly determined to be a non-defective product image and the number of such images may be one or more than one. For example, an automatically generated non-defective product image can be obtained by reading the non-defective product range (specifically, the brightness range) of the feature value contributing to the distinguishing of a non-defective product image from a defective product image and automatically generating an image having brightness that falls within the non-defective product range. Specifically, the darkest image and the brightest image in the non-defective product range can be generated by changing the brightness of a non-defective product image input in advance via image processing, and an image having intermediate brightness in the non-defective product range can also be generated. This enables the user to generate a plurality of non-defective product images without preparing a plurality of non-defective products. The automatically generated non-defective product images generated as described above may be registered so as to be used for learning described later. Automatically generated non-defective product images imaged by the image-capturing unit 3 and non-defective product images may be used for learning.

(Structure of the Distinguishing Device Generating Section 30)

The distinguishing device generating section 30 illustrated in FIG. 3 learns the non-defective product image and the defective product image registered by the learning image registering section 24 and generates the distinguishing device that distinguishes the non-defective product image from the defective product image in the setting mode in the learning inspection mode. When detecting that the learning start button 106d of the learning user interface 106 illustrated in FIG. 10 has been pressed, the distinguishing device generating section 30 reads the non-defective product image and the defective product image registered in the learning image registering section 24. The distinguishing device generating section 30 inputs the read non-defective product image and defective product image to the mechanical learning device including a plurality of layers.

Specifically, the distinguishing device generating section 30 has a neural network and may use a so-called deep learning method in which the initial value of the parameters of the neural network are determined in advance on a random basis, error of image recognition output from the neural network is fed back, and the parameters are adjusted, and may use a well-known genetic algorithm (GA), reinforcement learning, a neuro-fuzzy method, or the like. The user may be provided with a neural network having the adjusted parameters (that is, learned neural network) or the user may adjust the parameters. This neural network may have a plurality of pre-learned layers.

The feature values contributing to the distinguishing of a non-defective product image from a defective product image by the distinguishing device are, for example, the brightness, angle, color, shape, position, and the like, but feature values other than these may contribute to the distinguishing of a non-defective product image from a defective product image, so the feature values are not particularly limited.

Figure 11:
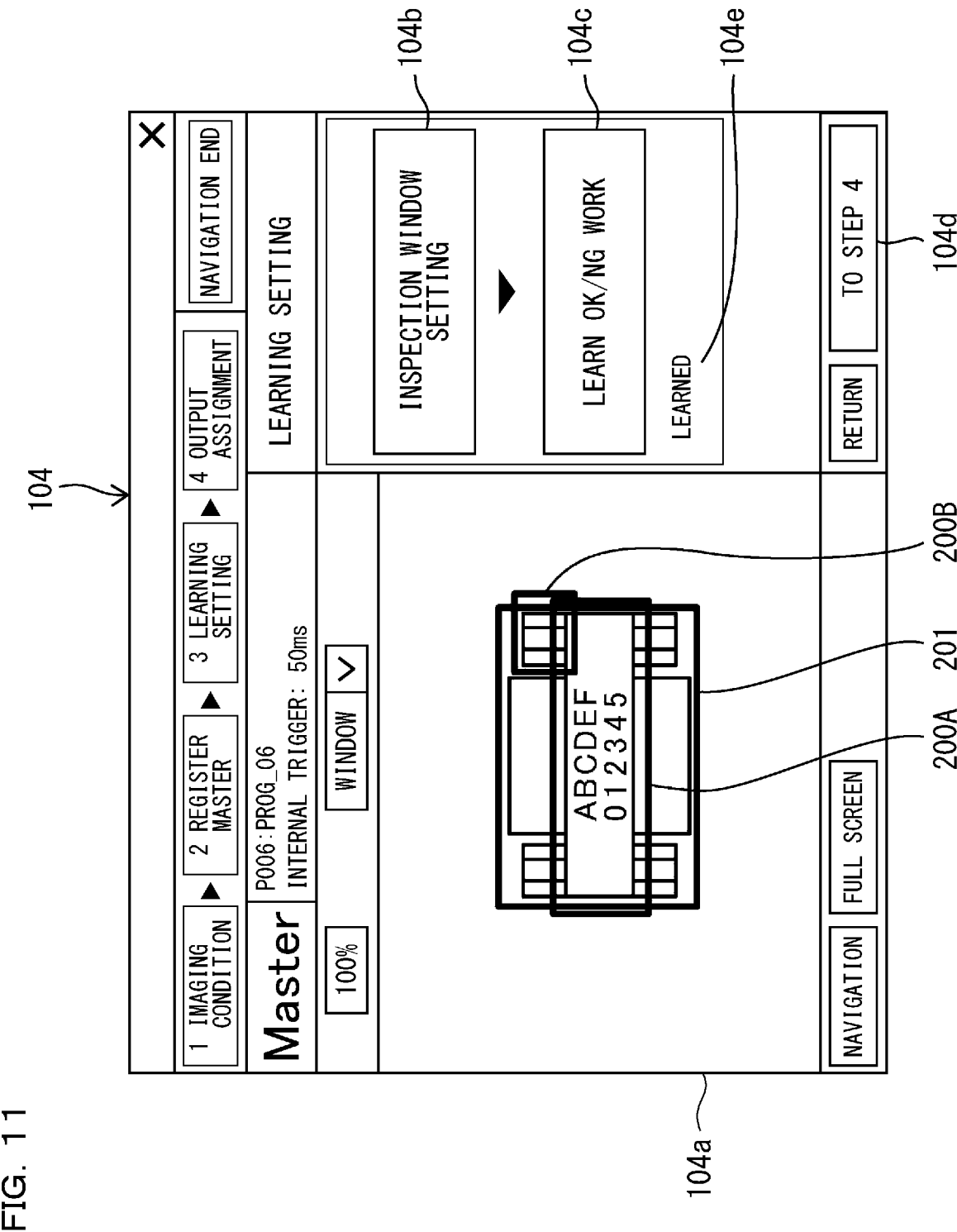
FIG. 11 illustrates the learning setting user interface after completion of learning.

When learning by the distinguishing device generating section 30 is completed, learned display 104e is displayed on the learning setting user interface 104 as illustrated in FIG. 11.

Figure 35:
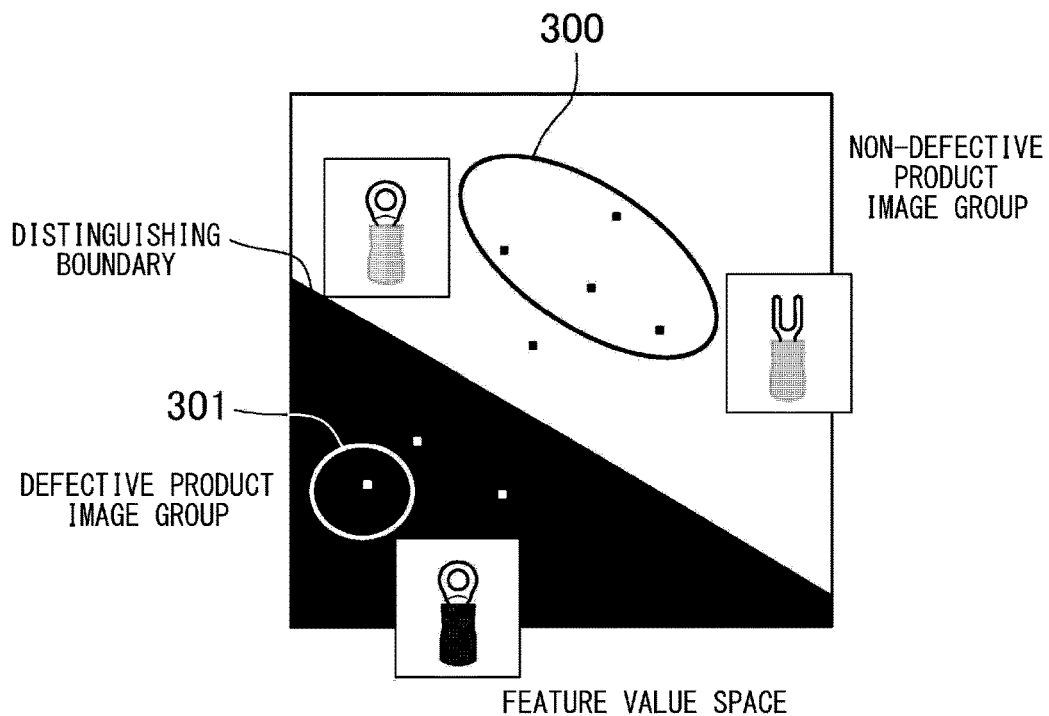
FIG. 35 schematically illustrates a feature value space in which a non-defective product image group and a defective product image group are plotted and a distinguishing boundary is generated.

In addition, the distinguishing device generating section 30 generates the distinguishing boundary between non-defective product images and defective product images in the feature value space as illustrated in, for example, FIG. 35 by inputting non-defective product images and defective product images to a neural network.

(Structure of the Image Processing Tool Selecting Section 25)

The setting procedure in the learning inspection mode has been described above. The following setting is made in the case of the standard inspection mode. First, the image processing tool selecting section 25 illustrated in FIG. 3 will be described. The image processing tool selecting section 25 functions when switching to the setting mode is performed by the mode switching section 29 and selection of the standard inspection mode is received by the inspection type selecting section 28 and may receive selection of the image processing tool. The image processing tool selecting section 25 generates an image processing tool user interface 107 illustrated in FIG. 12 and displays this interface on the display device 4 when the setting mode and the standard inspection mode are entered.

The image processing tool user interface 107 includes a master image display region 107a in which the master image is displayed, a tool display region 107b, and a next step button 107c. One selected image processing tool or a plurality of selected image processing tools may be displayed in the tool display region 107b. In the embodiment, a contour tool 107d, a color area tool 107e, and a width tool 107f are displayed in the tool display region 107b.

Figure 13:
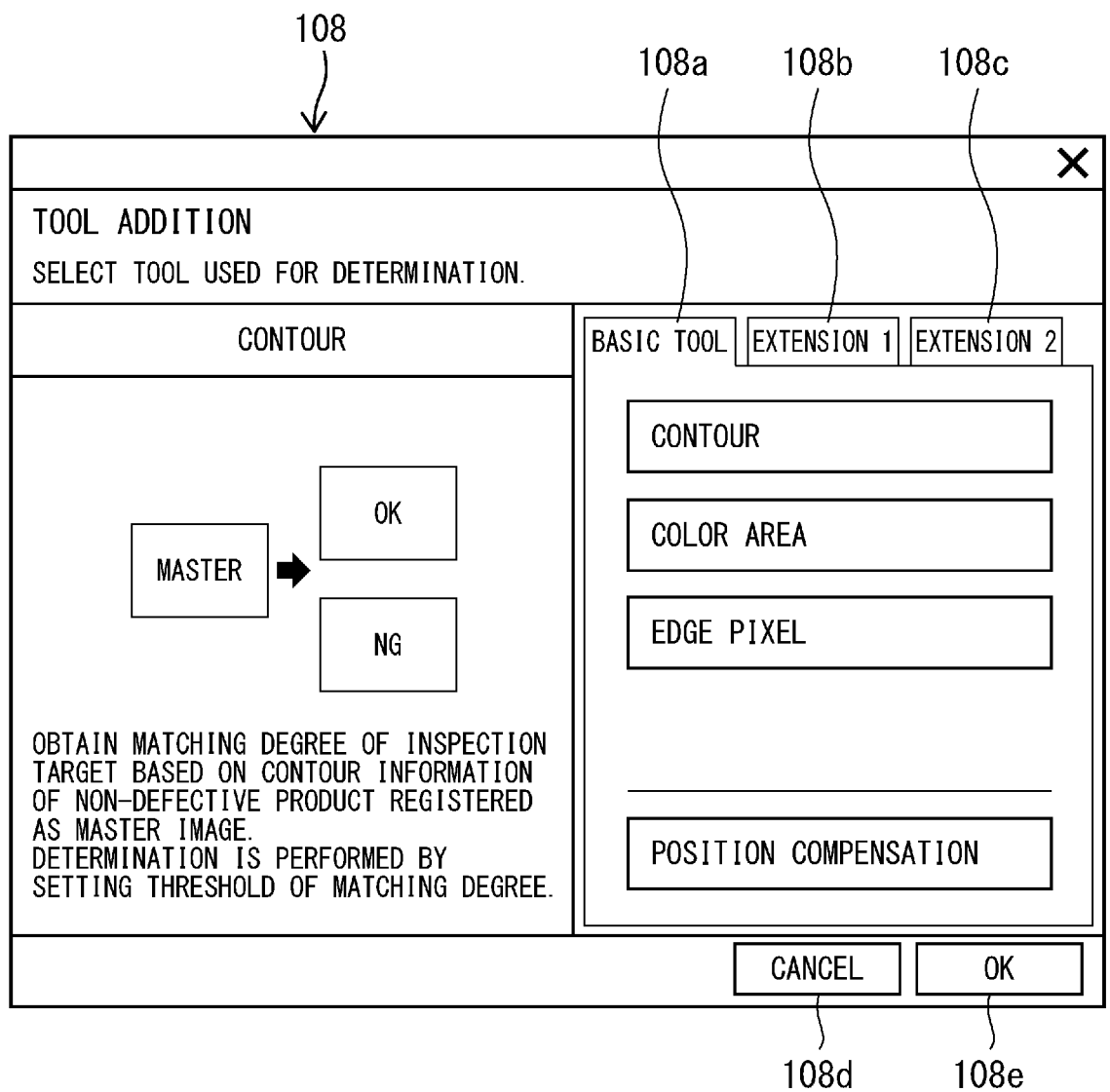
FIG. 13 illustrates an image processing tool selection user interface in which a basic tool tab is selected.
Figure 14:
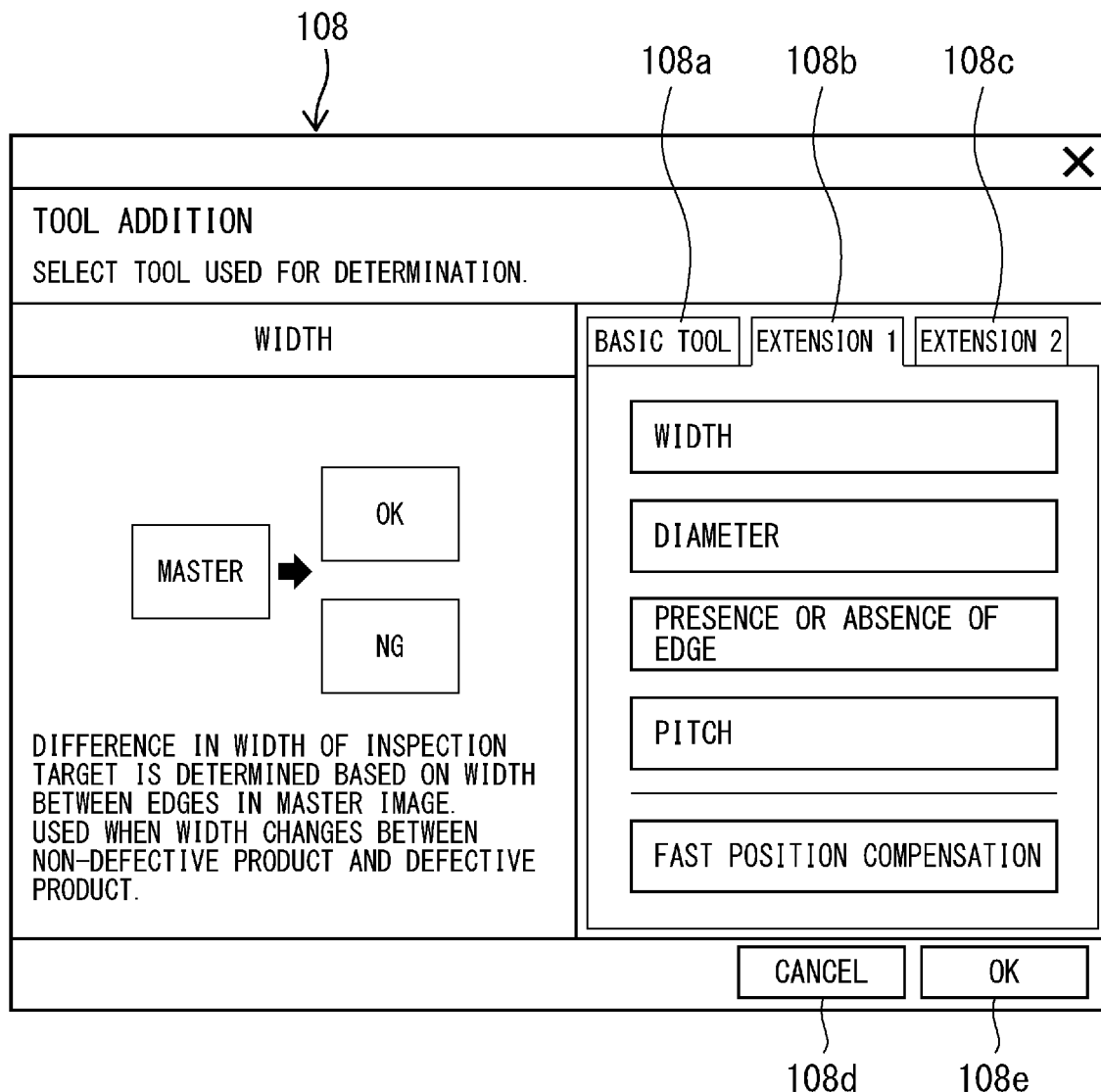
FIG. 14 illustrates the image processing tool selection user interface in which an expansion tab is selected.

The image processing tool user interface 107 includes a tool addition button 107g. When detecting that the tool addition button 107g has been pressed, the image processing tool selecting section 25 generates an image processing tool selection user interface 108 illustrated in FIG. 13 and displays this interface in the display device 4. The image processing tool selection user interface 108 includes a basic tool tab 108a, an extension 1 tab 108b, an extension 2 tab 108c, a cancel button 108d, and an OK button 108e. When the user selects the basic tool tab 108a, the image processing tools belonging to the basic tool tab 108a are listed as illustrated in FIG. 13. On the other hand, when the user selects the extension 1 tab 108b, the image processing tools belonging to the extension 1 tab 108b are listed as illustrated in FIG. 14. Although not illustrated, when the user selects the extension 2 tab 108c, the image processing tools are displayed similarly. The image processing tools are conventionally known and, for example, an edge extraction function extracts the edges of the inspection target W in an image, so that the inclination angle of a particular edge with respect to the X-axis, the length thereof, and the like can be used as feature values.

Figure 12:
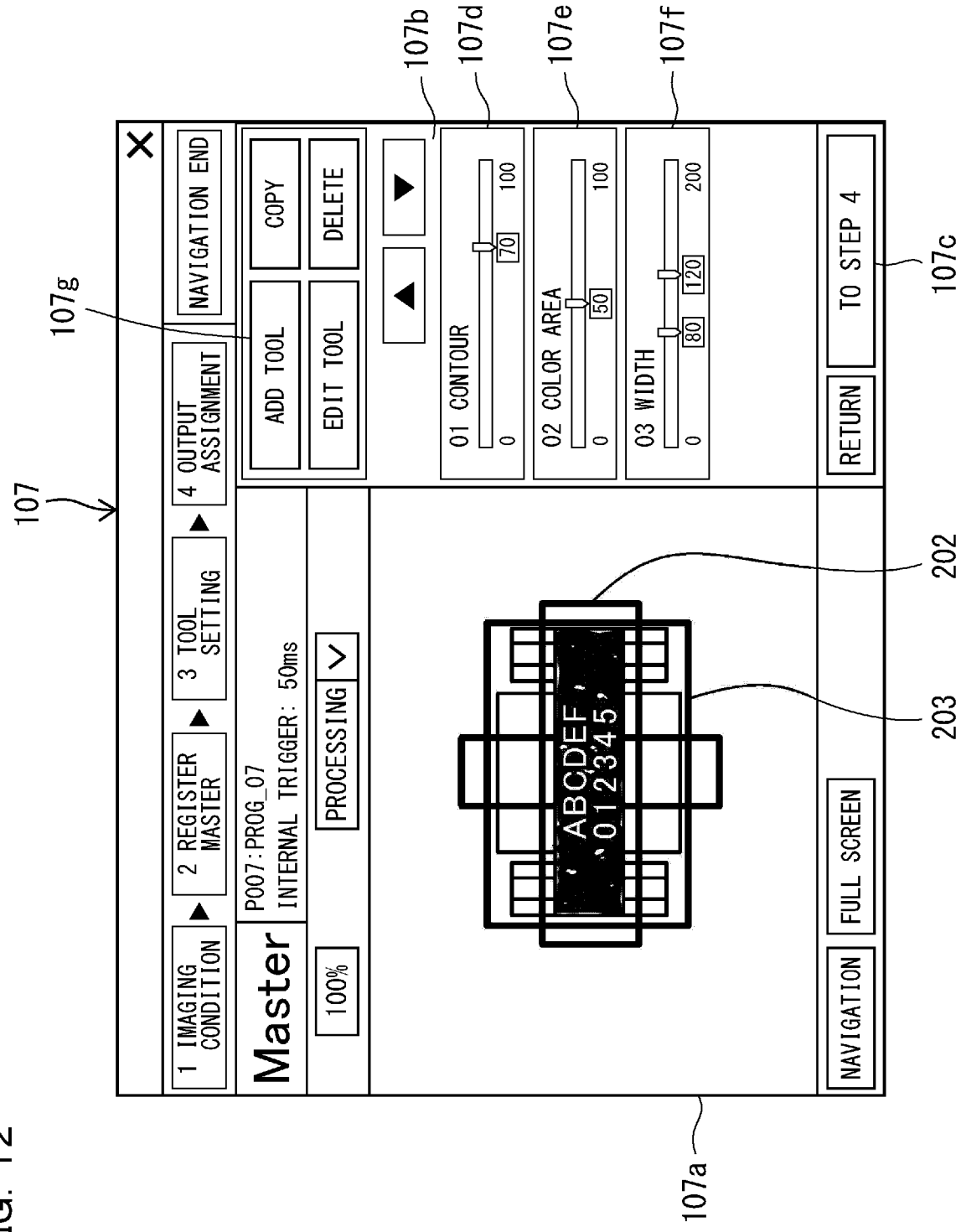
FIG. 12 illustrates an image processing tool user interface.

Any image processing tool can be selected from the image processing tools belonging to the basic tool tab 108a, the extension 1 tab 108b, and the extension 2 tab 108c. When detecting that the OK button 108e has been pressed after selecting the image processing tool, the selected image processing tool becomes valid and is displayed in the tool display region 107b of the image processing tool user interface 107 as illustrated in FIG. 12. In contrast, when detecting that the cancel button 108d of the image processing tool selection user interface 108 illustrated in FIGS. 13 and 14 has been pressed, the selection operation of the image processing tool is cancelled.

(Inspection Window Setting Section 27 in the Standard Inspection Mode)

The inspection window setting section 27 illustrated in FIG. 3 receives the setting of a standard inspection window (rule-based inspection window) for defining the range to which the image processing tool selected by the image processing tool selecting section 25 is applied on the master image registered by the master image registering section 23 in the setting mode in the standard inspection mode. As illustrated in FIG. 12, a standard inspection window 202 can be superimposed on a master image. The setting method for the standard inspection window 202 can be the same as the setting method for the inspection window in the learning inspection mode. In addition, a plurality of standard inspection windows 202 can be set. Furthermore, a position compensation window 203 can be set as in the learning inspection mode.

(Structure of the Parameter Adjusting Section 26)

The parameter adjusting section 26 illustrated in FIG. 3 receives the adjustment of the parameters of the image processing tool selected by the image processing tool selecting section 25 in the setting mode in the standard inspection mode. In the tool display region 107b of the image processing tool user interface 107 illustrated in FIG. 12, the image processing tool selected by the image processing tool selecting section 25 is displayed. A slide bar capable of adjusting the threshold, which is one parameter, is provided for each of the contour tool 107d, the color area tool 107e, and the width tool 107f. The thresholds can be adjusted by the slide bars or by inputting values. Parameters other than the threshold can be adjusted for each image processing tool and the parameters that can be adjusted by the parameter adjusting section 26 are not particularly limited.

(Output Assignment Operation)

When the control unit 2 detects that the next step button 104d of the learning setting user interface 104 illustrated in FIGS. 8 and 11 has been pressed or the next step button 107c of the image processing tool user interface 107 illustrated in FIG. 12 has been pressed, the processing proceeds to an output assignment process. When detecting that the next step button 104d or the next step button 107c has been pressed, the control unit 2 generates an output assignment user interface 109 illustrated in FIG. 15 and displays this interface in the display device 4.

The output assignment user interface 109 includes a setting region 109a for making output-related settings and a completion button 109b. In the setting region 109a, it is possible to make a plurality of output-related settings such as, for example, comprehensive determination, busy, and error settings. The completion button 109b is operated when output-related settings have been made. When detecting that the completion button 109b has been pressed, the control unit 2 ends setting mode and displays, for example, the startup time user interface 100 illustrated in FIG. 4 in the display device 4.

(Setting Method for the Image Inspection Apparatus 1)

As described above, when the setting mode is selected after a startup, selection of the setting of the learning inspection mode or the standard inspection mode is received and the received inspection mode can be set. Since the imaging condition is set and a master image is registered regardless of whether the learning inspection mode or the standard inspection mode is selected, the setting of the imaging condition and the registering of a master image are setting items common to the learning inspection mode and the standard inspection mode.

In the case of the setting of the learning inspection mode, when the imaging condition has been set and a master image has been registered, the detection window is set and a learning image is input and registered to generate the distinguishing device. In contrast, in the case of the standard inspection mode, when the imaging condition has been set and a master image has been registered, the image processing tool is selected and the parameters of the image processing tool are adjusted. After that, regardless of whether the learning inspection mode or the standard inspection mode is selected, the same output assignment is performed. Accordingly, the output assignment is also a setting item common to the learning inspection mode and the standard inspection mode.

Figure 16:
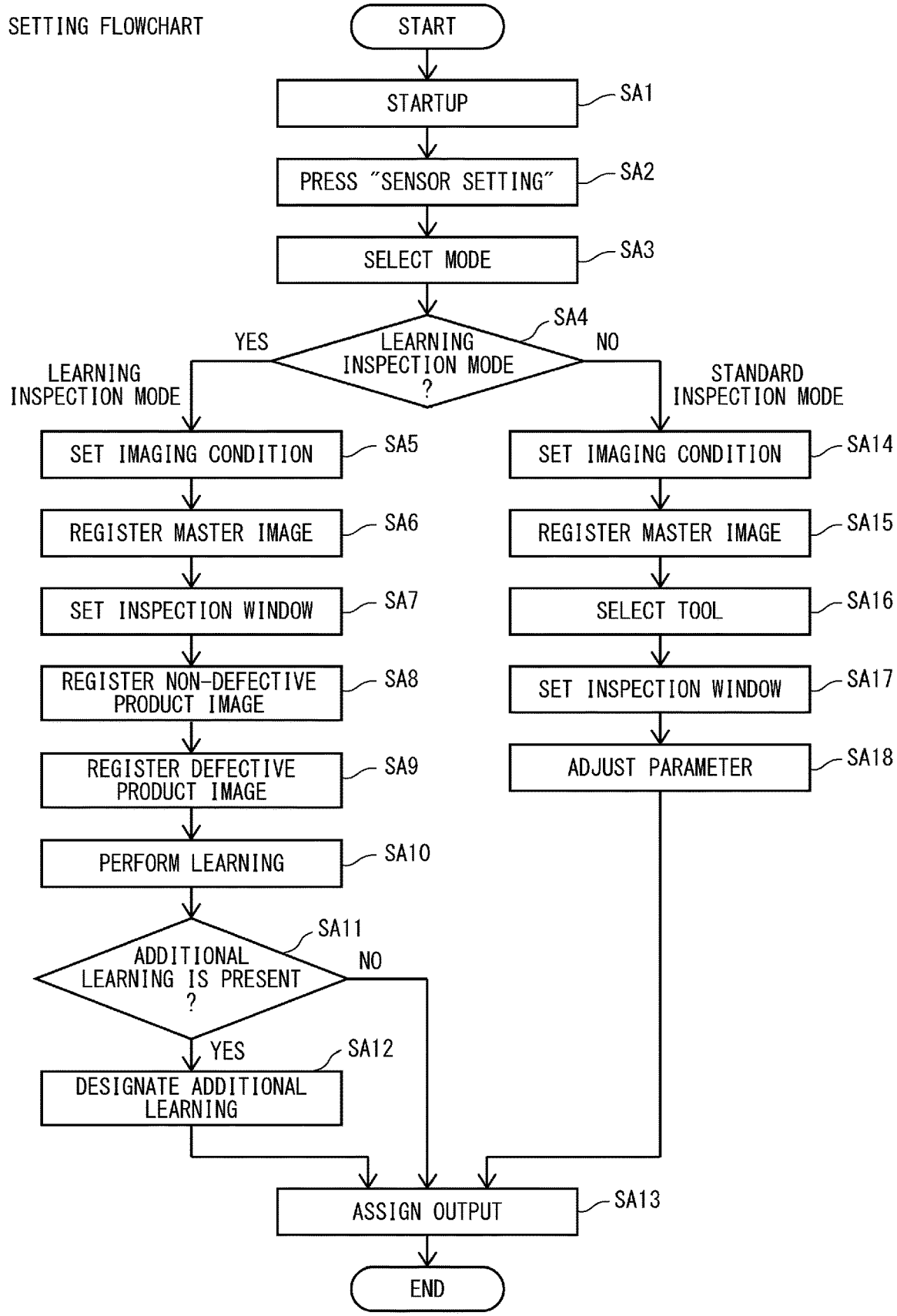
FIG. 16 is a flowchart illustrating a setting procedure for the image inspection apparatus.

An example of the setting method for the image inspection apparatus 1 will be described with reference to the flowchart illustrated in FIG. 16. Step SA1 that follows START is a startup operation such as, for example, the turn-on of a power supply. In step SA1, the startup time user interface 100 illustrated in FIG. 4 is displayed in the display device 4. In step SA2, the sensor setting button 100a of the startup time user interface 100 is pressed. When the sensor setting button 100a is pressed, the processing proceeds to step SA3 and the inspection type selection user interface 101 illustrated in FIG. 5 is displayed in the display device 4. In step SA4, a determination is made as to whether the inspection mode selected in the inspection type selection user interface 101 is the learning inspection mode. Steps SA1 to SA4 are common to the learning inspection mode and the standard inspection mode.

When the learning inspection mode selecting button 101a of the inspection type selection user interface 101 illustrated in FIG. 5 is pressed, the processing proceeds to step SA5. In step SA5, since the imaging condition setting user interface 102 illustrated in FIG. 6 is displayed in the display device 4, the user sets the imaging condition. This is the imaging condition setting step. When step SA5 is completed, the processing proceeds to step SA6 and the master image registering user interface 103 illustrated in FIG. 7 is displayed in the display device 4. This step is the master image registering step of registering, as a master image, the image captured under the imaging condition set in step SA5. After that, since the learning setting user interface 104 illustrated in FIG. 8 is displayed in the display device 4 when the processing proceeds to step SA7, the inspection window setting button 104b is pressed to set the inspection window. When the learning button 104c is pressed after the inspection window is set, the processing proceeds to step SA8. In step SA8, the learning user interface 106 illustrated in FIG. 10 is displayed in the display device 4. This can register a non-defective product image as a learning image. In addition, in step SA9, the defective product image as a learning image can be registered on this user interface 106. Step SA8 may be exchanged with step SA9. Step SA8 and step SA9 are learning image registering steps.

Next, the processing proceeds to step SA10. Step SA10 is started when the learning start button 106d of the learning user interface 106 illustrated in FIG. 10 is pressed. Step SA10 is a distinguishing device generating step of learning a non-defective product image and a defective product image and generating the distinguishing device that distinguishes the non-defective product image from the defective product image.

Although not essential, additional learning may also be performed in step SA11 and step SA12. If the user determines that additional learning is necessary, the user proceeds to step SA12 from step SA11, registers another non-defective product image and another defective product image and causes the distinguishing device generating section 30 to learn the images. When the learning is completed, the learning setting user interface 104 illustrated in FIG. 11 is displayed in the display device 4.

Figure 15:
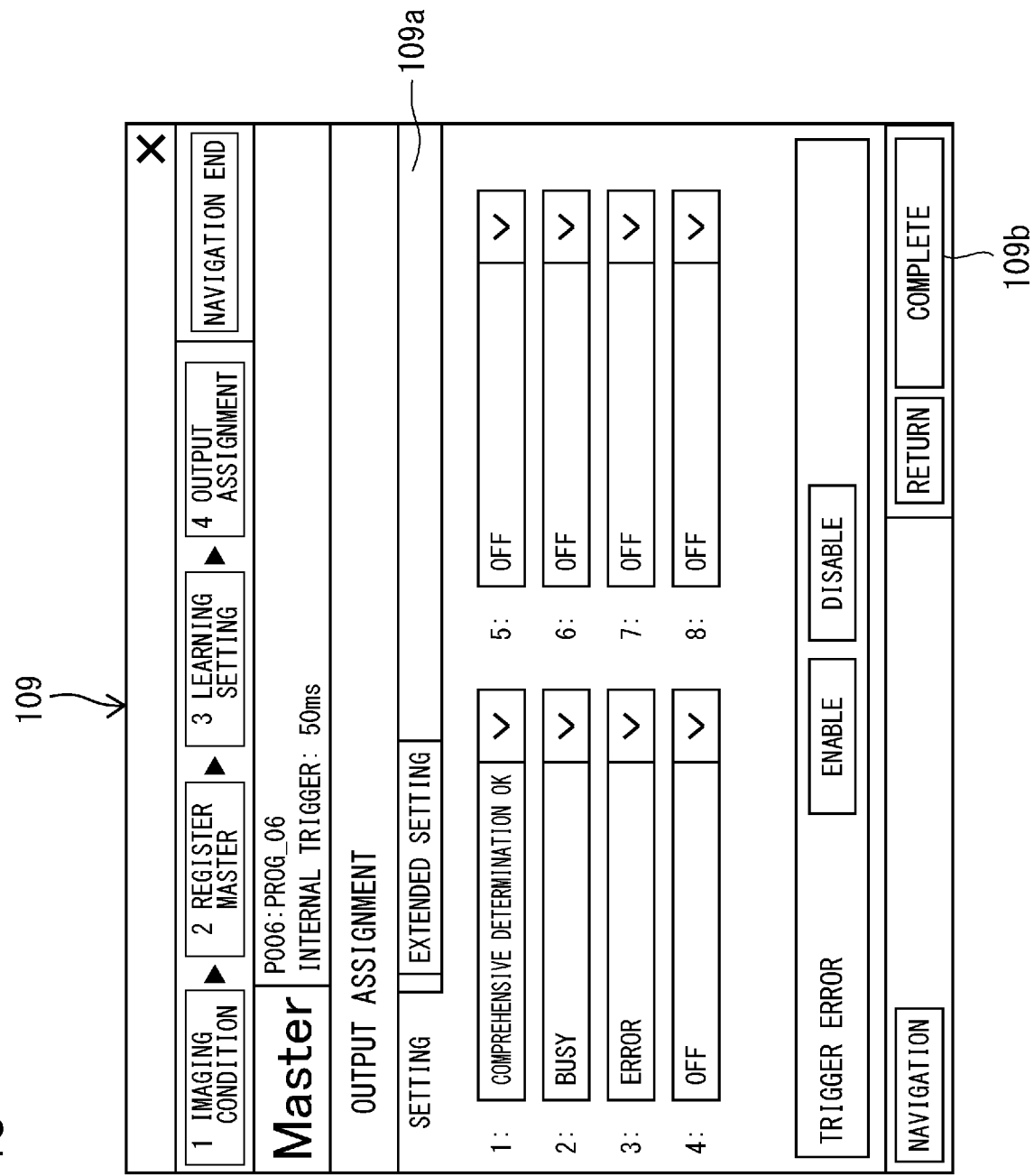
FIG. 15 illustrates an output assignment user interface.

After that, the processing proceeds to step SA13. In step SA13, the output assignment user interface 109 illustrated in FIG. 15 is displayed in the display device 4, so that output-related settings can be made.

In contrast, when step SA4 produces a "NO" result and the standard inspection mode is selected, the processing proceeds to step SA14. Step SA14 is the same as step SA5. In addition, step SA15, which is the subsequent step, is the same as step SA6. Although step SA5 and step SA6 may be described separately from step SA14 and step SA15 in this flowchart, step SA5 and step SA14 may be described as the same step because they are identical and step SA6 and step SA15 may be described as the same step because they are identical.

After that, when the processing proceeds to step SA16, the image processing tool user interface 107 illustrated in FIG. 12 is displayed in the display device 4, so that the image processing tool can be selected. This is the image processing tool selecting step.

After the image processing tool is selected, the processing proceeds to step SA17. In step SA17, the user sets the inspection window for defining the range to which the image processing tool selected in the image processing tool selecting step (step SA16) is applied on the master image registered in the master image registering step (step SA15). This is the inspection window setting step.

When the inspection window has been set, the processing proceeds to step SA18. In step SA18, the parameters of the image processing tool selected in the image processing tool selecting step (step SA16) are adjusted. This is the parameter adjusting step. After that, the processing proceeds to step SA13 and output-related settings are made. As described above, the setting of the learning inspection mode and the setting of the standard inspection mode can be made.

(Structure of the Pass/Fail Determining Section 31)

Next, the part related to the run mode will be described. When the standard inspection mode is selected by the inspection type selecting section 28 in the run mode, the pass/fail determining section 31 illustrated in FIG. 3 makes a pass/fail determination of the inspection target W by setting the standard inspection window on the image newly captured by the image-capturing unit 3 and applying the image processing tool selected by the image processing tool selecting section 25 to the image in the standard inspection window. In contrast, when the learning inspection mode is selected by the inspection type selecting section 28, the pass/fail determining section 31 makes a pass/fail determination of the inspection target W by inputting the image newly captured by the image-capturing unit 3 to the distinguishing device. When the learning inspection mode is selected, the range of difference detection may be defined by setting the learning inspection window.

Figure 17:
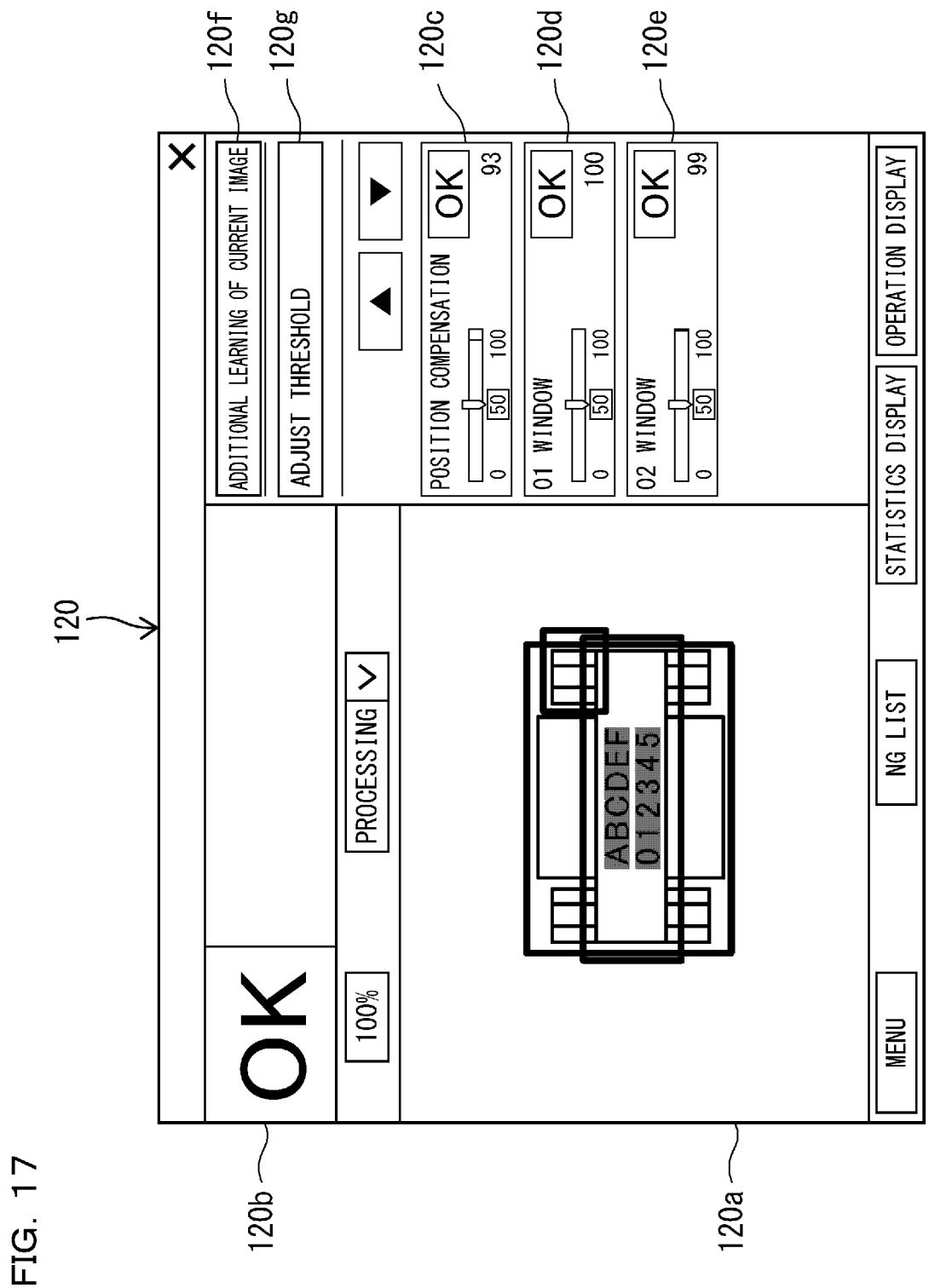
FIG. 17 illustrates a run mode user interface.

When the plurality of learning inspection windows is set as illustrated in FIG. 17, the pass/fail determining section 31 makes a pass/fail determination for each of the learning inspection windows. That is, the pass/fail determining section 31 determines whether the image in the learning inspection window 200A is a non-defective product image or a defective product image, determines whether the image in the learning inspection window 200B is a non-defective product image or a defective product image, and outputs the determination results individually. The pass/fail determining section 31 outputs the comprehensive determination result in consideration of a plurality of determination results. When the plurality of determination results is the same, this result may be the comprehensive determination result. When the determination results are different from each other, the comprehensive determination result may be a defective product image.

The pass/fail determining section 31 generates a run mode user interface 120 illustrated in FIG. 17 and displays this interface in the display device 4. The run mode user interface 120 is included in the run mode screen. The run mode user interface 120 includes an image display region 120a in which an inspection target image is displayed, a comprehensive determination result display region 120b, a position compensation result display region 120c, a first inspection window result display region 120d, a second inspection window result display region 120e, an additional learning button 120f, and a threshold adjusting button 120g.

The inspection target image newly captured by the image-capturing unit 3 in the run mode is displayed in the image display region 120a. In the comprehensive determination result display region 120b, whether the inspection target image displayed in the image display region 120a is a non-defective product image or a defective product image is displayed. Specifically, "OK" is displayed when the inspection target image is a non-defective product image or "NG" is displayed when the inspection target image is a defective product image. However, any display form may be adopted as long as the user can determine the inspection target image is a non-defective product image or a defective product image. Since the image display region 120a and the comprehensive determination result display region 120b are provided on the same run mode user interface 120, the inspection target image may be displayed together with the result of the pass/fail determination in the display device 4 in the run mode.

The position compensation result display region 120c indicates the result obtained by applying position compensation to the inspection target W included in the inspection target image. The position compensation result display region 120c indicates whether position compensation has been performed normally or position compensation has failed separately from the comprehensive determination result. The first inspection window result display region 120d indicates the result of a pass/fail determination of the image in the learning inspection window 200A and the second inspection window result display region 120e indicates the result of a pass/fail determination of the image in the learning inspection window 200B. In addition, the threshold adjusting button 120g adjusts the threshold of a pass/fail determination and, when the threshold has been adjusted, the pass/fail determining section 31 makes a pass/fail determination based on the changed threshold.

The additional learning button 120f is operated to additionally learn the inspection target image displayed in the image display region 120a as described later.

In addition, the pass/fail determining section 31 makes a pass/fail determination of the inspection target W using the image processing tool in the run mode in the standard inspection mode. A pass/fail determination of the inspection target W may be made by comparing, for example, the color, edge, position, and the like with the thresholds designated by the user. The result of the pass/fail determination can be displayed on the user interface as in the learning inspection mode.

(Structure of the Additional Learning Image Designating Section 32)

Figure 18:
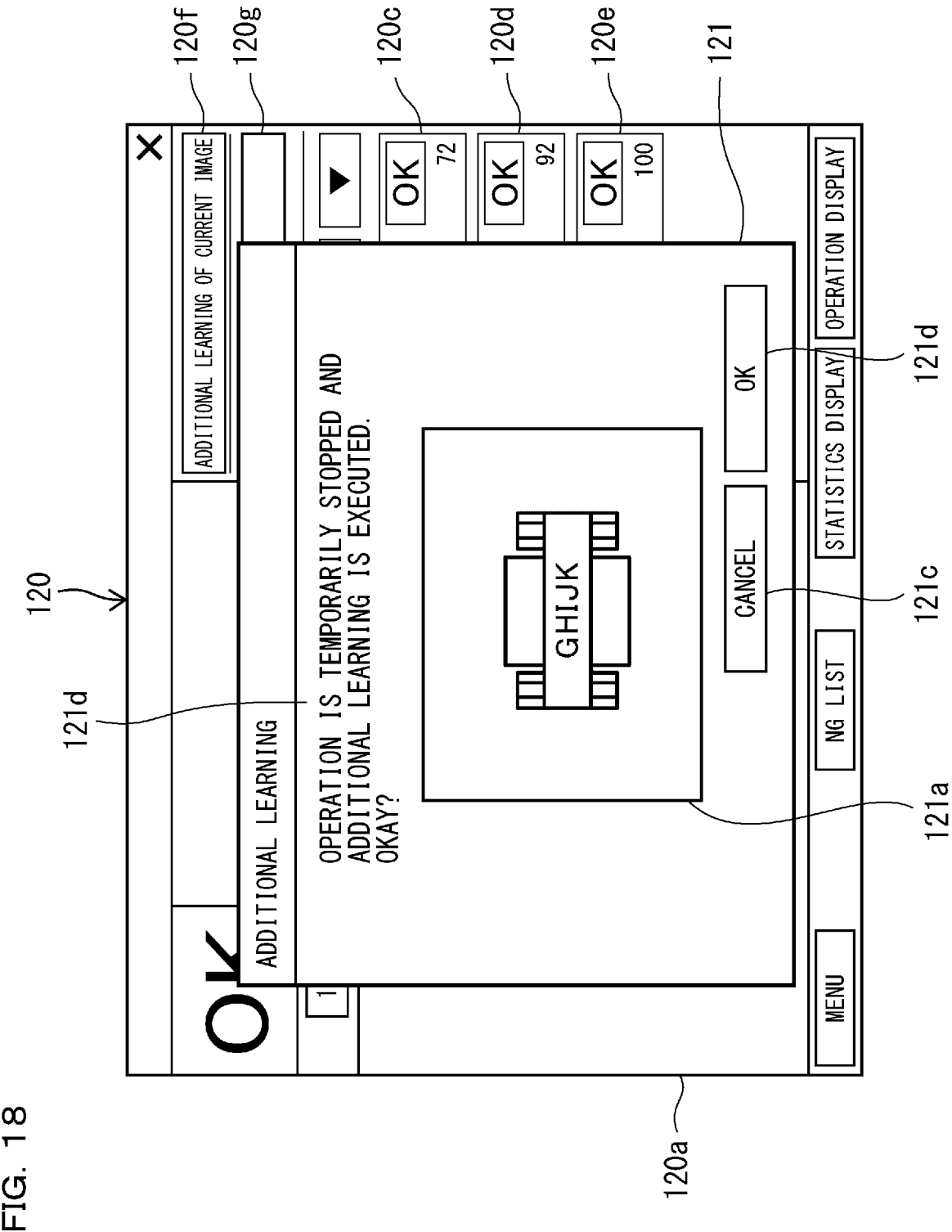
FIG. 18 is a diagram equivalent to FIG. 17 in which an interruption screen for additional learning is illustrated.

The additional learning image designating section 32 illustrated in FIG. 3 receives designation as to whether the inspection target image displayed on the run mode screen in the learning inspection mode is additionally learned as a non-defective product image or a defective product image. When detecting that the additional learning button 120f of the run mode user interface 120 illustrated in FIG. 17 has been pressed, the additional learning image designating section 32 generates an interruption screen 121 illustrated in FIG. 18 and displays this screen in a predetermined position in the run mode user interface 120. Depression of the additional learning button 120f means that designation for additionally learning the inspection target image as a non-defective product image or a defective product image has been performed. When this designation has been received, the pass/fail determining section 31 temporarily stops the pass/fail determination processing, that is, the run mode.

The interruption screen 121 includes an image display region 121a in which the image to be additionally learned is displayed, a message display region 121b, a cancel button 121c, and an OK button 121d. The image displayed in the image display region 121a is the current inspection target image displayed in the image display region 120a of the run mode user interface 120 illustrated in FIG. 17. The message display region 121b indicates a message for notifying the user of a temporary stop of the run mode. That is, when receiving the designation of an additional learning image, the display device 4 can notify the user of a temporary stop of the run mode. The notification form described above is not limited to a message and another form may be used.

The cancel button 121c cancels additional learning. When detecting that the cancel button 121c has been pressed, the additional learning image designating section 32 deletes the interruption screen 121 without learning the image displayed in the image display region 121a and displays the run mode user interface 120 illustrated in FIG. 17 in the display device 4.

The OK button 121d is used to execute additional learning. When detecting that the OK button 121d has been pressed, the additional learning image designating section 32 instructs the distinguishing device generating section 30 to learn the image displayed in the image display region 121a.

(Additional Learning Processing)

The distinguishing device generating section 30 illustrated in FIG. 3 additionally learns, as a non-defective product image or a defective product image, the inspection target image added as the additional learning target by the additional learning image designating section 32 and updates the distinguishing device. When detecting that the additional learning image designating section 32 has designated the image of the additional learning target, the distinguishing device generating section 30 generates an additional learning user interface 122 illustrated in FIG. 19 and displays this interface in the display device 4. The additional learning user interface 122 includes an image display region 122a in which the inspection target image designated as the additional learning target is displayed, a first inspection window learning instruction region 122b, a second inspection window learning instruction region 122c, a cancel button 122d, and an additional learning start button 122e. The first inspection window learning instruction region 122b is the region for designating whether the image in the range defined in the learning inspection window 200A is additionally learned as a non-defective product image or a defective product image. When "NG" is selected, the image in the range defined in the learning inspection window 200A is learned as a defective product image. When "OK" is selected, the image in the range defined in the learning inspection window 200A is learned as a non-defective product image. In addition, the second inspection window learning instruction region 122c is the region for designating whether the image in the range defined in the learning inspection window 200B is additionally learned as a non-defective product image or a defective product image.

When "NG" is selected, the image in the range defined in the learning inspection window 200B is learned as a defective product image. When "OK" is selected, the image in the range defined in the learning inspection window 200B is learned as a non-defective product image. As described above, the image in the range defined in the learning inspection window 200A and the image in the range defined in the learning inspection window 200B can be learned individually. It is also possible to receive an instruction for learning either the image in the range defined in the learning inspection window 200A or the image in the range defined in the learning inspection window 200B.

Figure 19:
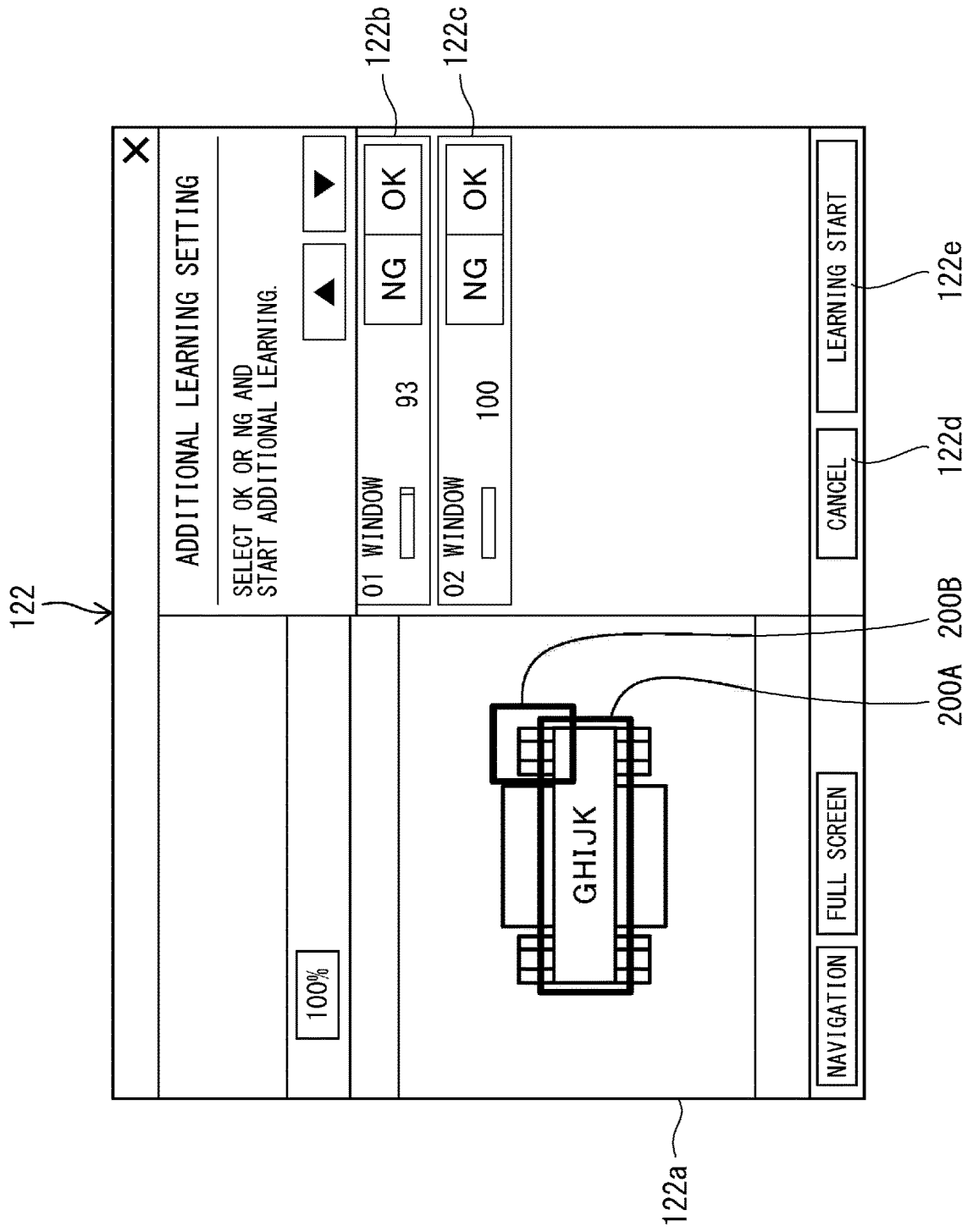
FIG. 19 illustrates an additional learning user interface.

When detecting that the cancel button 122d has been pressed, since the distinguishing device generating section deletes the additional learning user interface 122 illustrated in FIG. 19 without executing additional learning and returns to the run mode user interface 120 illustrated in FIG. 17, the distinguishing device is not updated. In contrast, when detecting that the additional learning start button 122e has been pressed (start operation of additional learning), the distinguishing device generating section 30 starts additional learning and the distinguishing device is updated. Execution of the additional learning updates, for example, the distinguishing boundary in the feature value space illustrated in FIG. 35.

(Storing of a History Image)

The storage device 19 illustrated in FIG. 2 stores, as history images, a plurality of inspection target images subjected to a pass/fail determination by the pass/fail determining section 31 illustrated in FIG. 3 together with the results of the pass/fail determination. The inspection target images subjected to a pass/fail determination by the pass/fail determining section 31 are stored in an operation image history folder. For example, the inspection target image displayed in the image display region 120a of the run mode user interface 120 illustrated in FIG. 17 and the comprehensive determination result displayed in the comprehensive determination result display region 120b can be stored in the storage device 19 in the state in which the image and the result are associated with a common ID number or the like. At this time, the inspection target image displayed in the image display region 120a, the result displayed in the position compensation result display region 120c, the result displayed in the first inspection window result display region 120d, and the result displayed in the second inspection window result display region 120e may be stored in the storage device 19 in the state in which they are associated with each other.

In addition, the storage device 19 may be provided with a learning image history folder. The learning image history folder stores the non-defective product images and defective product images used for learning by the distinguishing device generating section 30.

Figure 20:
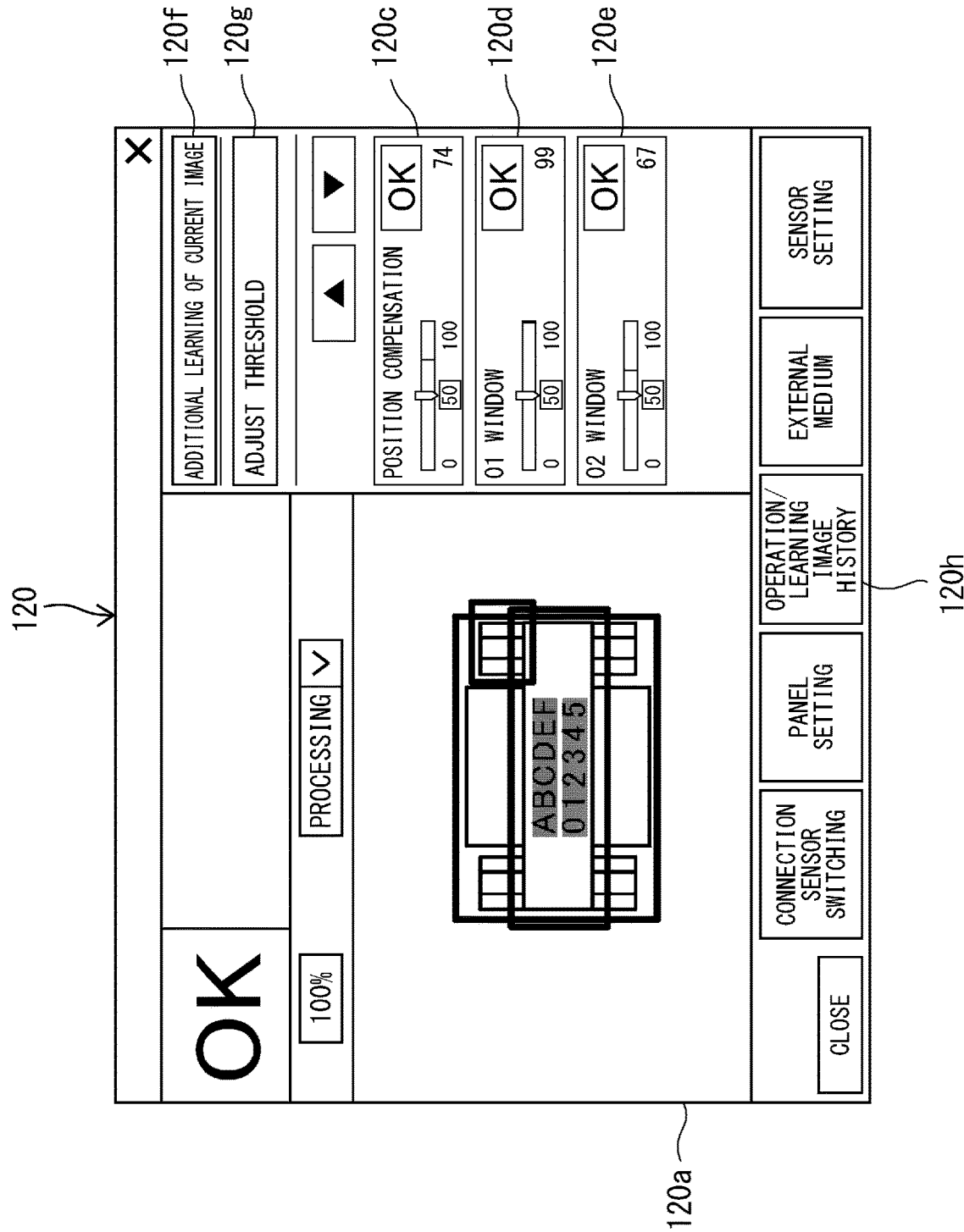
FIG. 20 illustrates the run mode user interface in which a menu is displayed.
Figure 21:
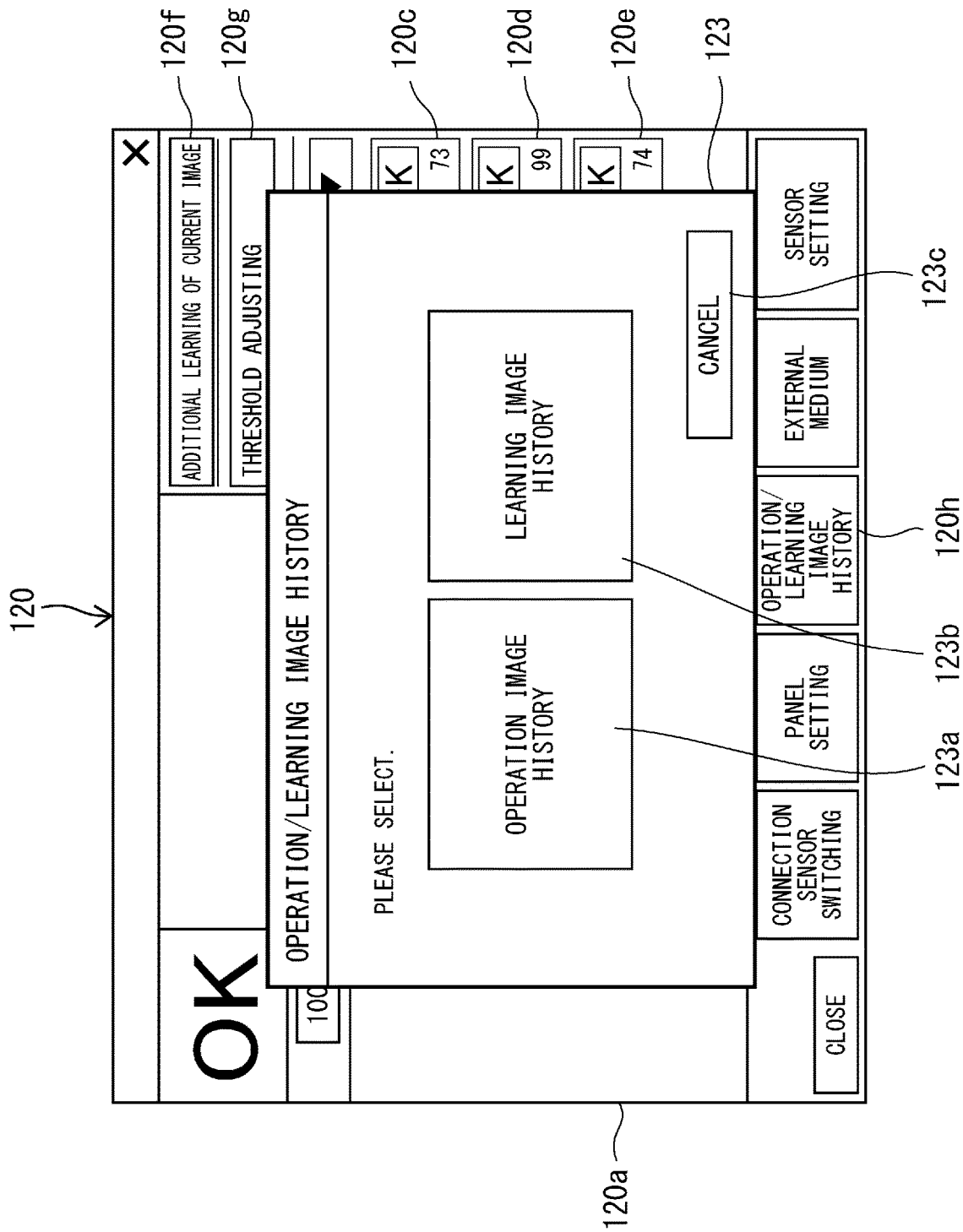
FIG. 21 is a diagram equivalent to FIG. 20 in which an interruption screen for history type selection is illustrated.

As illustrated in FIG. 20, a menu can may be displayed in the lower portion of the run mode user interface 120. The menu of the run mode user interface 120 includes an operation/learning image history button 120h. When detecting that the operation/learning image history button 120h has been pressed, the control unit 2 generates a history type selection interruption screen 123 and displays this screen in a predetermined position in the run mode user interface 120, as illustrated in FIG. 21. The history type selection interruption screen 123 includes an operation image history button 123a, a learning image history button 123b, and a cancel button 123c. The operation image history button 123a is operated to display the inspection target image subjected to a pass/fail determination that is stored in the operation image history folder of the storage device 19. When detecting that the operation image history button 123a has been pressed, the control unit 2 generates an operation image history display user interface 124 illustrated in FIG. 22 and displays this interface in the display device 4.

The operation image history display user interface 124 includes an image display region 124a in which a plurality of inspection target images subjected to a pass/fail determination is listed, an additional learning designating button 124b, a return button 124c, an image detail button 124d, and a learning candidate image button 124e. The inspection target images and the results of a pass/fail determination are stored in the image display region 124a in the state in which the images are associated with the results. The images stored in the image display region 124a may be selected by, for example, a selection operation by the user. When detecting that the image detail button 124d has been pressed in the state in which any of the images displayed in the image display region 124a is selected, the control unit 2 generates a selected image display user interface 125 illustrated in FIG. 23 and displays this interface in the display device 4. The selected image display user interface 125 includes an image display region 125a in which the images selected by the operation image history display user interface 124 are displayed, a position compensation result display region 125c, a first inspection window result display region 125d, a second inspection window result display region 125e, an additional learning execution button 125f, and a return button 125g. When detecting that the additional learning execution button 125f has been pressed, the control unit 2 instructs the distinguishing device generating section 30 to additionally learn the image displayed in the image display region 125a. When detecting that the return button 125g has been pressed, the control unit 2 displays the operation image history display user interface 124 illustrated in FIG. 22 in the display device 4. By repeating this operation, the distinguishing device generating section 30 can additionally learn a plurality of history images.

Figure 24:
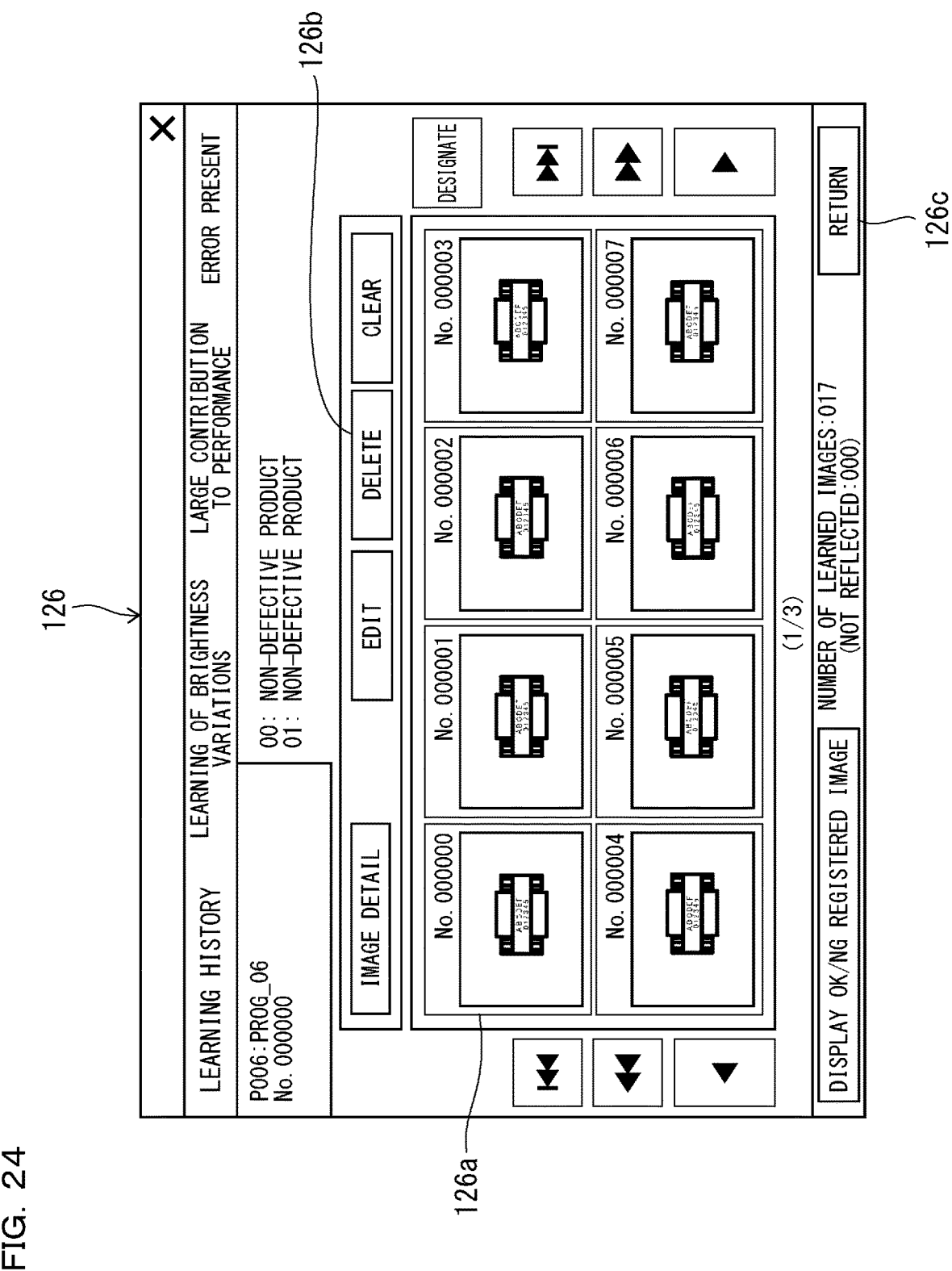
FIG. 24 illustrates a learning image history display user interface in which an image used for learning is displayed.
Figure 25:
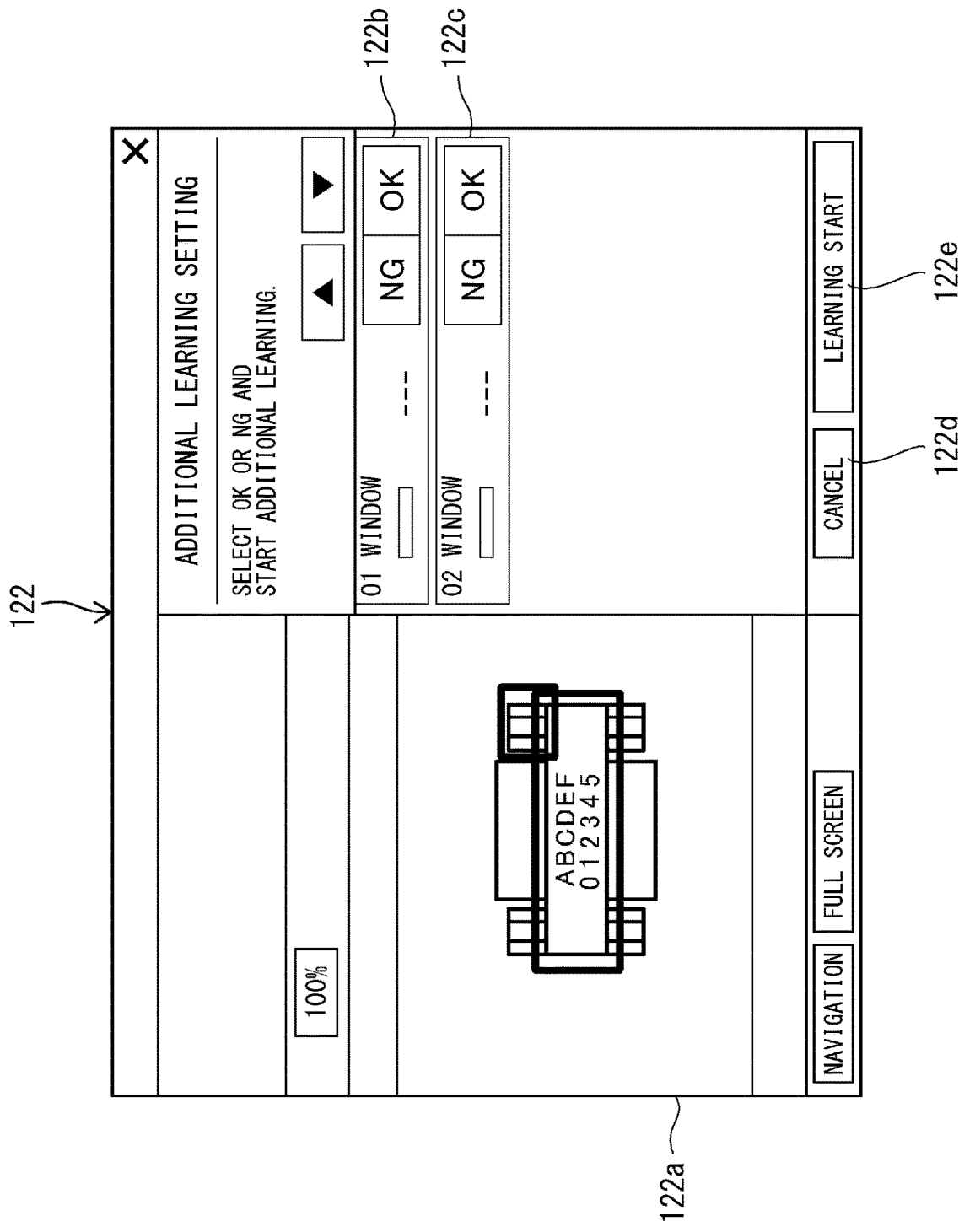
FIG. 25 is a diagram equivalent to FIG. 19 in which a different additional learning image is illustrated.

When detecting that the additional learning designating button 124b has been pressed, the control unit 2 generates the additional learning user interface 122 illustrated in FIG. 24 and displays this interface in the display device 4. The additional learning user interface 122 illustrated in FIG. 25 is different from the additional learning user interface 122 illustrated in FIG. 19 in additional learning image.

Figure 22:
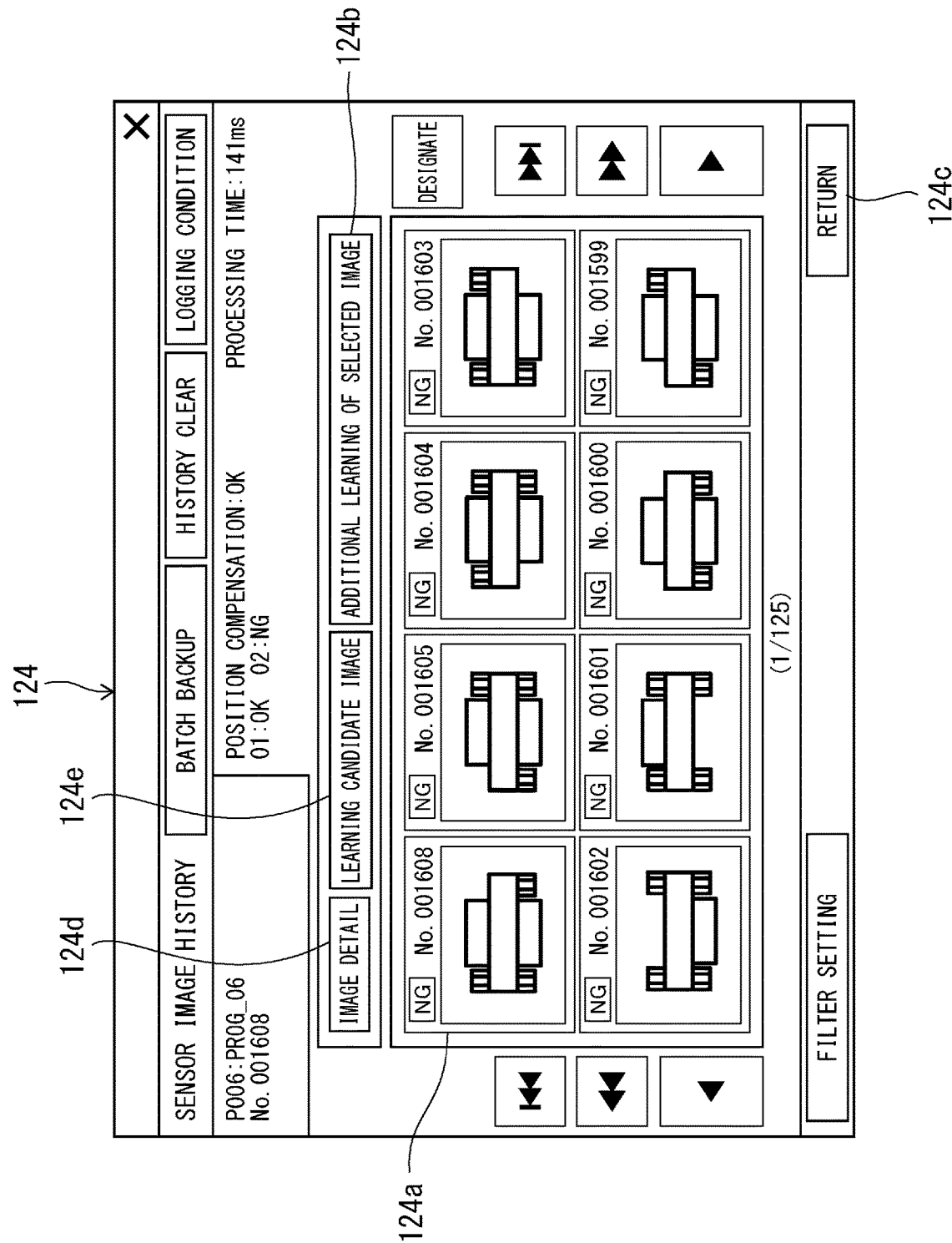
FIG. 22 illustrates an operation image history display user interface in which an inspection target image after a pass/fail determination is displayed.
Figure 23:
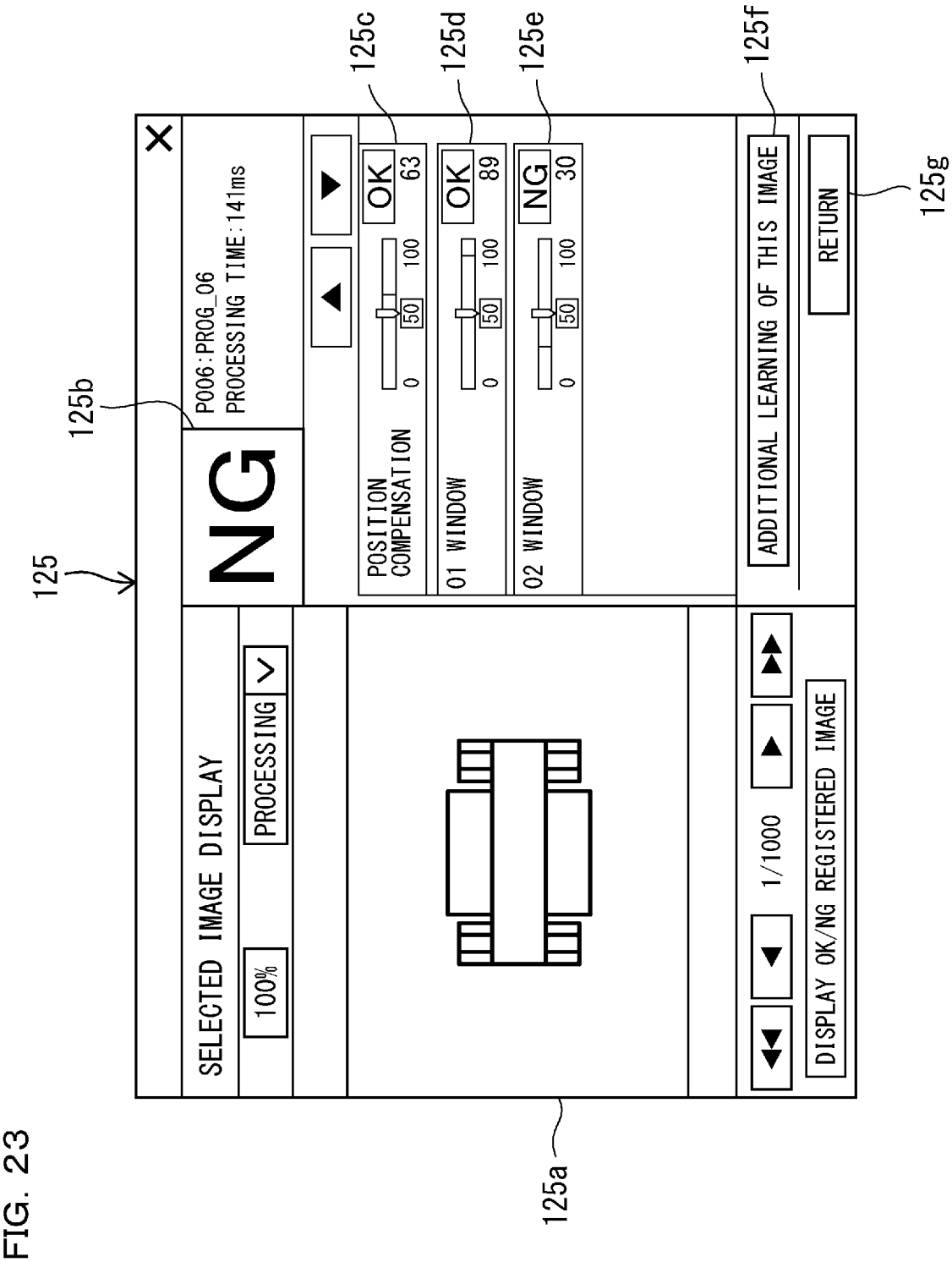
FIG. 23 illustrates a selection image display user interface.

When detecting that the return button 124c of the operation image history display user interface 124 illustrated in FIG. 22 has been pressed, the control unit 2 display the run mode user interface 120 illustrated in FIG. 21 in the display device 4. The learning image history button 123b of the history type selection interruption screen 123 is operated to display the images used for learning that are stored in the learning image history folder of the storage device 19. When detecting that the learning image history button 123b of the history type selection interruption screen 123 has been pressed, the control unit 2 generates a learning image history display user interface 126 illustrated in FIG. 24 and displays this interface in the display device 4. The learning image history display user interface 126 includes an image display region 126a in which the images used for learning are listed, a deletion button 126b, and a return button 126c. The images displayed in the image display region 126a can be selected by, for example, a selection operation by the user. When detecting that the deletion button 126b has been pressed in the state in which any of the images displayed in the image display region 126a is selected, the control unit 2 deletes the selected image. When detecting that the learning image has been deleted, the control unit 2 causes the distinguishing device generating section 30 to update the distinguishing device to prevent the image from being reflected on the learning result. When detecting that the return button 126c has been pressed, the control unit 2 displays the run mode user interface 120 illustrated in FIG. 21 in the display device 4.

(Structure of the Stability Evaluation Calculating Section 33)

The stability evaluation calculating section 33 illustrated in FIG. 3 calculates a stability evaluation value indicating the stability of a pass/fail determination of a plurality of history images stored in the storage device 19. The stability evaluation calculating section 33 can calculate the closeness between the determination value indicating likeness to a non-defective product or likeness to a defective product and the threshold for distinguishing a non-defective product from a defective product and use the closeness as the stability evaluation value. The stability evaluation value may be displayed in the display device 4 in a form easy to understand for the user, for example, by a value or may be retained in the image inspection apparatus 1 without being displayed.

Since the stability evaluation value indicates the stability of a pass/fail determination of a history image, the stability evaluation value can be used to determine whether the stability of a pass/fail determination by the generated distinguishing device is high or low. When the stability of a pass/fail determination is high, it is determined that the image less needs to be additionally learned because the history image can be distinguished stably. In contrast, when the stability of a pass/fail determination is low, it is determined that the image more needs to be additionally learned to update the distinguishing device because the history image cannot be distinguished stably.

(Presentation of an Additional Learning Candidate)

Figure 26:
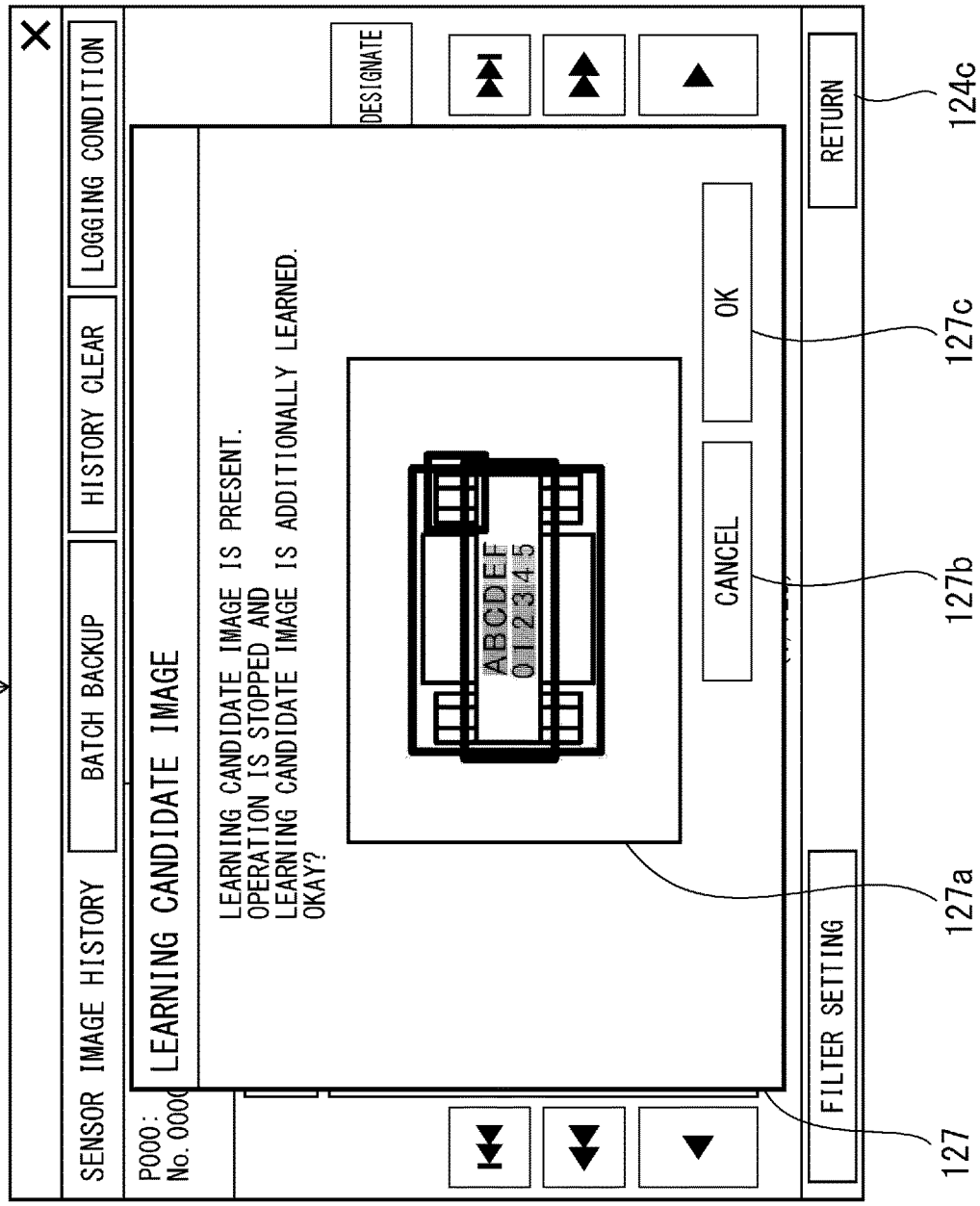
FIG. 26 is a diagram equivalent to FIG. 22 in which an interruption screen for displaying a learning candidate image is illustrated.

The display device 4 can present, to the user, the candidate image to be additionally learned by the distinguishing device based on the stability evaluation value calculated by the stability evaluation calculating section 33. That is, when detecting that the learning candidate image button 124e of the operation image history display user interface 124 illustrated in FIG. 22 has been pressed, the control unit 2 generates an interruption screen 127 that presents the candidate image to the user and displays this screen in a predetermined position in the operation image history display user interface 124 as shown in FIG. 26. The interruption screen 127 includes an image display region 127a in which the candidate image is displayed, a cancel button 127b, and an OK button 127c. The image displayed in the image display region 127a is the image determined to unstably distinguished by the generated distinguishing device based on the stability evaluation value. Specifically, the image can be an image having high closeness between the determination value indicating likeness to a non-defective product or likeness to a defective product and the threshold for distinguishing a non-defective product from a defective product, and the history image having the closeness equal to or more than a predetermined value can be presented to the user as a candidate image by the display device 4.

The image display region 127a may display the image distinguished most unstably by the generated distinguishing device. In addition, the image display region 127a may also display a plurality of candidate images including the image distinguished most unstably and the image distinguished second most unstably by the generated distinguishing device.

In addition, the display device 4 may present the history image having a stability evaluation value less than the first predetermined value to the user as a candidate image. Since the distinguishing device cannot be updated by using the image distinguished stably as a candidate image and additional learning makes no sense, the first predetermined value described above may be set to a value that almost updates the distinguishing device by causing the distinguishing device generating section 30 to additionally learn the value.

The display device 4 may adopt a display form for presenting a plurality of candidate images at a time to the user. In this case, a list of candidate images can be presented in ascending or descending order of the stability evaluation value. A specific procedure will be described later.

When a plurality of candidate images is presented by the display device 4, the user may receive the designation as additional learning images via the additional learning image designating section 32 illustrated in FIG. 3. When the user selects one candidate image from the plurality of candidate images, the additional learning image designating section 32 receives the designated candidate image as an additional learning image, receives the designation as a non-defective product image or a defective product image, and causes the distinguishing device generating section 30 to additionally learn the candidate image. The distinguishing device generating section 30 additionally learns the additional learning image designated by the user as a non-defective product image or a defective product image and updates the distinguishing device.

The display device 4 can switch between a first display form for displaying a plurality of history images in chronological order and a second display form for presenting a candidate image to be additionally learned by the distinguishing device to the user. The first display form described above is achieved in the image display region 124a of the operation image history display user interface 124 illustrated in FIG. 22. In the image display region 124a, the inspection target images can be displayed in the order in which they were captured, that is, in the order in which a pass/fail determination was made. In addition, the second display form described above is achieved on the interruption screen 127 illustrated in FIG. 26.

(During Operation in the Standard Inspection Mode)

Figure 27:
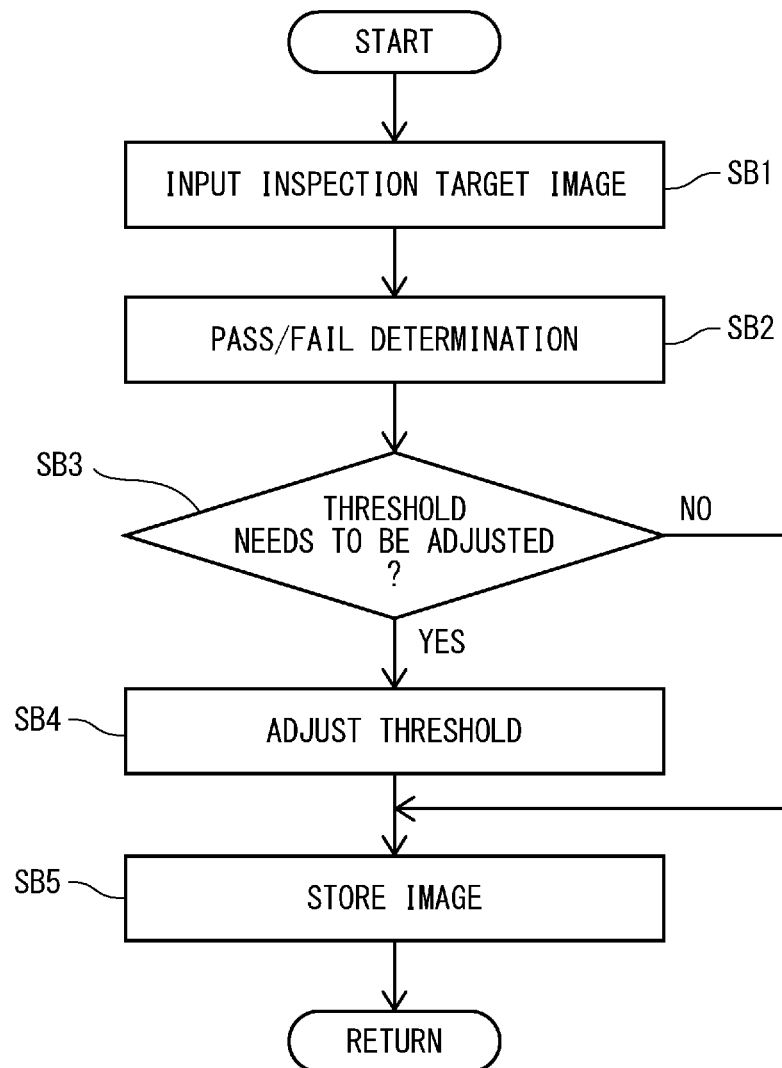
FIG. 27 is a flowchart during operation in a standard inspection mode.

Next, the procedure in the run mode in the standard inspection mode will be described with reference to the flowchart illustrated in FIG. 27. In step SB1 that follows START, an inspection target image is input. This inspection target image is captured by the image-capturing unit 3 at a predetermined timing and input from the image-capturing unit 3 to the pass/fail determining section 31.

Step SB2 is a pass/fail determination step that inputs the inspection target image newly captured by the image-capturing unit 3 in step SB1 to the distinguishing device and makes a pass/fail determination. The user determines whether the threshold of the determination needs to be adjusted based on the determination result in step SB2. This is step SB3. When the threshold needs to be adjusted, the processing proceeds to step SB4, the threshold is adjusted, and the processing proceeds to step SB5. In contrast, when the threshold does not need to be adjusted, the processing proceeds to step SB5. In step SB5, the inspection target image having been determined is associated with the determination result and stored in the storage device 19.

(Structure of the Determination Axis Extracting Section 34)

Next, the determination axis extracting section 34 illustrated in FIG. 3 will be described. The determination axis extracting section 34 extracts the determination axis indicating likeness to a non-defective product or likeness to a defective product based on the non-defective product image and the defective product image registered by the learning image registering section 24. The determination axis includes a first determination axis indicating likeness to a non-defective product in a non-defective product image and a second determination axis indicating likeness to a defective product in a defective product image, but only one of them may be extracted. Although specific examples of the determination axis are, for example, the color, brightness, area, and the like, but the determination axis may be others.

The target image can be distinguished by measuring the target image using a certain determination axis and comparing a preset reference value with the measurement result. For example, when a determination is made using color, the color set as the determination axis is displayed in the display device 4. Alternatively, when a determination is made using an area, the pixels used to calculate the area as the determination axis are displayed in the display device 4. This enables the user to grasp the determination axis used by the image inspection apparatus 1 to distinguish the image in the learning inspection mode.

When the distinguishing device generating section 30 updates the distinguishing device by additional learning or the like, the determination axis extracting section 34 extracts the determination axis again. That is, since the determination axis indicating likeness to a non-defective product or likeness to a defective product may be changed when the distinguishing device is updated, the determination axis extracting section 34 extracts the determination axis when detecting that the distinguishing device generating section 30 has updated the distinguishing device. This makes the updated distinguishing device coincide with the determination axis.

The control unit 2 calculates the determination evaluation value indicating likeness to a non-defective product or likeness to a defective product based on the determination axis extracted by the determination axis extracting section 34. For example, the determination evaluation value may be calculated so as to become larger when the difference from the color set as the determination axis of a non-defective product is smaller. In contrast, the determination evaluation value may be calculated so as to become smaller when the difference from the color set as the determination axis of a non-defective product is larger. Although the determination evaluation value includes a first determination evaluation value indicating likeness to a non-defective product calculated based on the first determination axis and a second determination evaluation value indicating likeness to a defective product calculated based on the second determination axis, only one of them may be calculated.

The control unit 2 generates an inspection target image in which a region having a feature as a non-defective product or a feature as a defective product is selectively enhanced and displays the inspection target image in the display device 4. When the first determination evaluation value and the second determination evaluation value have been calculated, the first determination evaluation value and the second determination evaluation value can be used to display an inspection target image in which a region having a feature as a non-defective product is selectively enhanced and an inspection target image in which a region having a feature as a defective product is selectively enhanced in the display device 4.

In addition, when the first determination evaluation value and the second determination evaluation value have been calculated, as a result of comparison between the first determination evaluation value with the second determination evaluation value, when the inspection target image has more features as a non-defective product, the control unit 2 displays the inspection target image in which a region having a feature as a non-defective product is selectively enhanced. In contrast, when the inspection target image has more features as a defective product, the control unit 2 generates the inspection target image in which a region having a feature as a defective product is selectively enhanced. Then, the inspection target image is displayed in the display device 4.

Here, "enhancement" represents differentiation of a part of an image from the other part and can be achieved by, for example, coloring only a particular region having the feature as a non-defective product or the feature as a defective product and an image in which a particular region has been colored can be displayed in the display device 4. In particular, when the determination axis extracting section 34 extracts color as a determination axis, enhancement can be achieved by coloring the region having the feature as a defective product in the color of the defective product or by coloring the region having the feature as a non-defective product in the color of the non-defective product. In addition, the color used for the region having the feature as a defective product may be different from the color used for the region having the feature as a non-defective product. In addition, the color of the region having the feature as a non-defective product or the feature as a defective product may be changed depending on the magnitude of the determination evaluation value. The region having a larger determination evaluation value may have a darker color and the region having a smaller determination evaluation value may have a lighter color.

Figure 28A:
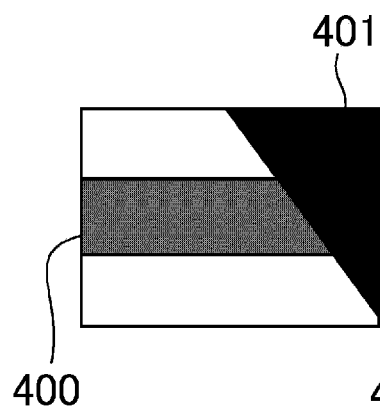
FIGS. 28A, 28B, and 28C illustrate examples of an inspection target image including a portion like a non-defective product and a portion like a defective product.
Figure 28B:
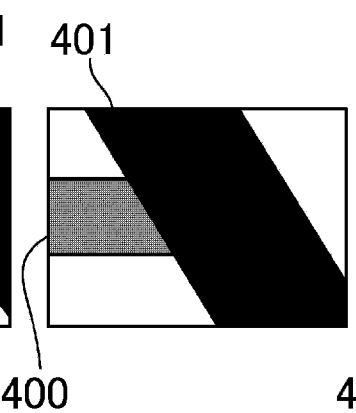
Figure 28C:
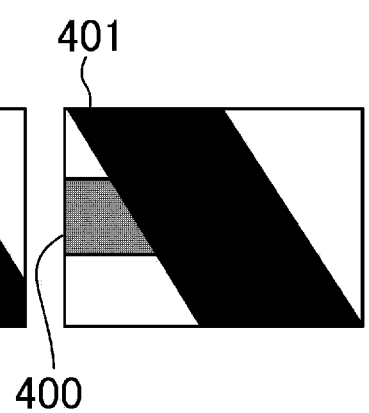
Figure 28C:
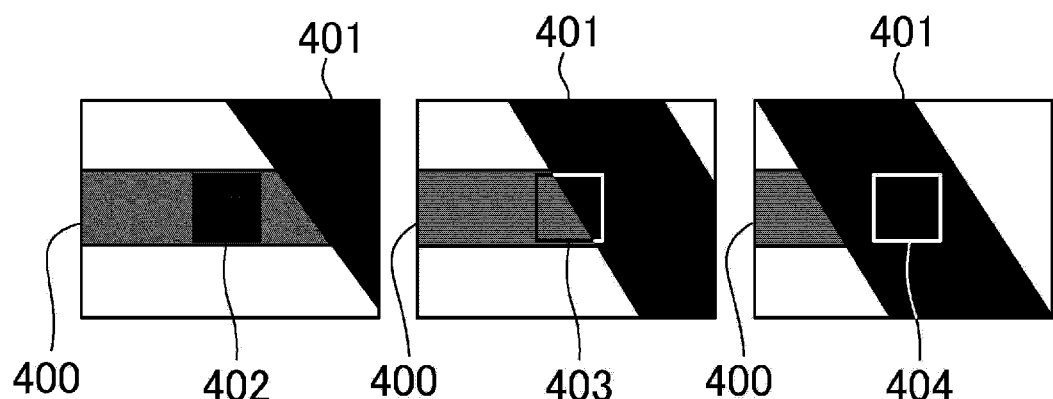

Display examples will be described below. FIGS. 28A, 28B, and 28C illustrate examples of an inspection target image including a portion like a non-defective product and a portion like a defective product, FIG. 28A illustrates the case in which the probability of being a non-defective product image is high, FIG. 28B illustrates the case in which the probability of being a non-defective product image is approximately half, and FIG. 28C illustrates the case in which the probability of being a defective product image is high. In these drawings, the gray portions denoted by reference numeral 400 are determined to be like a non-defective product and the black portions denoted by reference numeral 401 are determined to be like a defective product.

The drawings in the upper portions of FIGS. 28A to 28C are inspection target images and the drawings in the lower portions of FIGS. 28A to 28C are inspection target images in which regions having a feature as a non-defective product and regions having a feature as a non-defective product are selectively enhanced. The determination axis is color. In the case of FIG. 28A, since the region surrounded by a frame (inspection window) 402 is the gray portion 400, this region is determined to be like a non-defective product. Accordingly, the probability of being a non-defective product image is 90% or more. The region surrounded by the frame 402 has the color (gray) indicating a non-defective product and is enhanced. The probability of being a non-defective product image can be calculated by the pass/fail determining section 31.

In the case of FIG. 28B, since the region surrounded by a frame 403 includes the gray portion 400 and the black portion 401 and the area of the gray portion 400 is approximately the same as the area of the black portion 401, it is difficult to determine that the region is like a non-defective product or a defective product. Accordingly, the probability of being a non-defective product image is close to 50%. In this case, the region surrounded by the frame 403 is not colored. That is, the region is not enhanced.

In the case of FIG. 28C, since the region surrounded by a frame 404 is the black portion 401, this region is determined to be like a defective product. Accordingly, the probability of being a non-defective product image is a low value such as small percent. The region surrounded by the frame 403 has the color (black) of a defective product and is enhanced.

Figure 29A:
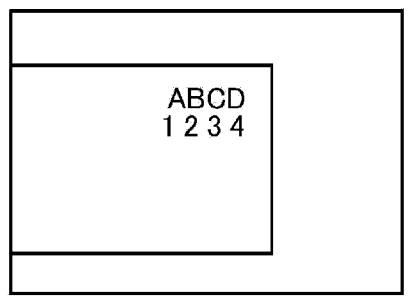
FIGS. 29A and 29B illustrate examples of an inspection target image including characters.
Figure 29B:
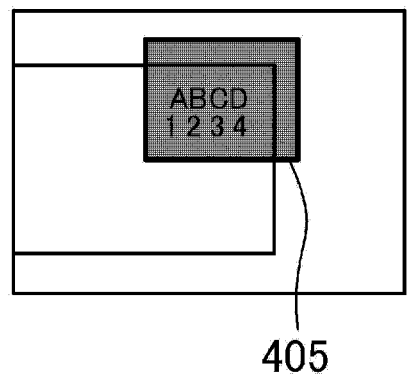

FIGS. 29A and 29B are examples of inspection target images including characters, FIG. 29A illustrates a non-defective product image, and FIG. 29B illustrates an inspection target image in which a region is selectively enhanced. When the same characters as in the non-defective product image are also present in the inspection target image as illustrated in FIG. 29B, the region including these characters can be determined to be like a non-defective product. A frame 405 surrounds the region including the characters and the region surrounded by the frame 405 is colored for enhancement.

Figure 30A:
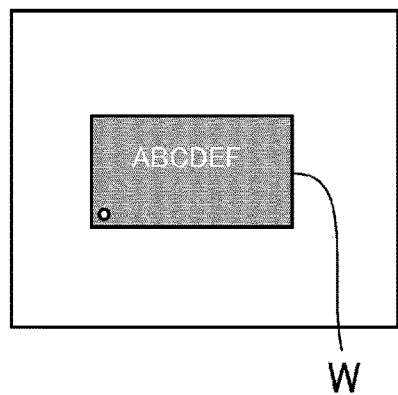
FIG. 30A illustrates a non-defective product image.
Figure 30B:
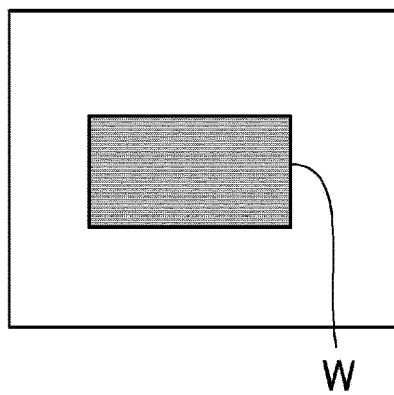
FIG. 30B illustrates a defective product image.
Figure 30C:
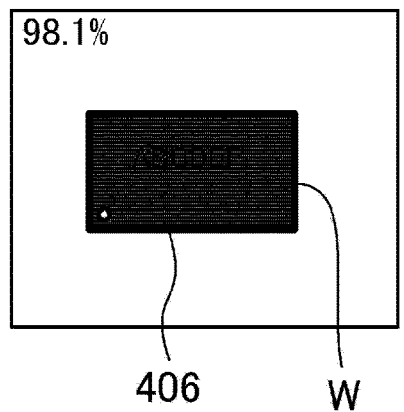
FIG. 30C illustrates an inspection target image when a non-defective product is imaged in a run mode.
Figure 30D:
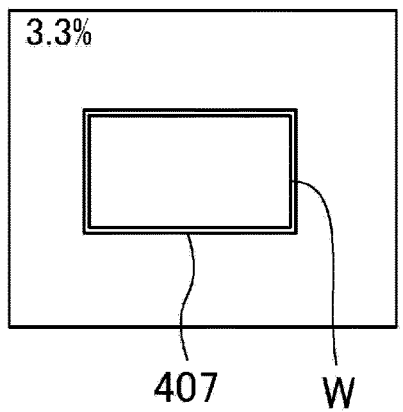
FIG. 30D illustrates an inspection target image when a defective product is imaged in the run mode.

FIGS. 30A, 30B, 30C, and 30D illustrate other examples of the inspection target W, FIG. 30A illustrates a non-defective product image, FIG. 30B illustrates a defective product image, FIG. 30C illustrates an inspection target image when a non-defective product is imaged in the run mode, and FIG. 30D illustrates an inspection target image when a defective product is imaged in the run mode. Although the non-defective product image in FIG. 30A includes a white circle and characters, the defective product image in FIG. 30B does not include a white circle and characters. In this case, the determination axis indicating likeness to a non-defective product is "presence of a while circle" and "presence of characters" and the determination axis indicating likeness to a defective product is "absence of a while circle" and "absence of characters". When a non-defective product is imaged in the run mode as illustrated in FIG. 30C, the inside of a frame 406 surrounding the non-defective product is colored dark to enhance the region. In contrast, as illustrated in FIG. 30D, when a defective product is imaged in the run mode, the inside of a frame 407 surrounding the defective product is colored white to enhance the region.

Figure 31A:
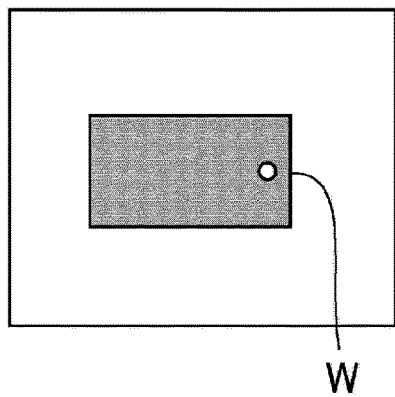
FIG. 31A illustrates a defective product image to be additionally learned and FIG. 31B illustrates an inspection target image when a defective product is imaged in the run mode after additional learning.
Figure 31B:
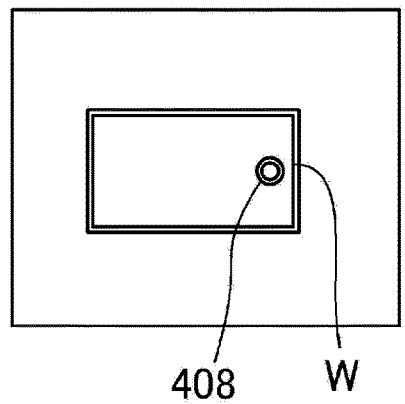

FIG. 31 illustrates the case in which additional learning is executed in the case illustrated in FIGS. 30A, 30B, 30C, and 30D, and FIG. 30A illustrates a defective product image used for additional learning and FIG. 30B illustrates the inspection target image when a defective product is imaged in the run mode after the additional learning. As illustrated in FIG. 31A, the defective product image used for additional learning includes a white circle in the right portion of the inspection target W. That is, the determination axis indicating likeness to a defective product is "a white circle is present in the right portion". As illustrated in FIG. 31B, when a defective product is imaged in the run mode, the inside of a frame 408 surrounding the defective product is colored white to enhance the region. It should be noted here that the color of an enhanced region is not particularly limited.

(During Operation in the Learning Inspection Mode)

Figure 32:
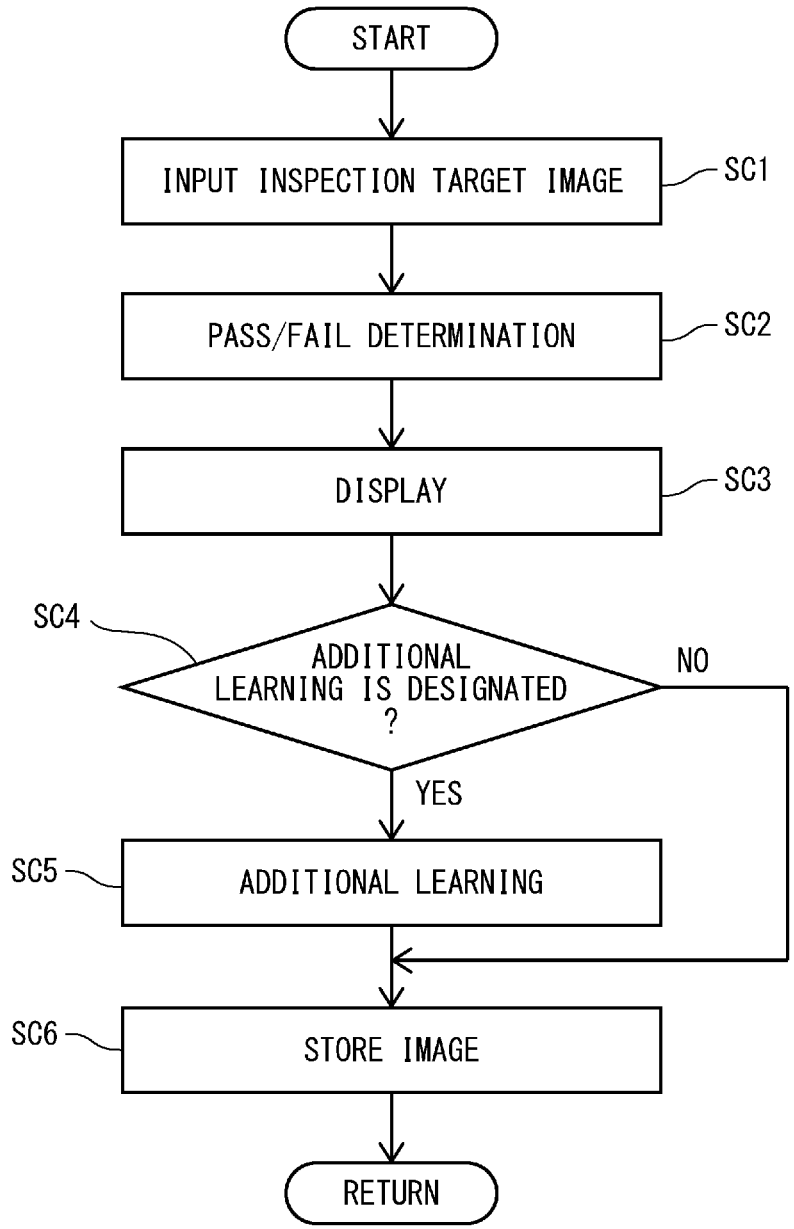
FIG. 32 is a flowchart during operation in a learning inspection mode.

Next, the procedure in the run mode in the learning inspection mode will be described with reference to the flowchart illustrated in FIG. 32. In step SC1 that follows START, an inspection target image is input. This inspection target image is captured at a predetermined timing by the image-capturing unit 3 and input from the image-capturing unit 3 to the pass/fail determining section 31.

Step SC2 is a pass/fail determination step that inputs the inspection target image newly captured by the image-capturing unit 3 in step SC1 to the distinguishing device and makes a pass/fail determination. In this step, the determination axis extracting section 34 extracts the determination axis indicating likeness to a non-defective product or likeness to a defective product. The next step SC3 is a display step of displaying the inspection target image subjected to a pass/fail determination in the pass/fail determination step on the run mode user interface 120 illustrated in FIG. 17 together with the result of the pass/fail determination obtained in the pass/fail determination step.

In step SC4, a determination is made as to whether additional learning of the image displayed on the run mode user interface 120 has been designated. Step SC4 is an additional learning setting step of receiving the designation as to whether the inspection target image displayed on the run mode user interface 120 in the display step is additionally learned as a non-defective product image or a defective product image.

When additional learning is designated, the processing proceeds to step SC5 and additional learning is executed with this image. That is, in step SC5, the inspection target image designated as the additional learning target in the additional learning setting step (step SC4) is additionally learned as a non-defective product image or a defective product image and the distinguishing device is updated. After that, in step SC6, the image is stored as a history image in the storage device 19 together with the result of the pass/fail determination. In contrast, when additional learning is not designated in step SC4, the processing proceeds to step SC6 without performing additional learning. Step SC6 is a storing step.

(Procedure for Presenting a Learning Candidate Image)

Figure 33:
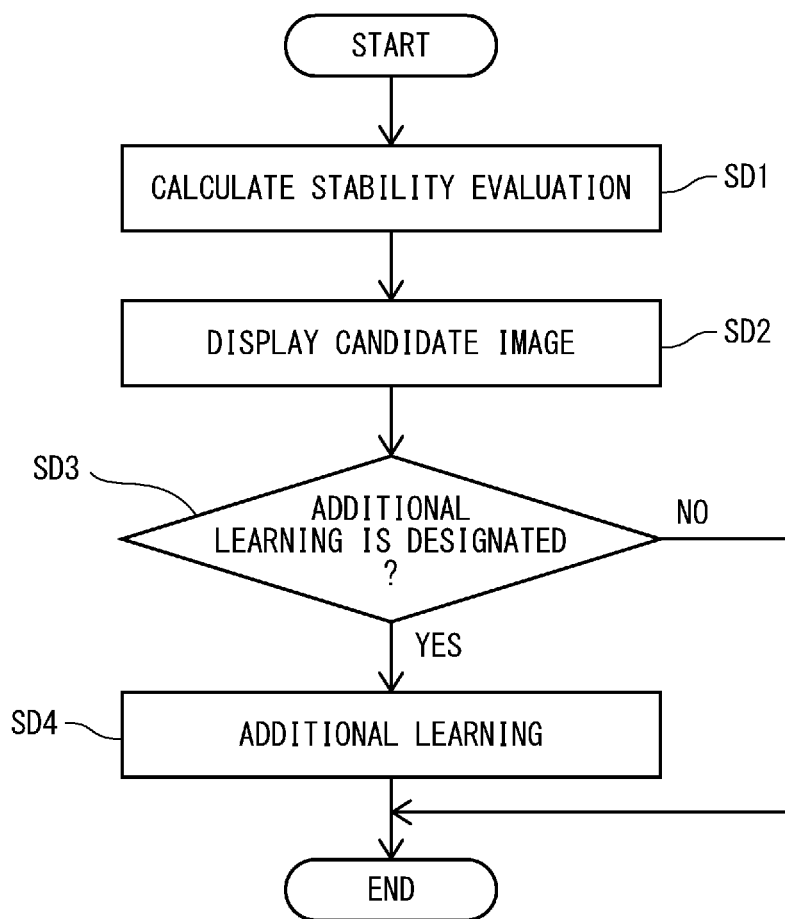
FIG. 33 is a flowchart when a learning candidate image is presented.
Figure 34:
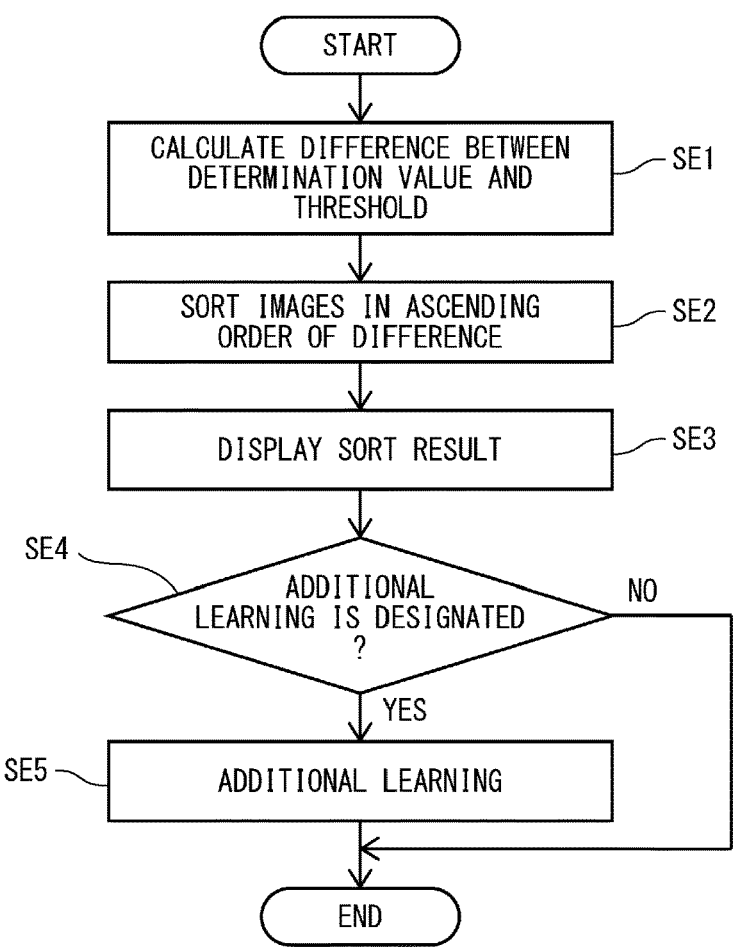
FIG. 34 is a flowchart illustrating a sorting procedure for history images.

FIG. 33 is a flowchart when a learning candidate image is presented. Step SD1 that follows START is a stability evaluation value calculation step. Specifically, this step calculates the closeness between the determination value indicating likeness to a non-defective product or likeness to a defective product of the inspection target image subjected to a pass/fail determination in step SC2 (pass/fail determination step) in the flowchart illustrated in FIG. 32 and the threshold that distinguishes a non-defective product from a defective product. After that, the closeness is used as a stability evaluation value indicating the stability of a pass/fail determination of the inspection target image. In addition, the stability evaluation value calculation step can also calculate the stability evaluation value indicating the stability of a pass/fail determination of a plurality of history images stored in step SC6 (storing step) in the flowchart illustrated in FIG. 32.

In step SD2, the candidate image to be additionally learned by the distinguishing device is presented to the user based on the stability evaluation value calculated in step SD1. This is the display step. For example, the operation image history display user interface 124 illustrated in FIG. 26 is displayed in the display device 4.

In step SD3, a determination is made as to whether additional learning of the candidate image has been designated. Step SD3 is an additional learning setting step of receiving the designation as to whether the inspection target image displayed on the operation image history display user interface 124 in the display step is additionally learned as a non-defective product image or a defective product image.

When additional learning is designated, the processing proceeds to step SD4 and additional learning is executed with this candidate image. That is, in step SD4, the additional learning image designated as the additional learning target in the additional learning setting step (step SD3) is additionally learned as a non-defective product image or a defective product image and the distinguishing device is updated. In contrast, when additional learning is not designated in step SD3, additional learning is not performed.

(Sorting of History Images)

History images to be presented to the user as additional learning candidates may be sorted. In step SE1 that follows START, the stability evaluation calculating section 33 calculates the difference between the determination value indicating likeness to a non-defective product or likeness to a defective product and the threshold for distinguishing a non-defective product from a defective product for each history image. This can obtain the closeness between the determination value and the threshold. The difference may be calculated for all history images stored by the storage device 19 or for a plurality of latest history images.

In step SE2, the control unit 2 sorts history images in ascending order of the difference calculated in step SE1. At this time, all the history images for which the difference has been calculated may be sorted or only the plurality of history images having differences less than a predetermined value may be sorted.

In step SE3, the control unit 2 causes the display device 4 to display the sorting result obtained in step SE2. The control unit 2 may generate a user interface for listing and displaying a plurality of history image in ascending order of the difference. The number of images displayed on this user interface may be, for example, five to ten and the images may be displayed in a plurality of rows. Since determination is unstable when the difference is small and such images are additional learning candidate images, the plurality of learning candidate images can be presented to the user.

In step SE4, a determination is made as to whether additional learning of a candidate image has been designated. Step SE4 is an additional learning setting step of receiving the designation as to whether the inspection target image displayed on the operation image history display user interface 124 in the display step is additionally learned as a non-defective product image or a defective product image. When additional learning is designated, the processing proceeds to step SE5 and additional learning is executed with this candidate image. That is, in step SE5, the additional learning image designated as the additional learning target in the additional learning setting step (step SE4) is additionally learned as a non-defective product image or a defective product image and the distinguishing device is updated. In contrast, when additional learning is not designated in step SE4, additional learning is not performed.

(Deletion Candidate Display)

The display device 4 presents, to the user, the history image having a stability evaluation value equal to or more than a predetermined value as a deletion candidate image to be deleted from the storage device 19. This predetermined value may be a second predetermined value larger than the first predetermined value or may be equal to the first predetermined value.

That is, since the image stably distinguished by the generated distinguishing device is determined to have a high stability evaluation value and less needs to be additionally learned as described above, the necessity to store the image in the storage device 19 is very small and the memory is unnecessarily used. The memory of the storage device 19 can be saved by deleting such images from the storage device 19.

FIG. 35 is a schematic view in which a non-defective product image group and a defective product image group registered by the learning image registering section 24 are plotted in a certain feature value space and the distinguishing boundary between non-defective product images and defective product images by the distinguishing device generated by the distinguishing device generating section 30 is indicated. In this drawing, the non-defective product image group is plotted in the white region and the defective product image group is plotted in the black region.

Since the non-defective product images surrounded by an enclosing line 300 in the non-defective product image group are away from the distinguishing boundary, the distinguishing boundary is not updated even if the non-defective product images surrounded by an enclosing line 300 are additionally learned and the learning almost makes no sense. The non-defective product images surrounded by this enclosing line 300 are presented as deletion candidate images to the user by the display device 4. In addition, since the defective product images surrounded by an enclosing line 301 in the defective product image group are also away from the distinguishing boundary, the distinguishing boundary is not updated even if the defective product images surrounded by an enclosing line 301 are additionally learned and the learning almost makes no sense. The defective product images surrounded by this enclosing line 301 are presented as deletion candidate images to the user by the display device 4. That is, it is possible to present, to the user, the history images away from the distinguishing boundary between non-defective product images and defective product images by the distinguishing device by a predetermined distance or more.

Figure 36:
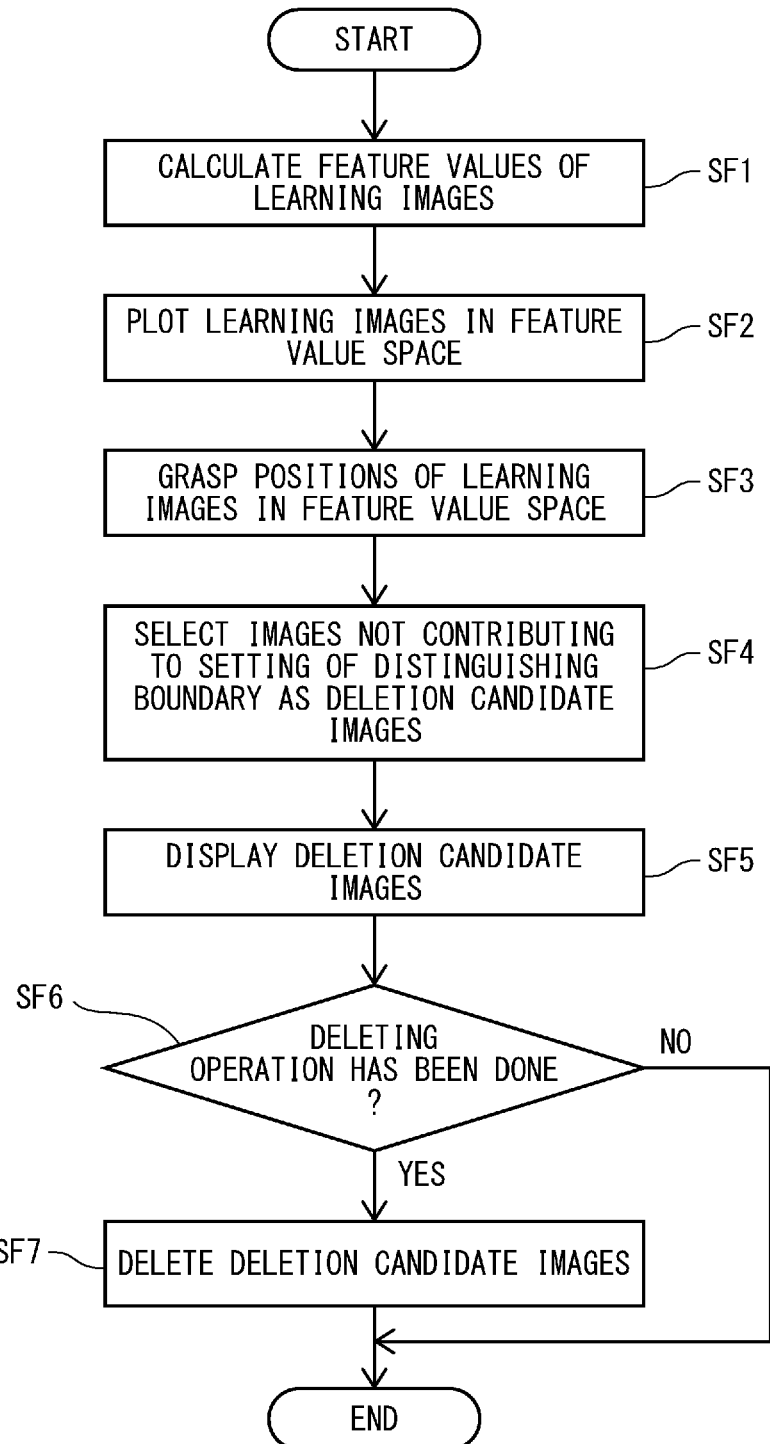
FIG. 36 is a flowchart illustrating the procedure for presenting a deletion candidate image.

The procedure for presenting a deletion candidate images will be described with reference to the flowchart illustrated in FIG. 36. In step SF1 that follows START, the distinguishing device generating section 30 calculates the feature values of the images (history images) used for learning. After calculating the feature values, the processing proceeds to step SF2 and the history images are plotted in a feature value space as illustrated in FIG. 35. After that, the processing proceeds to step SF3 and the control unit 2 grasps the positions of the history images in the feature value space. This can grasp the positional relationship between the distinguishing boundary and the individual history images and separate the history images close to the distinguishing boundary from the history images away from the distinguishing boundary by a predetermined distance or more.

In step SF4, the history image that does not contribute to the setting of the distinguishing boundary in step SF3 is selected as a deletion candidate image. The history image that does not contribute to the setting of the distinguishing boundary is the history image away from the distinguishing boundary by a predetermined distance or more. In step SF5, the deletion candidate image selected in step SF4 is displayed in the display device 4 by the control unit 2. This can present the deletion candidate image to the user. One candidate image or a plurality of deletion candidate images may be presented to the user at a time.

In step SF6, a determination is made as to whether a deleting operation of the deletion candidate image has been performed by the user. When the deleting operation has been performed, the deletion candidate image is deleted in step SF7. When the deleting operation has not been performed, the processing ends without deleting the deletion candidate image. The deleting operation may be performed on one deletion candidate image or may be performed on a plurality of deletion candidate images.

Figure 37:
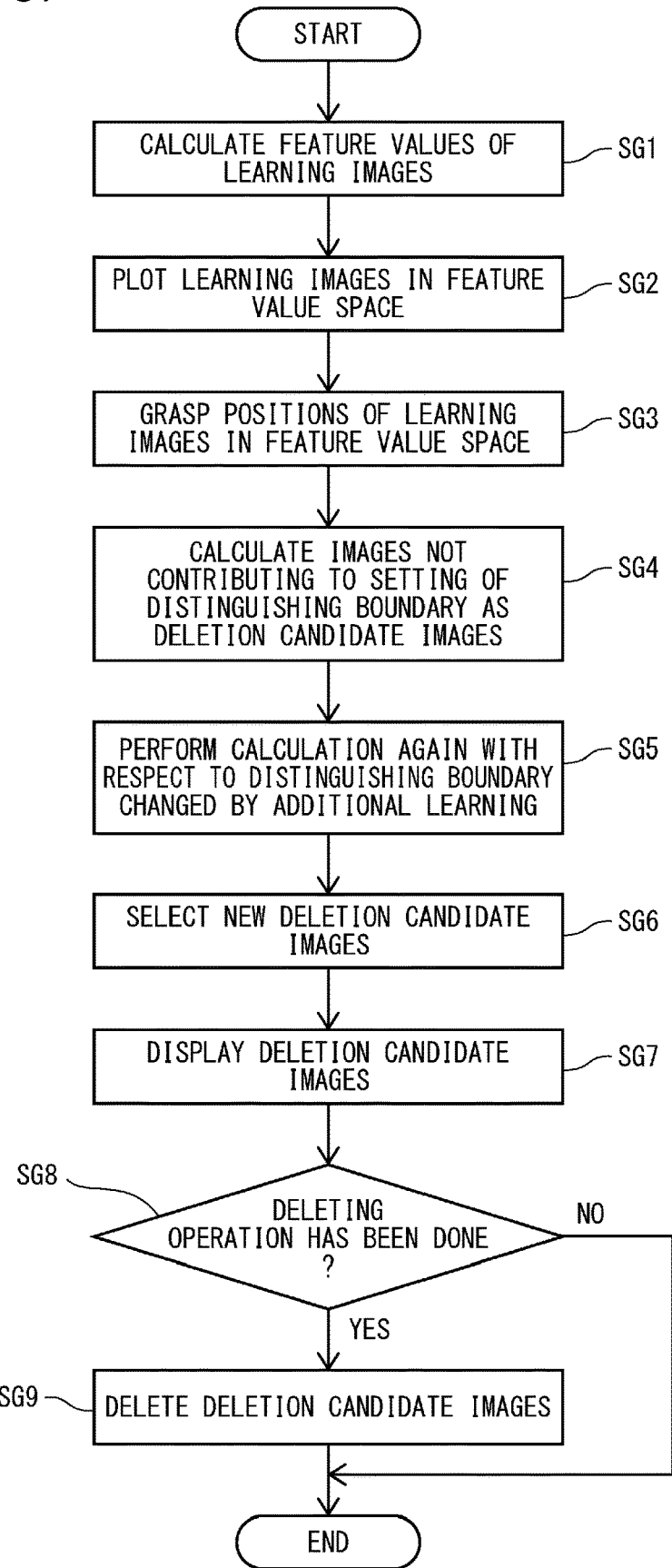
FIG. 37 is a flowchart illustrating the presenting procedure for a deletion candidate image when the distinguishing boundary is changed by additional learning.
Figure 38:
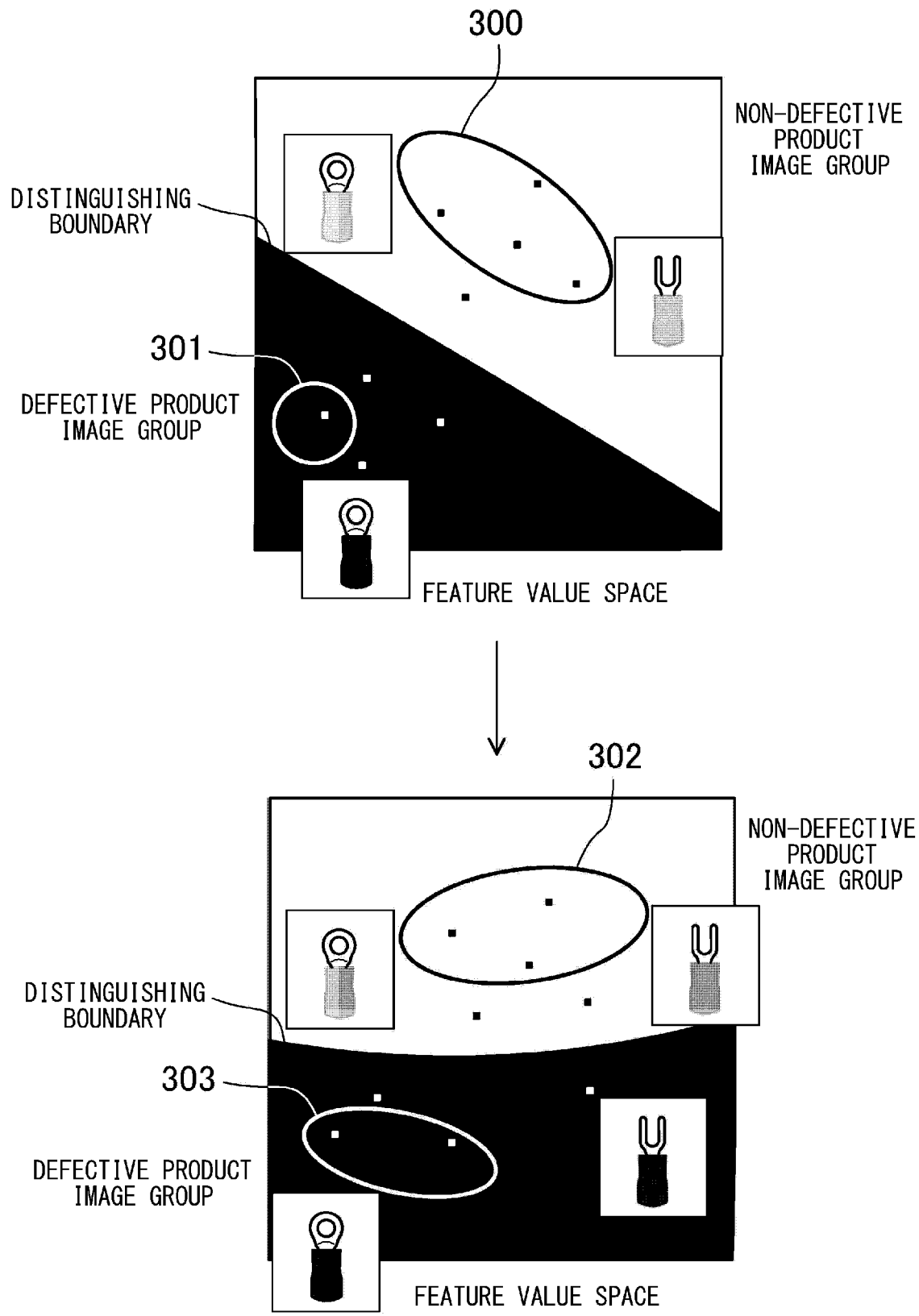
FIG. 38 is a diagram equivalent to FIG. 35 in which the distinguishing boundary has been changed by additional learning.

FIGS. 37 and 38 illustrate the case in which the distinguishing boundary is changed by additional learning. The steps SG1 to SG4 in the flowchart illustrated in FIG. 37 are the same as steps SF1 to SF4 in the flowchart illustrated in FIG. 36, respectively. In step SG5 in the flowchart illustrated in FIG. 37, when the distinguishing boundary is changed by additional learning as described above, the deletion candidate images with respect to a new distinguishing boundary are calculated again.

For example, when the distinguishing boundary in the feature value space illustrated in the upper portion of FIG. 38 is changed to the distinguishing boundary in the feature value space illustrated in the lower portion of FIG. 38 by additional learning, the distances between the distinguishing boundary and the non-defective product images and the distances between the distinguishing boundary and the defective product images are calculated again. After that, the processing proceeds to step SG6 and, as new deletion candidate images, the history images (non-defective product images surrounded by an enclosing line 302 and defective product images surrounded by an enclosing line 303) away from the new distinguishing boundary by a predetermined distance or more are selected as the deletion candidate images. Next, the processing proceeds to step SG7, the non-defective product images surrounded by the enclosing line 302 and the defective product images surrounded by the enclosing line 303 are displayed in the display device 4 as the deletion candidate images, and the newly selected deletion candidate images are presented to the user. Steps SG8 and SG9 are the same as steps SF6 and SF7 in the flowchart illustrated in FIG. 36, respectively.

Figure 39:
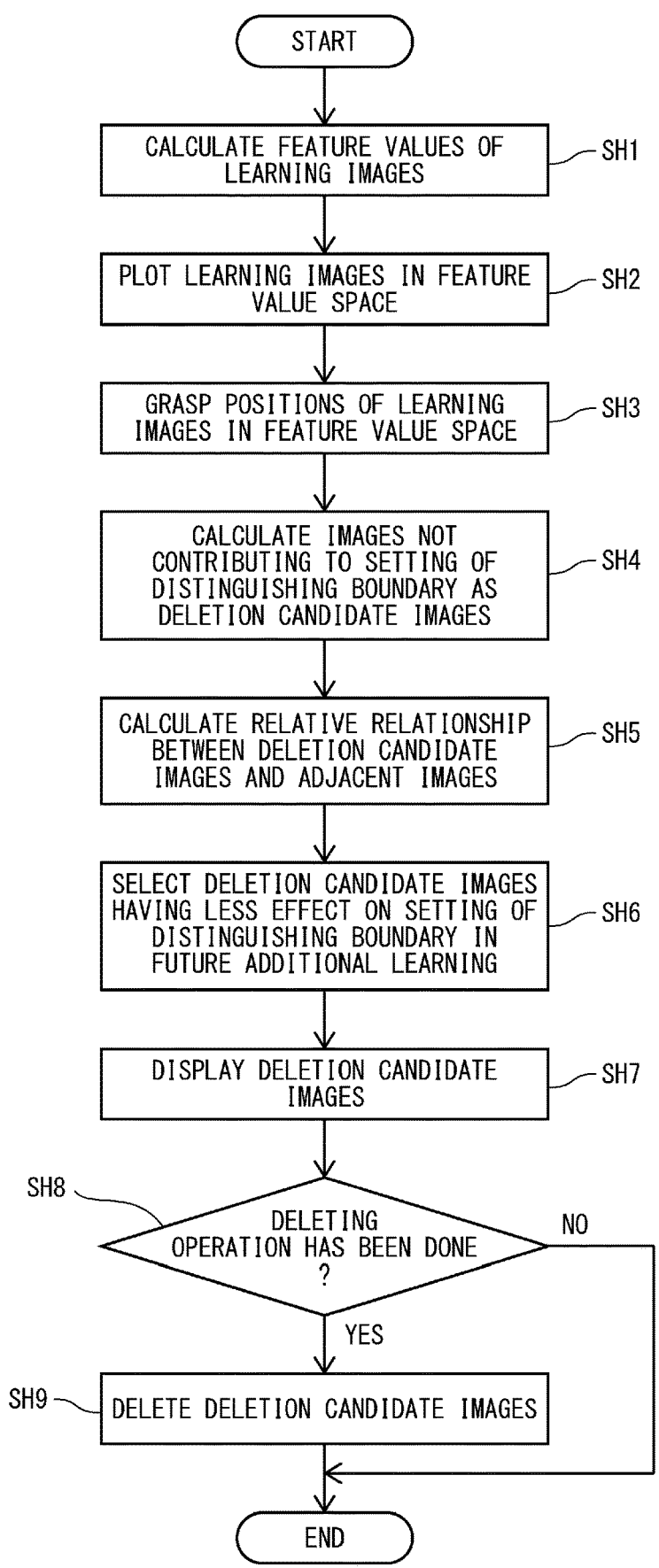
FIG. 39 is a flowchart illustrating the procedure for presenting a deletion candidate image based on the relative relationship between a deletion candidate image and an adjacent image.

FIG. 39 is a flowchart illustrating the procedure for presenting the deletion candidate images based on the relative relationship between the deletion candidate images and adjacent images. Steps SH1 to SH4 are the same as steps SF1 to SF4 in the flowchart illustrated in FIG. 36, respectively. After that, in step SH5, the relative relationship between the deletion candidate images and adjacent images is calculated. Next, in step SH6, the image having less effects on the setting of the distinguishing boundary in future additional learning is selected as the deletion candidate image.

Figure 40:
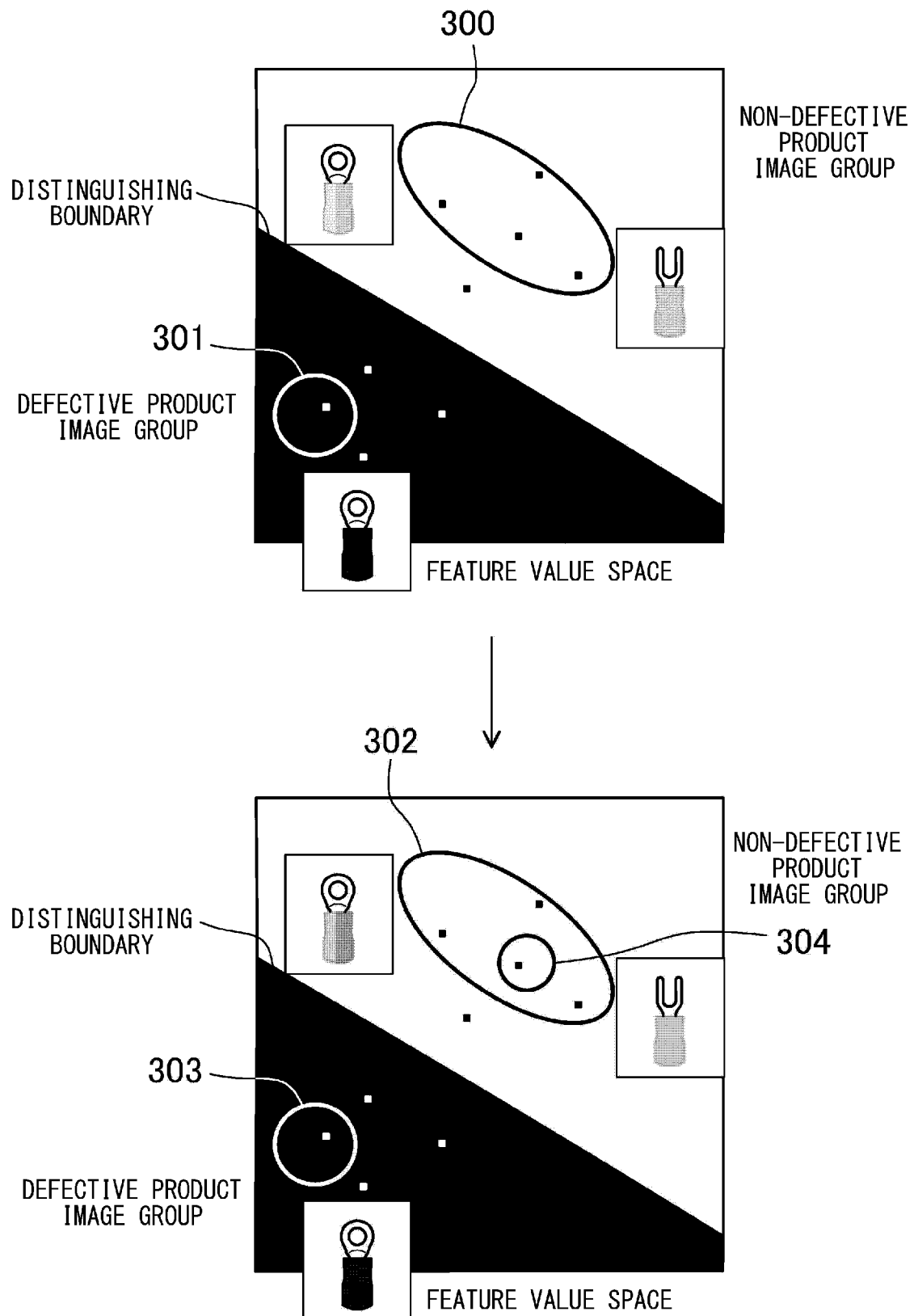
FIG. 40 is a diagram equivalent to FIG. 35 in which the determining method for the relative relationship between the deletion candidate image and the adjacent image is described.

That is, this step presents, to the user, the image determined not to contribute to the setting of the distinguishing boundary as a deletion candidate image based on the relative relationship between the history image away from the distinguishing boundary by a predetermined distance or more and an adjacent image plotted adjacent to this history image in the feature value space. Specifically, in the case of the feature value space illustrated in the upper portion of FIG. 40, the non-defective product images surrounded by the enclosing line 300 and the defective product images surrounded by the enclosing line 301 can be deletion candidate images. Of these images, all of the non-defective product images surrounded by the enclosing line 300 are away from the distinguishing boundary by a predetermined distance or more, so all of the images can be deletion candidate images. However, focusing on the image surrounded by an enclosing line 304 in the lower image of FIG. 40, the image is determined not to contribute to the setting of the distinguishing boundary based on the relative relationship between this image and the images around this image. That is, since the history images are positioned so as to surround the image surrounded by the enclosing line 304, even when the image surrounded by the enclosing line 304 is deleted, the current distinguishing boundary is not affected and a distinguishing boundary that will be generated in the future is hardly affected. Accordingly, by executing step SH7, the image that hardly affects the setting of the distinguishing boundary even if the image is deleted can be presented as a deletion candidate image to the user. Steps SH8 and SH9 are the same as steps SF6 and SF7 in the flowchart illustrated in FIG. 36, respectively.

(Operation and Effect of the Embodiment)

As described above, according to the embodiment, by implementing the standard inspection mode and the learning inspection mode in the image inspection apparatus 1 and switching between these inspection modes, an inspection can be performed in either inspection mode and an inspection can be made by taking advantage of the strengths of the individual inspection modes.

When a master image is captured in the setting mode in the standard inspection mode, the imaging condition can be set and the image processing tool can be selected. In addition, the range to which this image processing tool is applied can be defined by the inspection window and the parameters of the image processing tool can be adjusted. That is, since the user can set the imaging condition, the type of the image processing tool, and the application range of image processing tool and adjust the parameters of the image processing tool in the standard inspection mode, the standard inspection mode can be executed by controlling the pass/fail determination reference so as to obtain desired results. For example, in the standard inspection mode, a pass/fail determination of an inspection target in an image can be made based on various feature values (such as color, edge, and position) of the inspection target.

In contrast, in the setting mode in the learning inspection mode, it is possible to register the non-defective product image to which the attribute of a non-defective product is given by the user and the defective product image to which the attribute of a defective product is given by the user and generate the distinguishing device that distinguishes the non-defective product image from the defective product image by learning the registered non-defective product image and the registered defective product image. That is, the setting and the adjustment performed by the user in the standard inspection mode is not necessary in the setting mode in the learning inspection mode.

In addition, the plurality of inspection target images subjected to a pass/fail determination by the distinguishing device is stored as history images in the storage device 19 together with the results of the pass/fail determination, so that the stability evaluation values indicating the stability of the pass/fail determinations of the plurality of history images can be calculated. The candidate images to be additionally learned by the distinguishing device can be presented to the user based on the stability evaluation values.

Accordingly, even if the number of history images stored in the storage device 19 is very large, the user can select an additional learning image from the candidate images presented based on the stability of the pass/fail determinations. When the designation of additional learning image by the user has been received, the distinguishing device can be updated by additionally learning the additional learning image designated by the user as a non-defective product image or a defective product image.

In addition, the determination axis indicating likeness to a non-defective product or likeness to a defective product can be extracted based on the non-defective product image or the defective product image and, based on this determination axis, the determination evaluation value indicating likeness to a non-defective product or likeness to a defective product can be calculated. Since it is possible to display an inspection target image in which a region having a feature as a non-defective product or a feature as a defective product is selectively enhanced due to this determination evaluation value, the user can grasp the determination axis used to distinguish images by the image inspection apparatus 1 that performs a learning inspection.

In addition, when switching from the setting mode to the run mode is performed, the newly captured inspection target image is input to the distinguishing device and a pass/fail determination is made. Since both the inspection target image and the result of the pass/fail determination are displayed on the run mode screen of the display device 4, the user can grasp the inspection target image and the result of the pass/fail determination of this image. When the result of the pass/fail determination of the inspection target image is correct, the run mode is continued. When the result of the pass/fail determination of the inspection target image is incorrect, additional learning may be performed. Accordingly, the distinguishing device can be updated by designating the image to be additionally learned and additionally learning the image in the run mode without switching from the run mode to setting mode.

The embodiment described above is only an example in all respects and should not be interpreted in a limited way. In addition, modifications and changes within the range of equivalency of the appended claims are therefore intended to be embraced therein.

As described above, the image inspection apparatus according to the invention can be used to make a pass/fail determination of an inspection target based on an image obtained by imaging the inspection target.

What is claimed is:

1. An image inspection apparatus that makes a pass/fail determination of an inspection target based on an image of the inspection target captured by an imaging unit, the image inspection apparatus comprising:
   a mode switching unit that switches a mode of the image inspection apparatus between a setting mode for setting the image inspection apparatus and a run mode for performing an inspection;
   an imaging setting unit that receives a setting of an imaging condition of the imaging unit in the setting mode;
   a learning image registering unit that registers a non-defective product image to which an attribute of a non-defective product is given by a user and a defective product image to which an attribute of a defective product is given by the user in the setting mode;
   a distinguishing device generating unit that learns the non-defective product image and the defective product image registered by the learning image registering unit and generates a distinguishing device that distinguishes the non-defective product image from the defective product image in the setting mode;
   a pass/fail determining unit that inputs an inspection target image newly captured by the imaging unit to the distinguishing device and makes the pass/fail determination in the run mode;
   a display unit that displays the inspection target image together with a result of the pass/fail determination by the pass/fail determining unit on a run mode screen in the run mode; and
   an additional learning image designating unit that receives designation as to whether the inspection target image displayed on the run mode screen is additionally learned as the non-defective product image or the defective product image,
   wherein the distinguishing device generating unit additionally learns, as the non-defective product image or the defective product image, the inspection target image designated as an additional learning target by the additional learning image designating unit, and updates the distinguishing device.

2. The image inspection apparatus according to claim 1, wherein the distinguishing device generating unit generates a distinguishing boundary between the non-defective product image and the defective product image in a feature value space by inputting the non-defective product image and the defective product image to a pre-learned neural network having a plurality of layers and updates the distinguishing boundary by the additional learning.

3. The image inspection apparatus according to claim 1, further comprising:
   a master image registering unit that registers, as a master image, an image captured under the imaging condition set by the imaging setting unit in the setting mode; and
   an inspection window setting unit that receives a setting of a first learning-based inspection window and a second learning-based inspection window that define ranges of difference detection on the master image registered by the master image registering unit in the setting mode,
   wherein the run mode screen displays a result of the pass/fail determination by the pass/fail determining unit of an image in the range defined by the first learning-based inspection window and a result of the pass/fail determination by the pass/fail determining unit of an image in the range defined by the second learning-based inspection window and
   the additional learning image designating unit receives designation as to whether the image in the range defined by the first learning-based inspection window and the image in the range defined by the second learning-based inspection window are additionally learned separately from each other.

4. The image inspection apparatus according to claim 3, wherein, after receiving the designation as to whether the image in the range defined by the first learning-based inspection window and the image in the range defined by the second learning-based inspection window are additionally learned separately from each other, the additional learning image designating unit receives an operation for starting the additional learning by the user.

5. The image inspection apparatus according to claim 3, wherein, after receiving designation for additionally learning the inspection target image displayed on the run mode screen as the non-defective product image or the defective product image, the additional learning image designating unit receives the designation as to whether the image in the range defined by the first learning-based inspection window and the image in the range defined by the second learning-based inspection window are additionally learned separately from each other.

6. The image inspection apparatus according to claim 1, wherein, when the additional learning image designating unit receives the designation for additionally learning the inspection target image displayed on the run mode screen as the non-defective product image or the defective product image, the pass/fail determining unit temporarily stops the run mode and when the additional learning image designating unit receives the designation for additionally learning the inspection target image displayed on the run mode screen, the display unit is capable of notifying the user that the pass/fail determination temporarily stops the run mode.

7. A setting method for an image inspection apparatus that makes a pass/fail determination of an inspection target based on an image of the inspection target captured by an imaging unit, the setting method comprising:

an imaging condition setting step of setting an imaging condition of the imaging unit with a mode of the image inspection apparatus set to a setting mode for setting the image inspection apparatus;

a learning image registering step of registering a non-defective product image to which an attribute of a non-defective product is given by a user and a defective product image to which an attribute of a defective product is given by the user in the setting mode;

a distinguishing device generating step of learning the non-defective product image and the defective product image registered in the learning image registering step and generating a distinguishing device that distinguishes the non-defective product image from the defective product image in the setting mode;

a pass/fail determination step that inputs an inspection target image newly captured by the imaging unit in the distinguishing device and makes the pass/fail determination in a run mode for performing an inspection;

a display step of displaying the inspection target image together with a result of the pass/fail determination in the pass/fail determination step on a run mode screen in the run mode; and an additional learning setting step of receiving designation as to whether the inspection target image displayed on the run mode screen in the display step is additionally learned as the non-defective product image or the defective product image, wherein the inspection target image designated as an additional learning target in the additional learning setting step is additionally learned as the non-defective product image or the defective product image and the distinguishing device is updated in the distinguishing device generating step.

* * * * *